United States Patent [19]
Levran et al.

[11] Patent Number: 5,982,645
[45] Date of Patent: Nov. 9, 1999

[54] POWER CONVERSION AND DISTRIBUTION SYSTEM

[75] Inventors: Alexander Levran, Los Angeles; Joseph Marion Nowosielski, Laguna Hills; Giao Mong Ton-That, Mission Viejo; Ramamoorthy Rajagopalan, Irvine, all of Calif.; Henri Mabboux, Eybens, France; David Mazur, Creve Coeur, Mo.

[73] Assignee: Square D Company, Palatine, Ill.

[21] Appl. No.: 08/084,366

[22] Filed: Jun. 29, 1993

Related U.S. Application Data

[63] Continuation-in-part of application No. 07/935,041, Aug. 25, 1992, Pat. No. 5,414,609, and application No. 07/951,208, Sep. 25, 1992, Pat. No. 5,592,137.

[51] Int. Cl.$^6$ ............................... H02M 5/45; H02J 7/00
[52] U.S. Cl. ............................... 363/37; 363/71; 307/66; 307/82
[58] Field of Search ............................... 363/34, 37, 67, 363/71; 307/64, 66, 82

[56] References Cited

U.S. PATENT DOCUMENTS

| | | | |
|---|---|---|---|
| 3,395,327 | 7/1968 | Kaiser et al. | 363/35 |
| 4,538,073 | 8/1985 | Freige et al. | 307/33 |
| 4,590,546 | 5/1986 | Maile | 363/37 |
| 4,719,550 | 1/1988 | Powell et al. | 363/37 |
| 4,751,398 | 6/1988 | Ertz, III | 307/66 |
| 4,818,891 | 4/1989 | Drinkwater | 307/64 |
| 4,961,130 | 10/1990 | Kirchberg, Jr. | 363/41 |
| 4,977,492 | 12/1990 | Kirchberg, Jr. et al. | 363/41 |
| 4,985,819 | 1/1991 | Mori et al. | 363/37 |
| 5,012,177 | 4/1991 | Dhyanchand et al. | 322/10 |
| 5,018,058 | 5/1991 | Ionescu et al. | 363/34 |
| 5,175,439 | 12/1992 | Harar et al. | 307/10.1 |
| 5,233,286 | 8/1993 | Rozman et al. | 322/90 |
| 5,241,217 | 8/1993 | Severinsky | 307/64 |

OTHER PUBLICATIONS

Three phase soft–swithced high power density DC/DC converter for high power applications, 1988 Annual conference record of the IEEE IAS annual meeting, Part 1, pp. 796–805.

Micro Linear Brochure (Phase Modulation/Soft Switching Controller, pp. 1–12) Jul. 1991.

Design considerations for high voltage high power full bridge zero voltage swithched PWM converter J.A. Sabate et al. 1990 IEEE pp. 275–284.

*Primary Examiner*—Adolf Deneke Berhane
*Attorney, Agent, or Firm*—Michael J. Femal; Larry I. Golden

[57] ABSTRACT

A power conversion system is described which includes a power input for accepting a waveform at a given power level and frequency, and a power output for providing an output waveform at a second given power level. A DC to AC converter accepts a waveform based on an input wave form from the power input and converts the waveform to an AC waveform having a frequency at least approximately an order of magnatude higher than the frequency of the input waveform for application to a DC to AC converter output. An AC converter accepts the output waveform from the DC to AC converter output and provides a converted waveform from an output of the AC converter to the power output. A coupling device operates at the frequency of the converter output for coupling the output of the DC to AC converter to the AC converter.

29 Claims, 32 Drawing Sheets

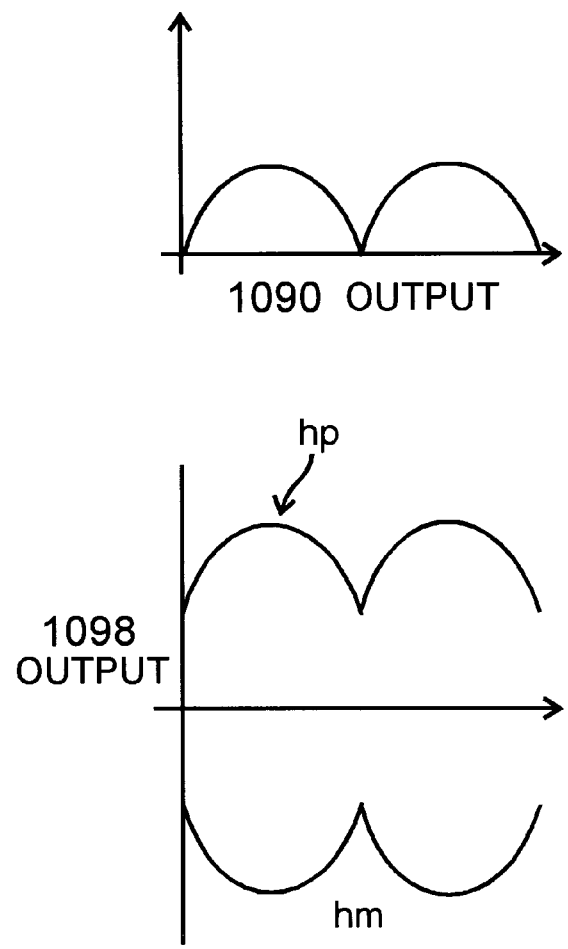
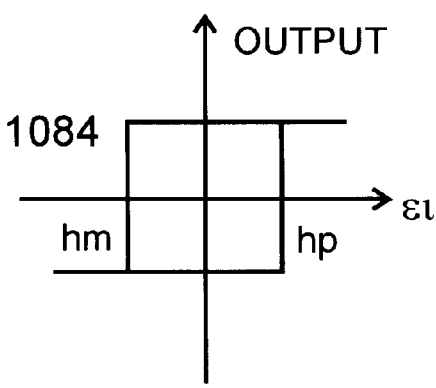
*Fig. 5a*

VIEW "A - A"

VIEW "B - B"

POWER CONVERSION AND DISTRIBUTION SYSTEM

RELATED APPLICATIONS

This application is a continuation in part of U.S. patent applications, Ser. No. 07/935,041, now U.S. Pat. No. 5,414,609 filed Aug. 25, 1992, and Ser. No. 07/951,208, now U.S. Pat. No. 5,592,137 filed Sep. 25, 1992, and is related to the concurrently filed application entitled AC TO DC POWER CONVERSION SYSTEM application Ser. No. 08/084,552.

FIELD OF THE INVENTION

The present invention relates generally to power supply systems, and more specifically, to power supply, conversion and distribution systems.

BACKGROUND OF THE INVENTION

Electrical power conversion systems have been of concern since the advent of electricity. It has been a greater concern since the advent of commercial transmission of electrical power. Electrical power is usually transmitted in the form of alternating current (AC) at a frequency of 60 Hz and 110–120 Volts (rms) in the United States, or 50 Hz and 220 Volts (rms) in many other countries. Many appliances run directly off of the supplied voltage, such as light bulbs, toasters, motors, and the like.

Many appliances require conversion to a different voltage form in order to operate. For example, 5 Volts and 12 Volts direct current (DC) is required for operation of personal computers. Microwave ovens use 5 Volts DC and higher voltages to run the microwave tube. Television sets require 10,000–50,000 Volts DC. In order to convert the power supplied by a source into a usable form to operate many modern appliances, a variety of voltage conversion circuits are employed.

Because of the widespread demand for lower voltage operating devices, there has been some attention focused on distributing electrical power at or near the required voltage. Further, as numerous appliances in the home or office require low voltage, DC electrical power, it has been observed that the power conversion efficiencies of many devices are particularly low. In addition, it has been observed that conversion to a required voltage form can be more efficiently achieved at a central location than it can be at numerous remote locations. Distribution of low voltage electrical power can then be efficiently accomplished.

Attempts to solve power transmission problems and achieve greater efficiency include U.S. Pat. No. 4,751,398 issued to Ertz. Ertz describes a lighting system which converts 2 or 3 phase alternating current input to a direct current output. The direct current output is then distributed to several fluorescent lamp ballasts, which in turn drive fluorescent lamps. In addition, a battery backup system provides a DC power source to the fluorescent lamp ballasts in the event of AC power failure. While the AC power is operating, a battery charger maintains the power level of the battery.

U.S. Pat. No. 4,719,550 issued to Powell discloses a power conversion system dedicated to providing an uninterruptable power supply.

U.S. Pat. No. 4,590,546 issued to Maile discloses a circuit for providing a regulated DC voltage output from a wide range of AC inputs. The circuit relies on a voltage doubler to boost a low AC input level, and a full wave rectifier when the AC voltage is higher.

U.S. Pat. No. 4,538,073 issued to Freige discloses a power distribution system for use in desk top computers. The system provides a DC voltage to a number of remote modules which then regulate the voltage down to the required voltage level. Each of the remote modules are preselected for either 5 Volt or 12 Volt operation. All of the remote modules are driven by a common 33 kiloHertz (kHz) signal generator to force all of the remote modules to operate in unison and prevent feedback.

U.S. Pat. No. 4,961,130 issued to Kirchberg describes a pulse width modulation invertor which is intended to accommodate harmonic distortion through the use of "quick" or fast Fourier transforms.

SUMMARY OF THE INVENTION

It is therefore an object of the present invention to provide a power conversion system such as an AC to DC or AC to AC power conversion system which is extremely efficient and can operate from any input voltage or waveform to produce an output of any voltage or waveform.

It is another object of the present invention to provide a power conversion system and a power distribution system which provides an output voltage which is stable and remains substantially unaffected by load switching.

It is an additional object of the present invention to provide a power conversion system which can accommodate a fluctuation in line input voltage and draw on a back-up power source to continue to supply the required output power, voltage and waveforms.

It is a further object of the present invention to provide a power conversion system in which noise generated by a load or load switching does not affect or feed back to the distribution voltage, or the line input voltage.

It is a still further object of the present invention to provide a universal power supply and power conversion system for accepting waveforms having voltages as high as 200 to 600 volts AC, and frequencies over a broad range, including 50 Hz to 400 Hz, and which can provide a wide range of outputs, at comparable or different voltages, frequencies or as direct current (DC), single phase or multiple phase, and the like.

It is an additional object of the present invention to provide a power conversion system which can be arranged with a number of output modules, each module of which has the foregoing characteristics, such as having the capability of providing one or more output waveforms, each of which may be AC or DC, have a variety of voltages, a variety of frequencies or DC and which may remain distinct or may be combined to provide an enhanced waveform at the output.

It is another object of the present invention to provide a power conversion system which may provide battery or other storage backup.

It is an additional objection of the present invention to provide a power conversion system which can be controlled through microprocessor commands and which may be modified by a user through the microprocessor control, such as by a suitable communications mode, such as an RS232 connector, modem or the like.

It is a still further object of the present invention to provide a universal power supply which would include one or more power conversion units, one or more power distribution units and a microprocessor control and monitoring unit for the power conversion and power distribution units.

To accomplish one or more of the foregoing objects, the present invention provides a power conversion system having an input and an output and including a direct current to alternating current converter for accepting a waveform based on an input waveform from the power input and converting the waveform to an AC waveform having a frequency at least approximately an order of magnitude higher than the frequency of the input waveform for application to a DC/AC converter output. An AC converter is provided for accepting the output waveform from the DC/AC converter output and providing a converted waveform from an output of the AC converter to the power output. A coupling device operates at the frequency of the converter output for coupling the output of the DC/AC converter to the AC converter. With the foregoing system, waveforms having a wide range of voltages, phase relationships and frequencies can be accepted for providing output waveforms having a similar variety of voltages, phase relationships, frequencies and waveforms, including direct current output.

In one form of the invention, an AC to DC converter accepts the input waveform and converts it to a direct current waveform prior to applying the waveform to the direct current to alternating current converter. The AC to DC converter preferably operates at a very high frequency and, in the preferred embodiment, includes an inductance input filter network having adjustable components for operating at various frequencies and at various voltages, a switching network efficiently converting the incoming AC signal to an output DC signal, and preferably includes control circuits for the switching network having feedback for optimizing the operation of the switching network. According to one aspect of the present invention, the AC to DC converter has a very small size, is very efficient, has an essentially unity power factor, and is transparent to frequency and voltage variations. Also preferably, the AC to DC converter can operate in a hysteresis modulation mode and preferably operates to minimize the difference between the real power and the apparent power in the circuit.

In another preferred form of the invention, the AC converters for the output are arranged in modules, the power conversion system having one or more modules. In the case of multiple modules, each module may service different components or devices, or may service a single component or device. A given module would preferably contain a plurality of AC converters, such as AC to DC converters, AC to AC cycloconverters or other devices for providing an AC output. The AC converters would be able to provide any number of waveforms, including AC or DC, any number of frequencies, any number of voltages and may provide single phase output or may be combined to provide multiple phase output. The AC converter circuits in each module are preferably coupled to a switching matrix controlled by a microprocessor for selectively connecting one or more outputs of the AC converters to the device or devices being serviced.

The AC converters of the present invention will provide output waveforms with very little or no ripple, and the circuits provide very low transients, fast recovery and are very small in size.

In a further preferred form of the invention, the coupling device coupling the output of the DC/AC converter to the AC converter is a high frequency transformer which, among other things, isolates the input from any ground circuits on the secondary side of the transformer.

One aspect of the present invention preferably employs a high voltage switching network to generate a direct current (DC) distribution voltage from a one or more phase alternating current (AC) supply. This circuitry is preferably solid state, and does not employ a transformer. In one embodiment, the system provides a feedback loop which monitors the DC distribution voltage and selectively enables switching elements to select a desired input phase in order to maintain the DC distribution voltage. The feedback network executes arithmetic functions in order to select a switching time that substantially eliminates a current component which is perpendicular to the voltage vector at the switching time.

The present invention can be operated without a feedback loop and in an open loop configuration at high frequencies.

DESCRIPTION OF THE DRAWINGS

FIG. 5A shows the voltage waveforms outputs from various components as detailed in the block diagram of FIG. 3.

DETAILED DESCRIPTION OF THE PREFERRED EMBODIMENTS

The present invention provides a power conversion system capable of operating as a universal power supply operating with a very high efficiency, essentially unity power factor, small size and which is transparent to frequency and voltage variations and which can provide output waveforms of many different frequencies, voltage levels and phase relationships. The system can also provide DC output. The system may also be controlled by a suitable microprocessor. Applications where one type of current or voltage is to be converted to another are particularly suited for the present invention. For invention can accept invention can accept, as an input, AC voltages of either single phase or multiple phase form at any number of voltages, such as 208 volts, 480 volts or other voltage levels, at any number of frequencies, and can convert the waveforms to AC at any other phase, frequency and level, such as 3 phase or single phase voltage at any level, or to a DC waveform. The invention can accomplish these results using circuits which are very small, very efficient and with very little harmonic distortion to utility company lines. Additionally, the invention can be used in conjunction with a microprocessor to provide real time control of the conversion process, and to permit a wide range of applications using one set of circuits, simply by adjusting the circuit to the characteristics of the input.

Figure 1:
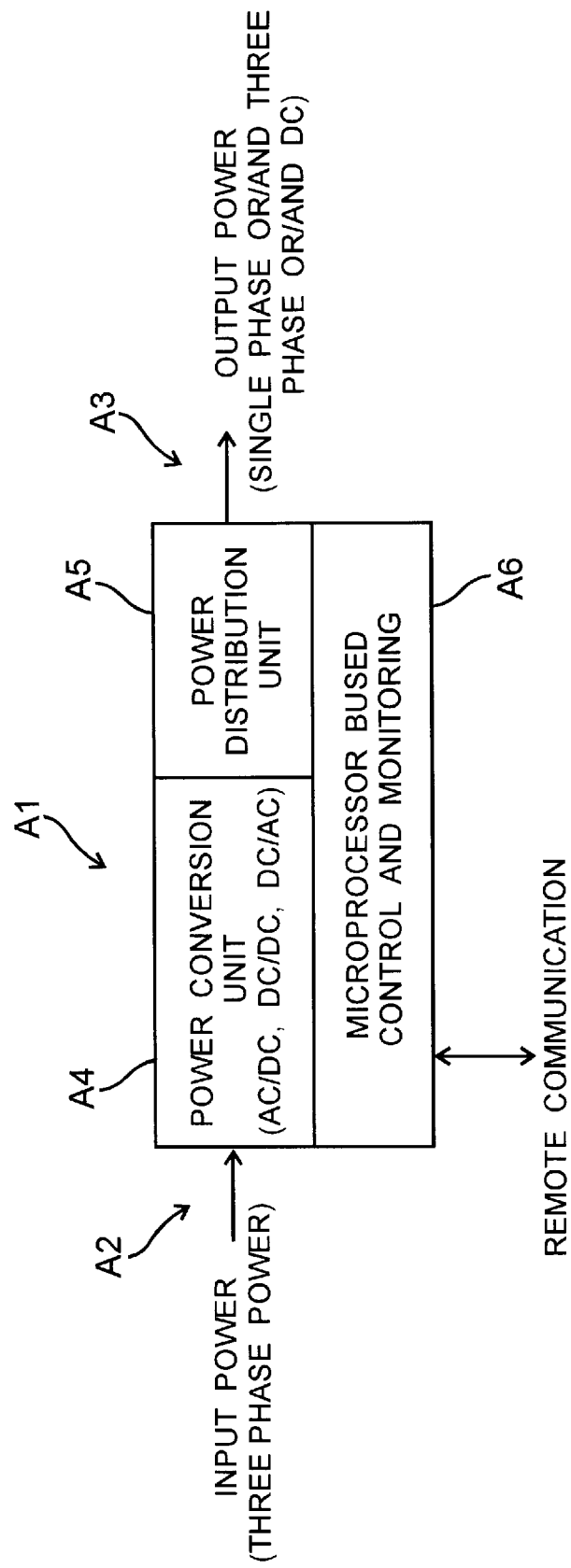
FIG. 1 is a schematic block diagram of a power conversion system.

Considering the power conversion system of the present invention, the power conversion system A1 (FIG. 1) includes a power input A2 for accepting a waveform at a given power level and frequency. For example, the input power level may be a three phase power waveform at 60 Hz and 208 volts. A power output A3 provides an output waveform at a second given power level such as DC, single phase or multiple phase AC at a given frequency and voltage. The system further includes a power conversion unit A4 for converting the input waveform to the output waveform and preferably includes one or more AC to DC converters DC to DC or DC to AC converters, as described more fully below. The output of the various converters are applied separately or in combination to the output through operation of a power distribution unit A5 under the control of a microprocessor based control and monitoring unit A6. The power distribution A5 preferably includes a high power switch network, such as a power semiconductor switch network or suitable electromechanical switch network, as would be known to those skilled in the art. The switch network would be coupled to the output circuits of the power conversion unit A4 to provide one or more outputs at A3, as desired, depending on component or device number on the output, load demands and the like. For example, the system may be a power conversion system for a building or floor with many loads and diverse requirements, or a system dedicated to a single component, either having diverse load requirements or only one or a few load requirements. The microprocessor control and monitoring unit A6 can be used for any number of functions. Exemplary functions include monitoring input waveforms, internal circuit line parameters such as current, voltage, waveform and harmonics, feedback and the like, to optimize the operation of the power conversion unit. The microprocessor functions may also include processing of the signals from the power conversion unit A4 and providing feedback to the unit A4 to adjust the operation of power conversion unit for optimization. Similarly, the microprocessor unit A6 may monitor the operation of the distribution unit A5 as well as any load devices to properly service the load requirements. The microprocessor unit A6 will typically control the power distribution switch network to provide the proper output to the proper load at the required level and form. The microprocessor unit could take any number of forms, as would be apparent to those skilled in the art. In the preferred embodiment, the microprocessor may be accessed through a remote communication or direct link such as through an RS232 connection or a communications network.

Significant features of the present invention are found in the power conversion unit, described more fully below. Power distribution units are well known, many of which may be configured to operate with the power conversion units described herein. Additionally, microprocessor control and monitoring can be readily accomplished by one skilled in the art after considering the details of the power conversion unit described more fully herein. The details of the power conversion unit A4 will now be considered in more detail below.

Effective power conversion systems convert incoming electrical energy to a desired distribution waveform and voltage level. The illustrated embodiments discuss a three-phase alternating current input source operating at 60 Hz for U.S. operation. The system can readily operate at 50 Hz for overseas operation in those countries operating at 50 Hz. Similarly, the three phase nature of the illustrated embodiment can readily operate with a two phase, single phase or a four or more phase operation by using appropriate component values, or feedback loops in another preferred embodiment.

A power conversion system may convert alternating current (AC) to direct current (DC). One embodiment of the present invention places an impedance between the incoming AC power and a series of switching elements which are selectively enabled to convert the incoming AC signal to a DC output. The present invention is usable for any number of different phases of incoming AC power. The switching elements in one preferred embodiment are switched on and off at a rate of approximately 8 kHz during the appropriate portion of the incoming AC waveform in order to prevent undue loading of any single phase. The impedance located between the incoming AC waveform and the switching elements provides energy storage of the incoming AC signal which can be tapped by activating the switching elements. In another preferred embodiment, a feedback network is added and the switching elements are turned on and off in order to maintain the required output voltage. The switching rate of the switching elements may depend on the particular load and load switching. These embodiments are discussed in detail below with respect to FIGS. 3–4J.

Figure 2:
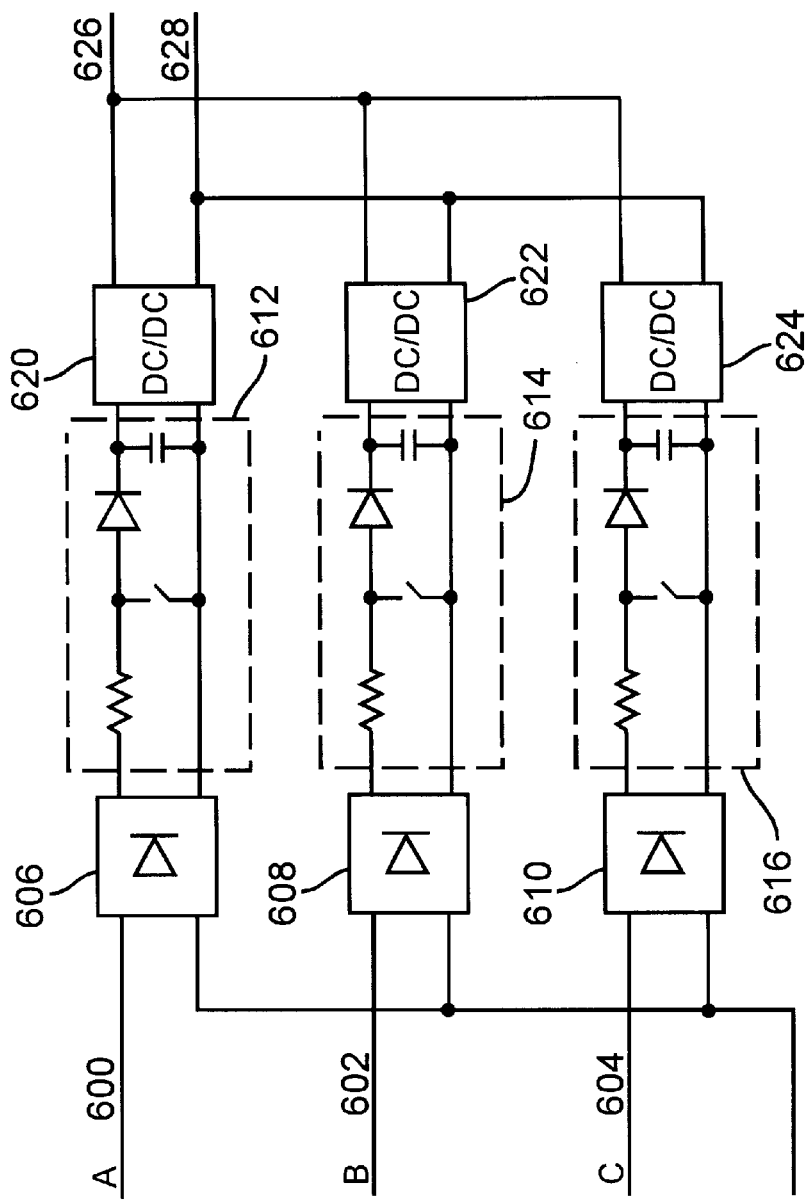
FIG. 2 shows a block diagram of a possible power distribution system.

A basic power conversion device may employ the configuration shown in FIG. 2. Each of three phases of incoming power 600, 602 and 604 are each individually rectified or converted to a DC waveform by rectifiers 606, 608 and 610, respectively. The DC signal is then passed through a filter network 612, 614 and 616 to create a distributed DC voltage. DC to DC converters 620, 622 and 624 provide a step up or step down of the voltage level and combine to increase the power output of the DC signal output across lines 626 and 628.

In accordance with the teachings of the present invention, a more sophisticated power distribution system (FIG. 2A) may be used in conjunction with a single phase or multiphase AC power represented by $\phi_1$, $\phi_2$ and $\phi_3$ which are input to AC to DC converter 512 on lines 514, 516 and 518, respectively. A ground or neutral may also be input to the AC to DC converter 512. The DC output of AC to DC converter 512 is transmitted to a DC bus, such as across lines 520 and 522. Depending on the particular configuration of AC to DC converter 512, neither lines 520 or 522 may represent a ground level. This is not a drawback, however, because the voltage across lines 520 and 522 is the transmitted DC waveform, and not the voltage between line 520 or 522 and ground.

Figure 2A:
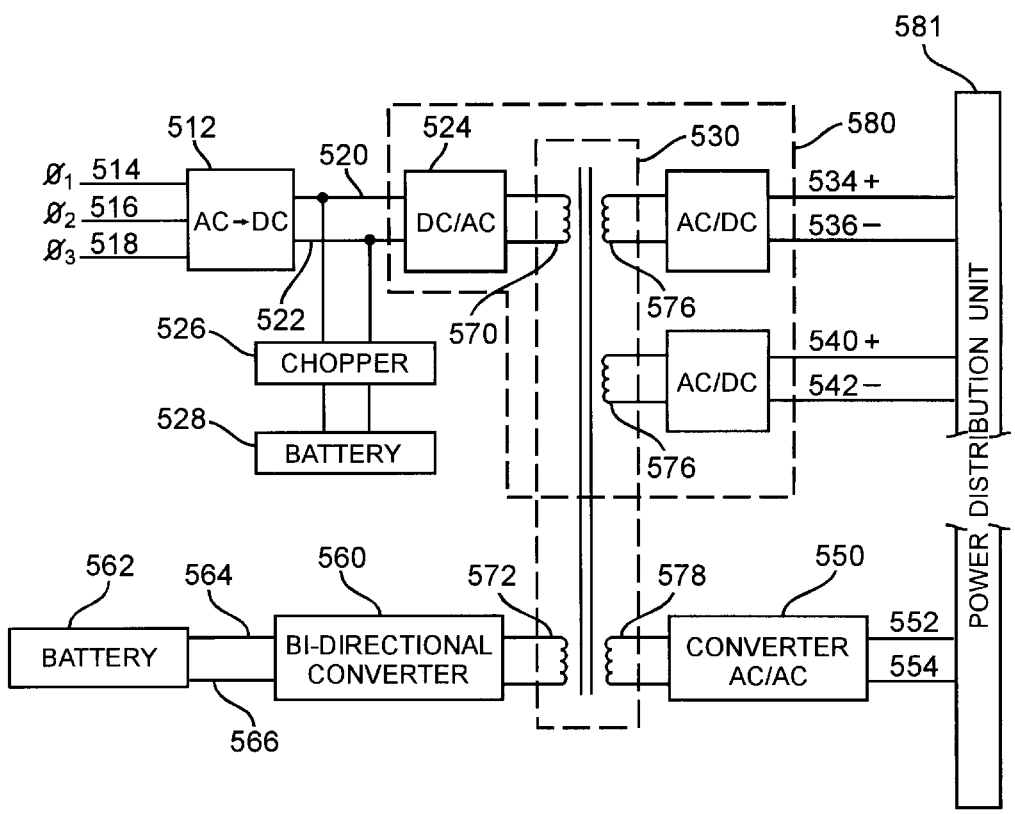
FIG. 2A is a block diagram of an embodiment of the power distribution system of the present invention.

The DC bus may provide DC input to one or more modules, designated 580 in FIG. 2A, which may be considered DC to DC or DC to AC converters. Each module may contain a DC to AC converter, a high frequency transformer and a number of AC to DC or AC to AC converters, the converters being termed, generally, AC converters. The outputs of the AC converters then represent the power output waveforms which may be applied separately or combined and applied to external devices. A number of modules can be driven off the DC bus from the AC to DC converter 512.

The DC voltage level across lines 520 and 522 also can be connected to a chopper circuit 526 and battery backup 528. The chopper circuit 526 provides charging of the battery backup 528 while AC power is being provided to the AC to DC converter 512. If the AC power fails, the chopper circuit reverses, and drives the DC lines 520 and 522 with power supplied by the battery backup 528. In some configurations, it may be desirable to activate chopper circuit 526 to provide power from battery backup 528 in the event that the incoming AC power is reduced or lost, to provide sufficient power to operate the load. This is preferably only be done on a temporary basis as the battery backup could be severely depleted or lost while supplementing power which would normally be supplied by the incoming AC power.

In accordance with the teachings of the present invention, the DC signal present across lines 520 and 522 is converted into other waveforms, and including other DC levels or to an AC voltage by first converting the DC signal to an intermediate AC signal. Preferably, the intermediate AC signal is at a sufficiently high frequency above that of the input waveform to improve the efficiency and power factor. The intermediate AC signal is then converted into one or more output DC signals, or one or more output AC signals as required. In addition, the intermediate AC signal can be used to drive a bidirectional converter to supply battery backup for the power conversion system, as discussed more fully below.

In one embodiment, the voltage across lines 520 and 522 is 408 Volts DC. DC to AC converter 524 is preferably formed of a switching matrix to provide a high frequency AC signal. The preferred operating frequency is approximately 50 kHz or higher, although lower frequencies will suffice. Power transfer through the intermediate AC signal is more efficient at higher frequencies. DC to AC converter 524 drives the primary winding 570 of transformer 530. A secondary winding 574 connects the intermediate AC signal to AC to DC converter module or submodule 532 which provides a predetermined DC voltage across lines 534 and 536 to a dedicated output or to a switching matrix 581, equivalent to power distribution unit A5 of FIG. 1.

Additional secondary windings 576 connect the intermediate AC signal to other submodules such as AC to DC converter 538 which may provide a predetermined DC voltage level across lines 540 and 542, or, like submodule 532, may be programmable, providing a variable voltage level across lines 540 and 542. The additional secondary windings 576 may couple respective AC to DC or AC to AC converters, as desired.

Alternatively, outside of module 580, further secondary winding 578 of transformer 530 may be connected to a conventional AC to AC converter 550. For example, the AC to AC converter may be a conventional cycloconverter which will generate a desired AC output waveform, which typically will be of a substantially lower frequency than the intermediate AC signal. Waveform frequencies of 50, 60 or 400 Hz are typical. The AC output waveform is provided across lines 552 and 554 of cycloconverter module 550. A capacitor filter 550A (FIG. 16) may be added to reduce any high frequency transients in the incoming AC power.

An additional secondary winding 572 can be added to connect the intermediate AC signal to a bidirectional power converter 560 which provides a DC output across lines 564 and 566. The DC output across lines 564 and 566 can be used to charge battery backup 562. The bidirectional power converter 560 may be rapidly reconfigured so that power drawn from battery backup 562 can be routed across lines 564 and 566, and secondary winding 572 can provide input power to transformer 530, thus acting as a primary winding.

Additional secondary windings can be added as desired in order to generate all of the desired waveforms from the intermediate AC signal. The number of outputs attached to the power distribution unit will typically be determined by the power factor limitation. As with conventional systems, the power input equals or exceeds the power output. While the efficiency of high frequency intermediate AC signals is high, the efficiency factor is still approximately 93 to 95%, thus requiring that the input power be approximately 5 to 7% greater than the output power desired. This power factor must take into account any inefficiencies in the AC to DC converters, cycloconverters and other power conversion devices, which may be added to the system.

There are several embodiments of AC to DC converter 512, shown or represented in FIGS. 3 to 7, and several preferred embodiments of a DC to DC converter 580, are shown or represented in FIGS. 8 to 15, as described more fully herein.

The present invention is usable for any number of different phases of incoming AC power and the power converters may be operated in a fixed frequency mode or hysteresis mode. Feedback is preferred for most applications envisioned, and there are several types of feedback which may be employed including pure demand based on the DC output voltage, and demand as modified to accommodate the instantaneous phase of the incoming AC power.

In fixed frequency mode for the AC to DC converter 512, the switching elements in one preferred embodiment are switched on and off at a rate of approximately 8 kHz during the appropriate portion of the incoming AC waveform in order to distribute the load evenly among all AC power phases. Because the AC to DC converter 512 can operate at different frequencies, another preferred embodiment of the invention has the converter 512 operating at higher frequencies, such as about 18 kHz, which permits use of smaller components and higher conversion efficiencies. A line filter may be located between the incoming AC waveform and the switching elements to buffer the load from the incoming AC power and to provide adjustment of circuit values to accommodate different voltages, such as by providing multiple taps on inductors in the line filter.

Figure 3:
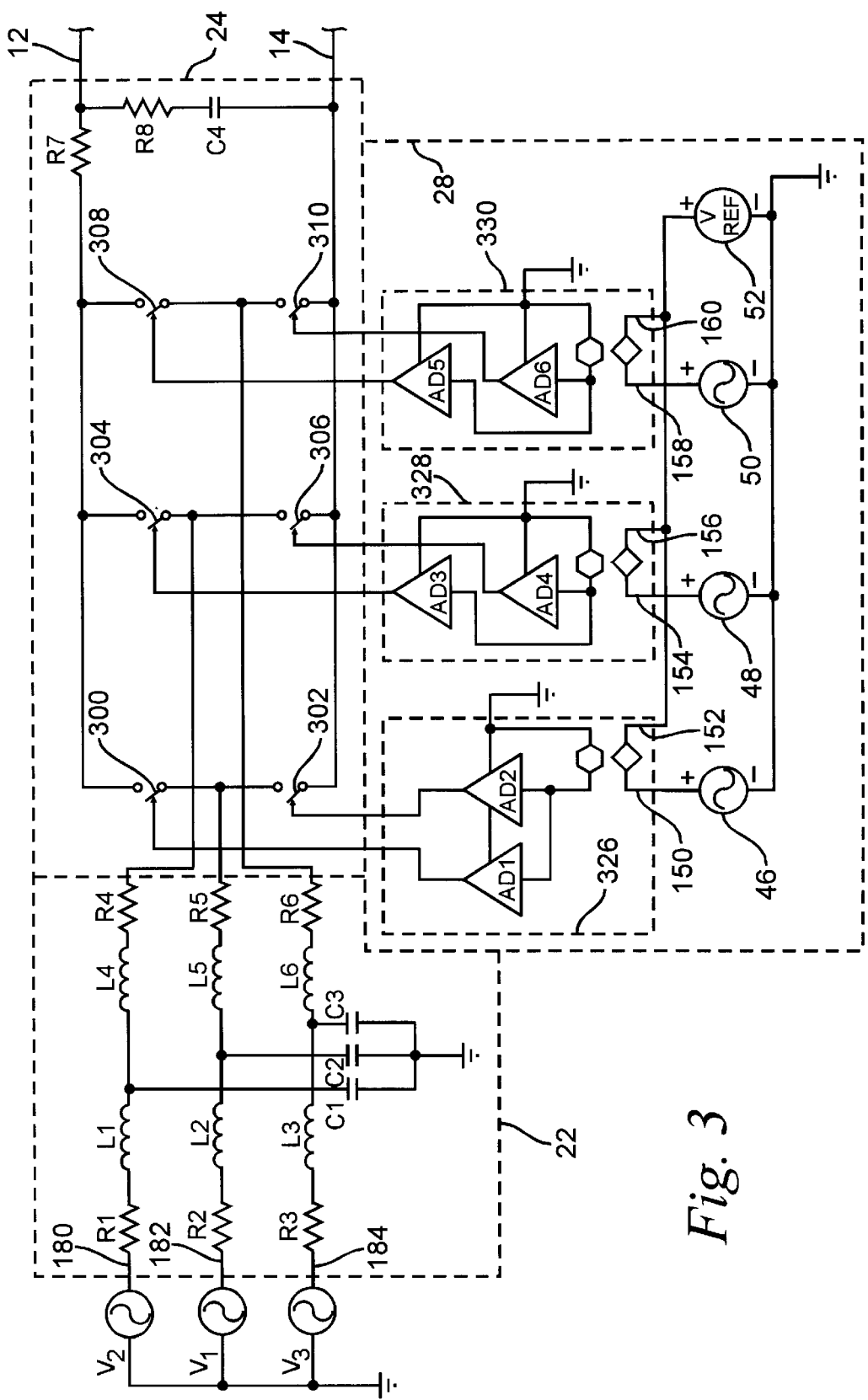
FIG. 3 is a schematic diagram of an embodiment of the AC/DC power conversion system of one aspect of the present invention without a feedback loop.
Figure 4:
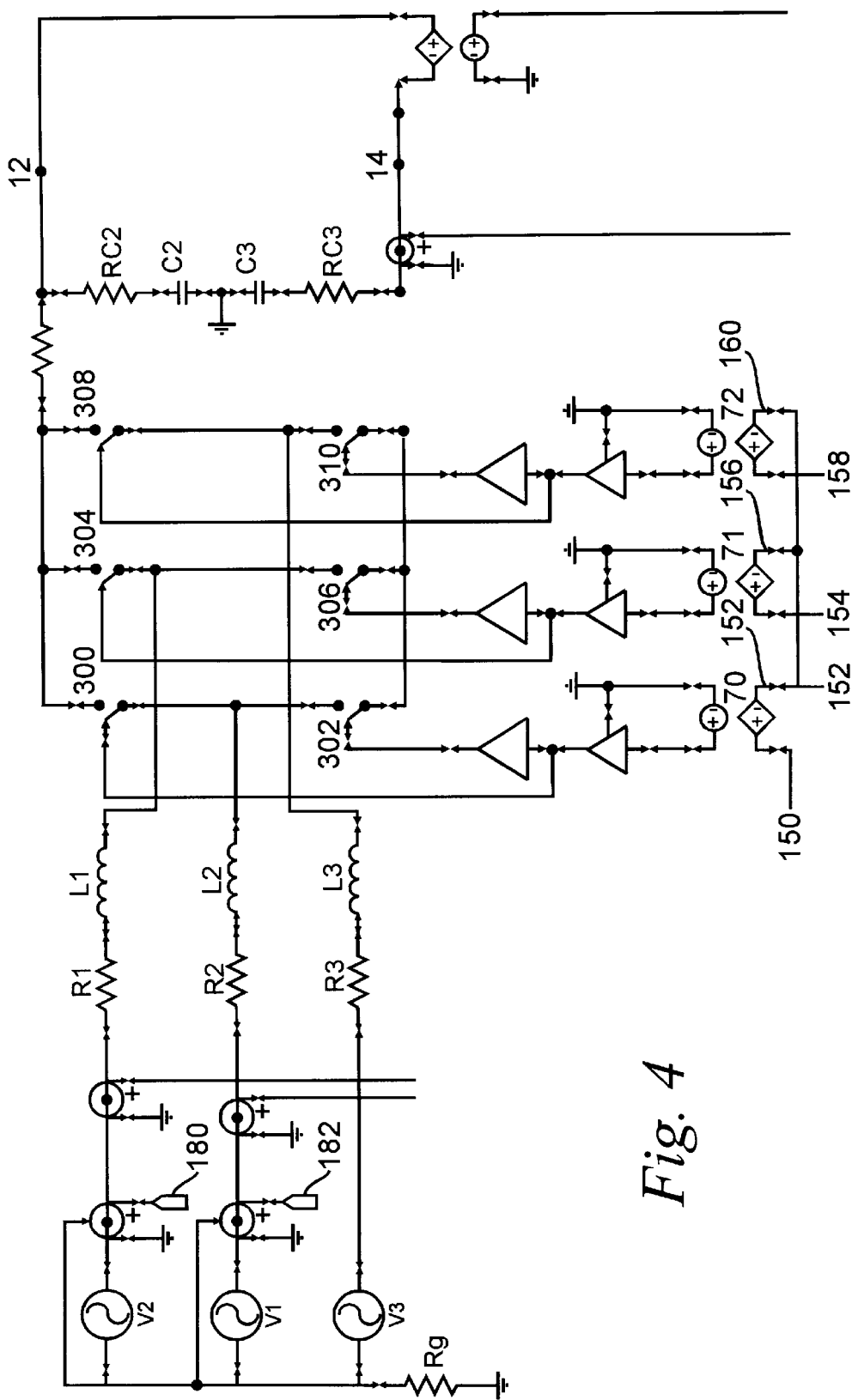
FIG. 4 is a schematic showing a further embodiment of an AC/DC power conversion system suitable for free running or for feedback.

The embodiment of the converter 512 shown in FIG. 3 may operate in a fixed frequency mode circuit. A three-phase input is shown labeled V1, V2 and V3 connected to a line filter 22 consisting of a series resistance and inductance network in association with a parallel capacitance network employed in association with each of the incoming phases of the power source, V1, V2, and V3.

Line filter 22 shifts the phase angle at which the load is applied to the incoming power sources, V1, V2 and V3. In one embodiment of the converter operating at a rated power of 15 kilowatts, L1, L2 and L3 are each 50 microHenri ($\mu$H) inductors, and L4, L5 and L6 are 100 $\mu$H inductors. In this configuration, C1, C2 and C3 are each 31.77 microFarad ($\mu$F) capacitors. Resistors R1, R2 and R3 indicate the small signal resistance of inductors L1, L2 and L3, respectively and are approximately 0.005 Ohms each. Similarly, resistors R4, R5 and R6 indicate the small signal resistance of inductors L4, L5 and L6, respectively and have approximately the same resistance as resistors R1, R2 and R3, namely 0.005 Ohms. Line filter 22 is balanced to accommodate the switching frequency of the switching elements in 300, 302, 304, 306, 308 and 310, described below. The above values are calculated for a pulse frequency of 8 kHz, but the values will be different, as would be apparent to one skilled in the art, for different frequencies, such as 17.857 kHz and a different rated power. The converter operating at 8 kHz using the above circuit values achieves approximately a 1.2 degree phase shift. Different voltages can be accommodated by using inductors having multiple taps, which may be selectively used, such as by microprocessor control.

Switching matrix 24 is connected to the output of line filter 22. Switching matrix 24 provides highly efficient conversion of the supplied power waveform to a DC voltage which is then output on DC bus lines 12 and 14. Switching matrix 24 consists of a pair of complementary switch elements for each phase of power supplied by V1, V2, and V3.

Each of the switching elements, 300, 302, 304, 306, 308, and 310 are electronic switching devices preferably in the form of an isolated gate bipolar transistor (IGBT) with an associated snubber circuit. The switching elements may include a snubber circuit as shown in FIG. 4C in conjunction with an IGBT. In the embodiment of FIG. 4C, diode DI1 prevents a reverse, or negative voltage from being applied across the IGBT and provide a current path for reactive current components. Capacitor Cap 1 is approximately 0.01 microFarad. Other suitable devices for this application include, for example, an MCT (MOS Controlled Thyristor) or a MOSFET for lower power applications.

The AC to DC converter circuit 512 can be configured to accommodate a wide range of frequency of power supply voltages single or three phase voltage, and a wide range of input voltage levels. The selection of the switching element of switching matrix 24 should be adjusted to accommodate a higher or lower voltage and, depending on the frequency selected, the inductive tap on the input filter of line filter 22 should be adjusted.

Figure 7A:
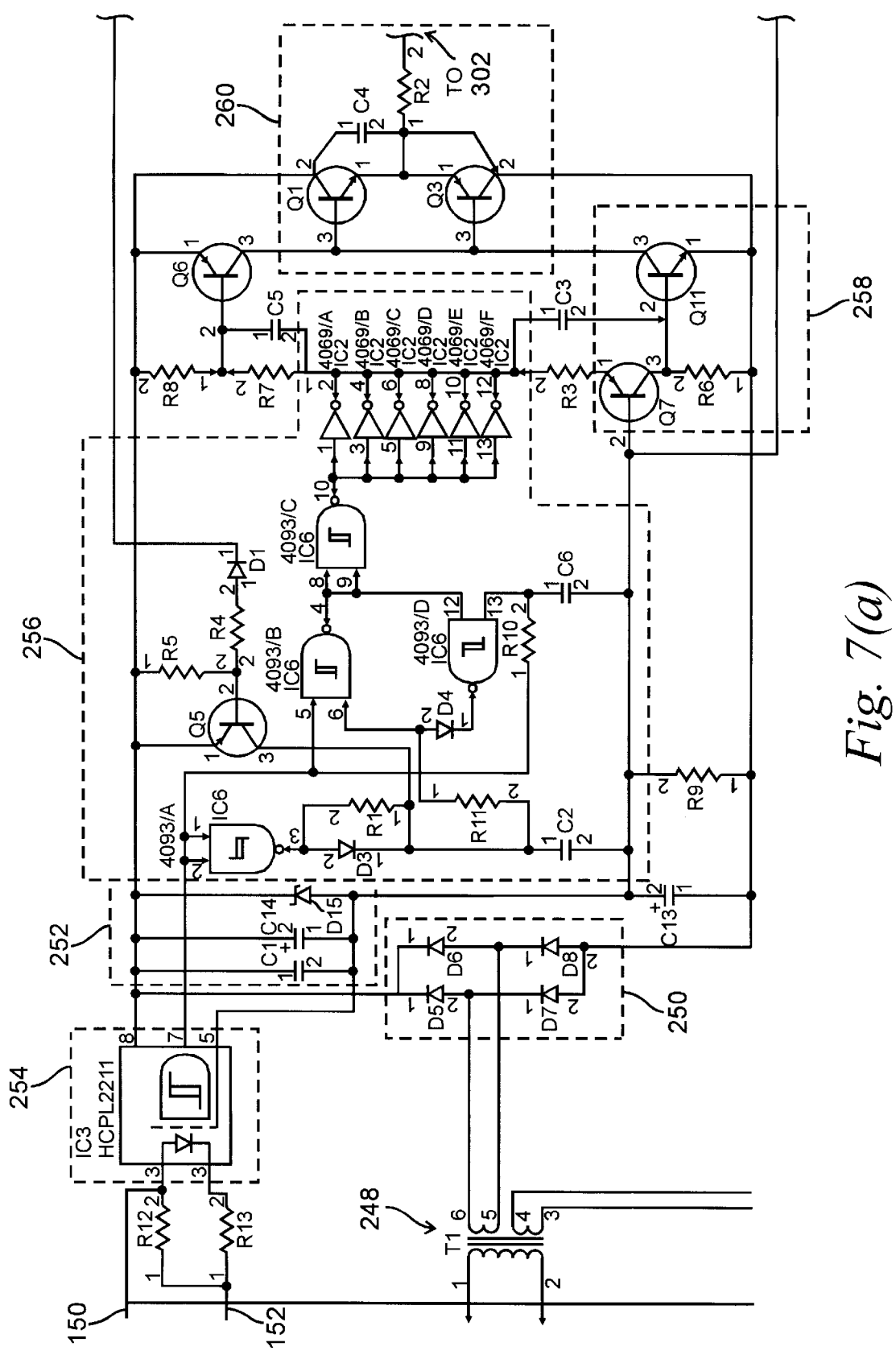
FIGS. 7A and 7B illustrate an embodiment of a switching element controller for the AC to DC converter according to another aspect of the present invention.
Figure 7B:
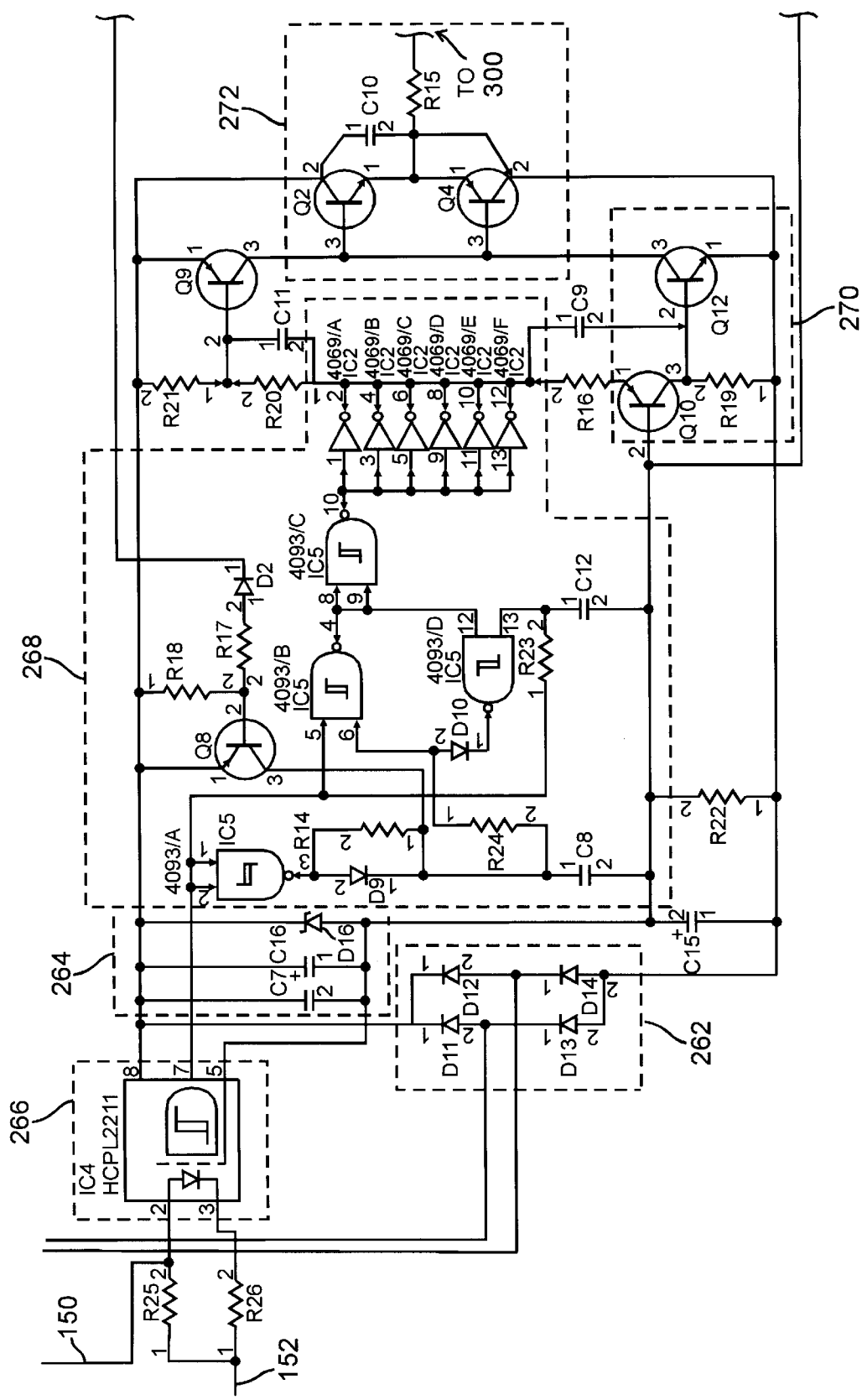

In the switching matrix 24, a first switching element 300, and a second switching element 302 regulate the power delivered by the first phase(V1). When switching element 300 is closed, the electrical energy delivered by source V1 is switched to a positive DC output line 12. When switching element 302 is closed, the electrical energy delivered by source V1 is switched to the negative DC output line 14. As can be appreciated, it is undesirable to have both switching element 300 and 302 enabled at the same time. Doing so would present a short circuit between the positive DC line 12 and the negative DC line 14. To avoid this, switching elements 300 and 302 are driven by switch control circuit 326 in a driver circuit 28. Similarly, switching elements 304 and 306 are driven by switch control circuit 328, and switching elements 308 and 310 are driven by switch control circuit 330. A more detailed illustration of an embodiment of switch control circuits 326, 328 and 330 is shown in FIGS. 7A and 7B.

The embodiment of the AC to DC converter shown in FIG. 3 illustrates the power processing portion of the power conversion and distribution system, including the switching device drivers. In this embodiment, there is no feedback from the DC output which controls selection of power source phases. To activate the switching elements 300 and 302 at an appropriate time, a reference signal is synchronized with incoming power source V1, such as by Hall effect sensors as discussed below. The synchronized reference signal generator 46 controls switching of power source V1 through switching elements 300 and 302. Similarly, reference signals 48 and 50 control switching of power through switching elements 304, 306 and 308, 310 for incoming power sources V2 and V3, respectively.

When a load is connected across DC output lines 12 and 14, the power processing portion of the circuitry, as shown in FIG. 3, can be driven in an open loop configuration. An oscillator and driver circuit 28 ensures that current loading of the supply lines is switched at regular intervals.

Command signal sources 46, 48, 50 and 52 are employed to control activation of switching elements 300, 302, 304, 306, 308 and 310. Command signal sources 46, 48 and 50 are each of the same frequency as the incoming AC power V1, V2 and V3, respectively. For a 60 Hz incoming AC signal, command signal source 46 will be a 60 Hz AC signal which is synchronized with the incoming AC power V1. Synchronization will occur with the incoming power, and not the phase delayed signal which has passed through line filter 22. Similarly, command signal source 48 is synchronized with incoming AC power V2, and command signal source 50 is synchronized with incoming AC power V3.

Command signal source 46 provides input signals to switch element controller 326 through a subtractor. Command signal source 46 drives input line 150 of the subtractor and command signal source 52 drives input line 152 of the subtractor. The subtractor may be comprised of an optoisolator, photo transistor, photo diode, op amp or other suitable device to isolate the input on lines 150 and 152 from the output which drives buffers AD1 and AD2. Buffers AD1 and AD2 drive switching elements 300 and 302, respectively.

Command signal sources 46, 48 and 50 are synchronized with the incoming AC power for the phase the command signal source controls. Synchronization with the incoming AC power may be accomplished by Hall effect sensors such as Hall effect sensors S1, S2 and S3 as shown in FIG. 4(E) or Hall effect sensor S1 as shown in FIGS. 4(F) and 4(H).

Command signal source 52 is a triangle wave generator operating at a frequency of between 5 kHz and 25 kHz in one embodiment. A symmetrical waveform of between 8 kHz and 16 kHz is preferred. A frequency of 15 kHz has been employed in the embodiment shown in FIG. 3. Generally, the higher the frequency, the better the performance of the circuit. At higher frequencies, operation is more efficient because smaller increments of the voltage signal are used, because such components as are used to convert from AC to DC, such as filter 22, may be selected with more precision, and because there is a reduction in energy loss (except for non-semiconductor devices). The particular frequency selected depends on the characteristics of line filter 22.

Preferably, command signal sources 46, 48, and 50 produce sinusoidal signals and signal source 52 produces symmetrical triangle signals. The subtractor can be considered to be an analog to digital converter which switches to the "high" state for positive error and "low" state for negative error, between the sine wave 46 and the triangle wave 52. This makes it easier for buffers AD1, AD2, AD3, AD4, AD5 and AD6 to detect a transition above, or below, a desired threshold level. The analog to digital converters may also be thought of as threshold detectors. Command signal source 52 may also be driven with a DC bias or offset level, causing the switching matrix 24 to draw more power from either the positive or negative portion of the cycle of the incoming AC power. Switch element controllers 328 and 330 operate in a manner similar to switch element controller 326, but are connected to command signal sources 48 and 50, respectively. However, this open loop operation has limited use because of the changing input supply and loads, hence it is preferred that a feedback loop be implemented.

Figure 4A:
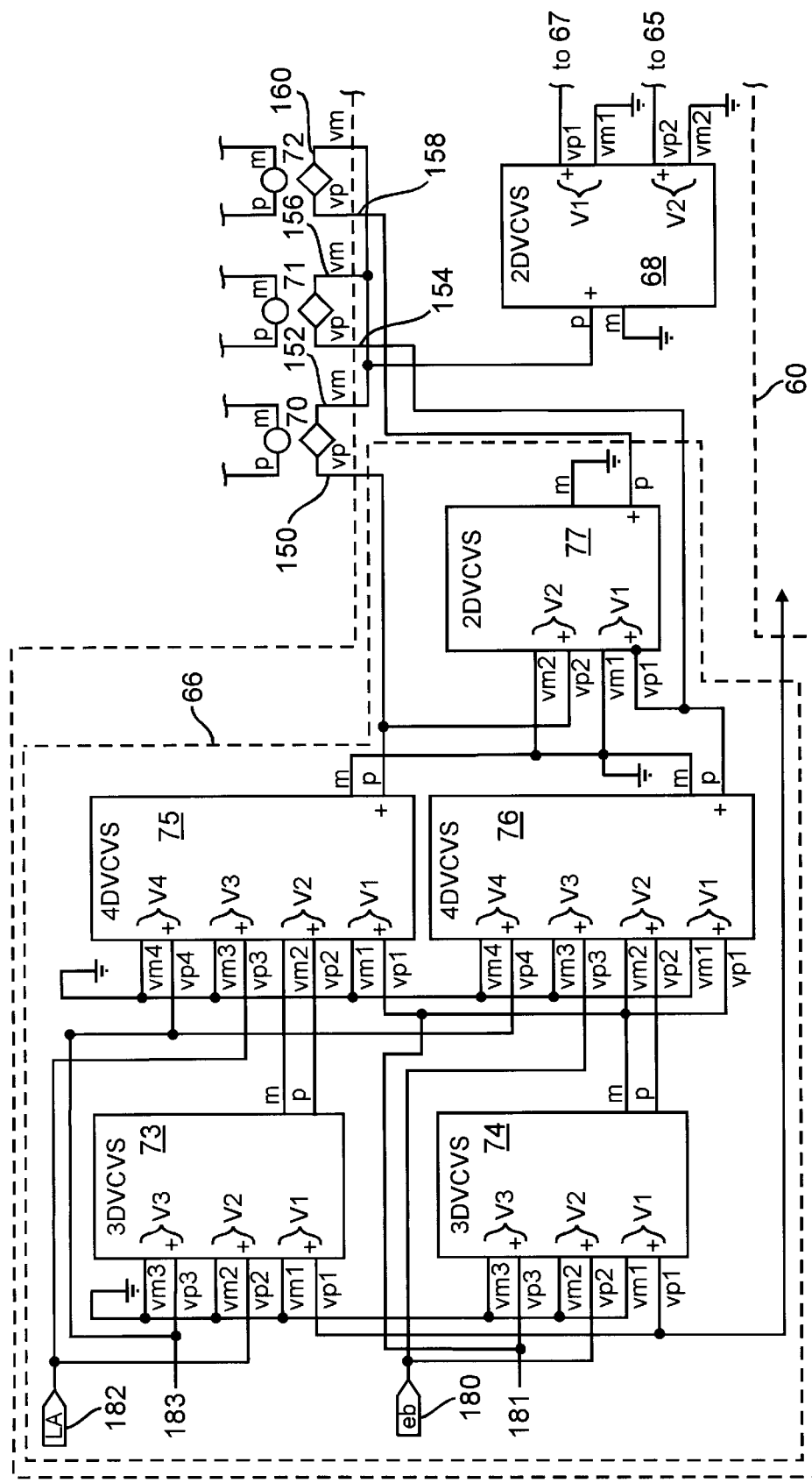
FIGS. 4A and 4B are schematic diagrams of an embodiment of a feedback loop which may be used with the AC/DC power conversion system.
Figure 4B:
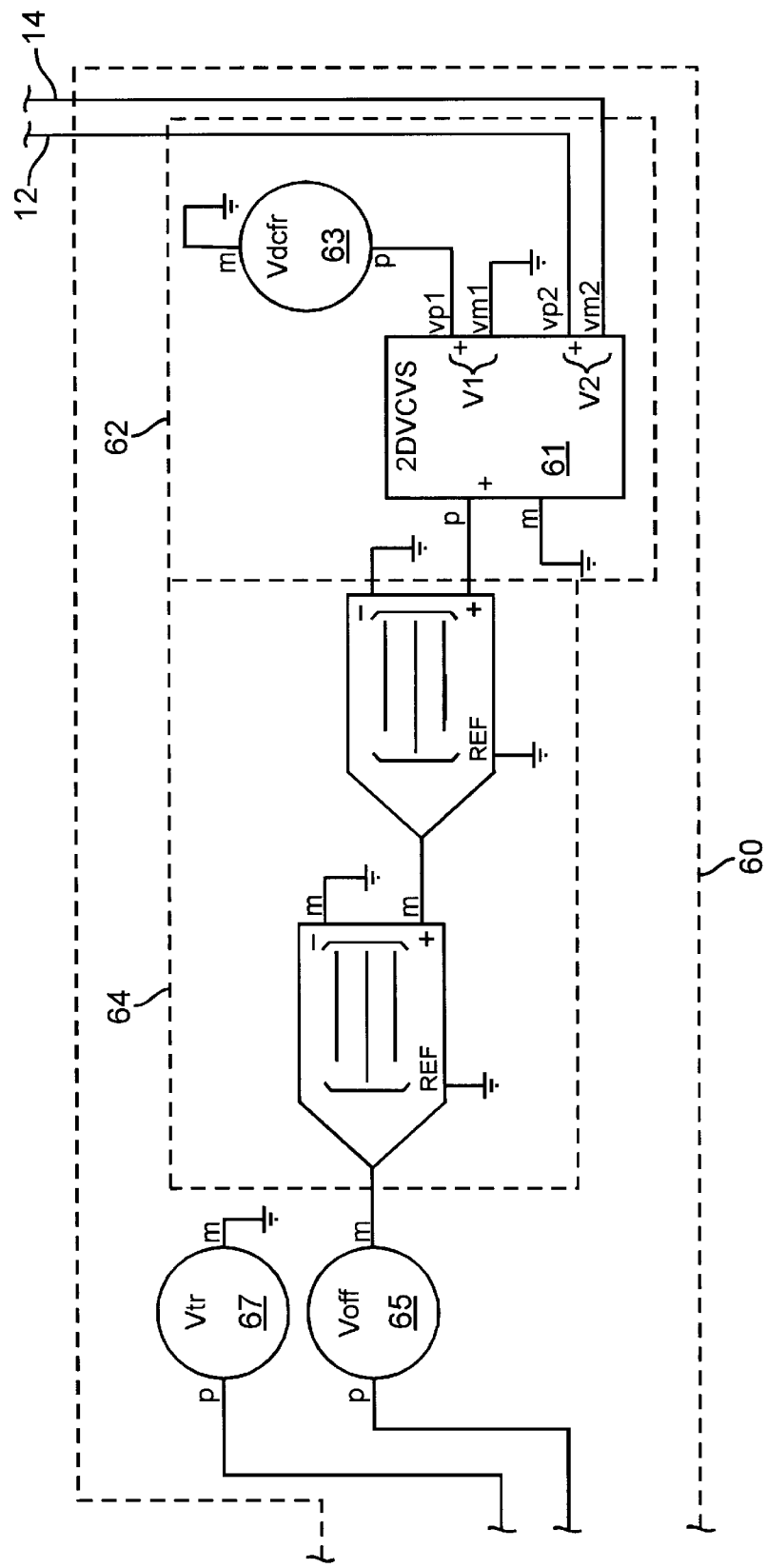
Figure 4C:
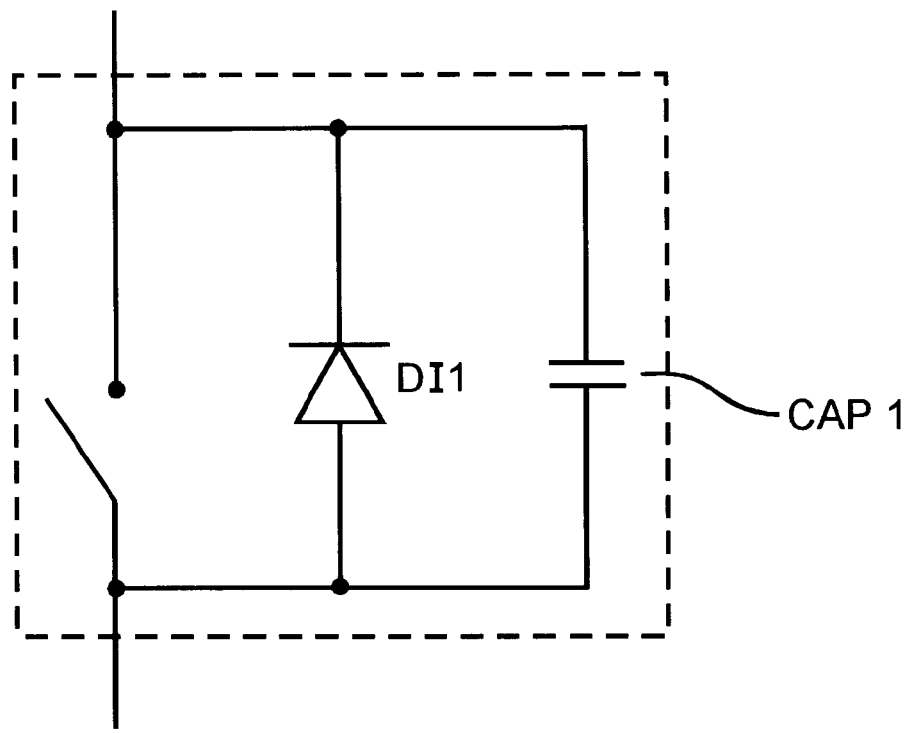
FIG. 4C is a schematic of a snubber network for use with a switch element.

One version of a feedback mode configuration is shown in FIG. 4A and FIGS. 4B and 4C. The DC signal output on lines 12 and 14 of FIG. 3 drives a feedback circuit 60 which replaces the individual command signal sources 46, 48 and 50 in FIG. 3. Feedback network 62 (FIG. 4B) consists of a subtractor 61 which outputs the difference between the signal output on lines 12 and 14 and the signal supplied by reference voltage source 63. The output of feedback network 62 drives controller 64 which evaluates the phase of each of the incoming power lines V1, V2 and V3, and determines the appropriate increase or decrease in voltage which is required.

The output of controller 64 is routed through a level shifter 65. Level shifter 65 is preferably an op amp and provides a 12.5 V level shift. A reference voltage source 67 is multiplied by the level shifted output of controller 64 by multiplier 68 (FIG. 4A). The output of multiplier 68 drives one terminal, preferably the negative input terminal 152, 156, and 160 of a driver matrix (which may include analog-to-digital converters) 70, 71, and 72, respectively. The function of the driver matrix 70, 71, 72 is similar to the subtractors in the driver circuit 28 (FIG. 3).

A scale-down buffer and phase shifter 66 monitors the phase and voltage of the incoming signal presented by V1 and with respect to neutral, and selects the appropriate switching elements of switching matrix 24 (FIG. 3) in order to connect the incoming AC power V1, V2 or V3 to best maintain the desired DC output level across DC output pins 12 and 14. In the embodiment shown, one phase less than the number of incoming AC signal lines are monitored (180 and 182). Alternative embodiments may be implemented which monitor all of the incoming AC signal lines.

Scale-down buffer and phase shifter 66 (FIG. 4A) is further comprised of a matrix of subtractor circuits 73, 74, 75, 76, and 77. Each of the subtractor circuits may be constructed using an operational amplifier with appropriate feedback. The operation of the subtractors is to sum the differential voltage applied to each of the inputs. For example, subtractor 73 has three sets of differential inputs, V1, V2 and V3. Each of the differential inputs has a plus and minus input leg, VP and VM, respectively. Subtractor 73 sums the inputs on VP1, VP2, and VP3, and subtracts the results from the sum of VM1, VM2, and VM3. Depending on the particular configuration of the operational amplifiers desired, the same result can be achieved by summing the differential voltage V1 with differential voltage V2, and differential voltage V3. The result is applied as a differential voltage output across the P and M terminals of subtractors 73.

Subtractor 74 is identical to subtractor 73. Subtractors 75 and 76 have an additional, fourth differential input voltage which is summed with differential inputs V1, V2, and V3. Similarly, subtractor 77 has only two inputs, V1 and V2. While most of the signal operations are performed on differential signals, for many of the signal inputs and outputs, there is a single driving line implementation, and the complementary component of the differential signal is ground. Care must be taken when grounding these inputs to ensure that fluctuations in the ground plane or noise propagating across the ground plane does not affect operation of the circuit.

Figure 4D:
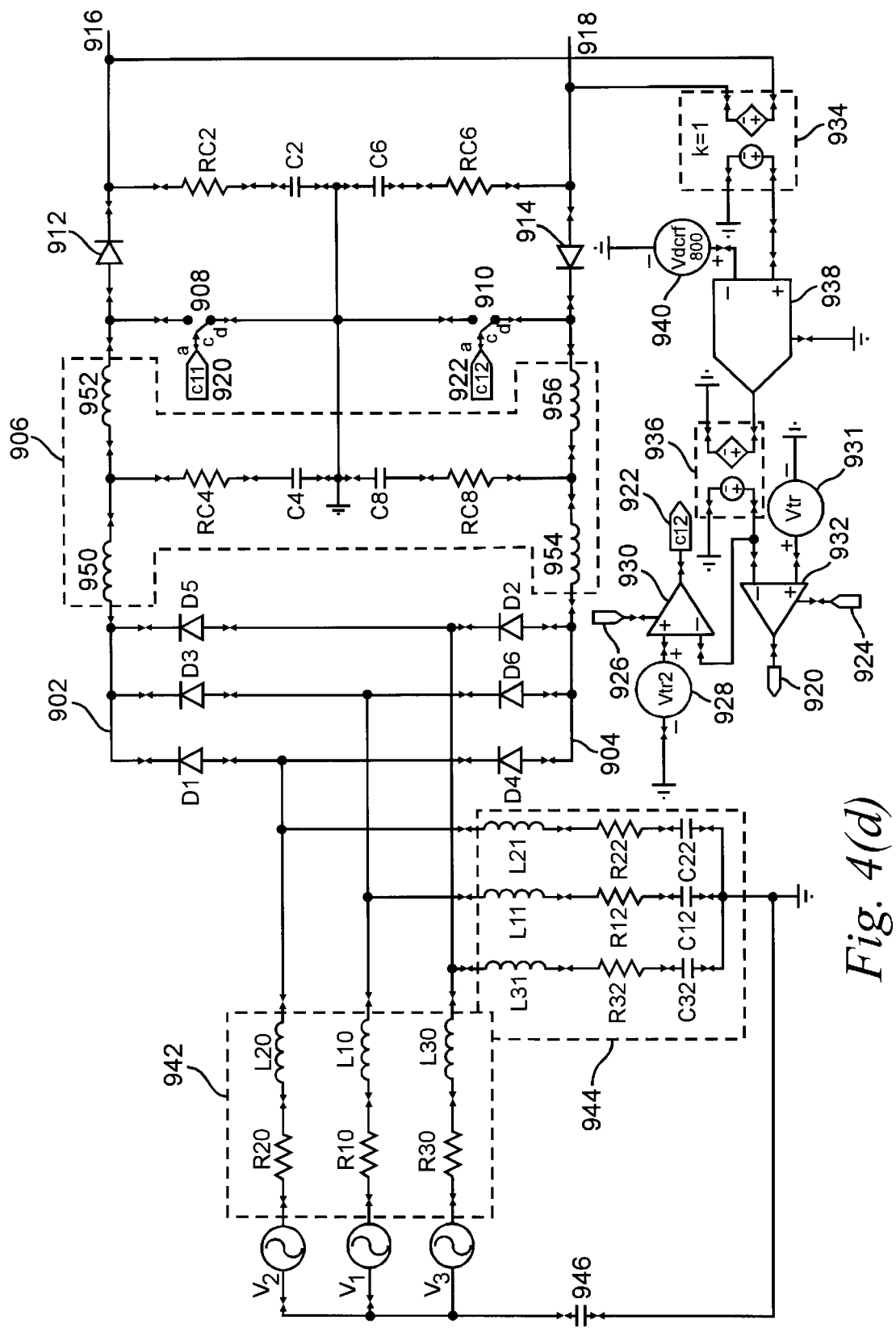
FIG. 4D is a schematic diagram of an embodiment of the AC/DC power conversion system of the present invention using a feedback loop.
Figure 4E:
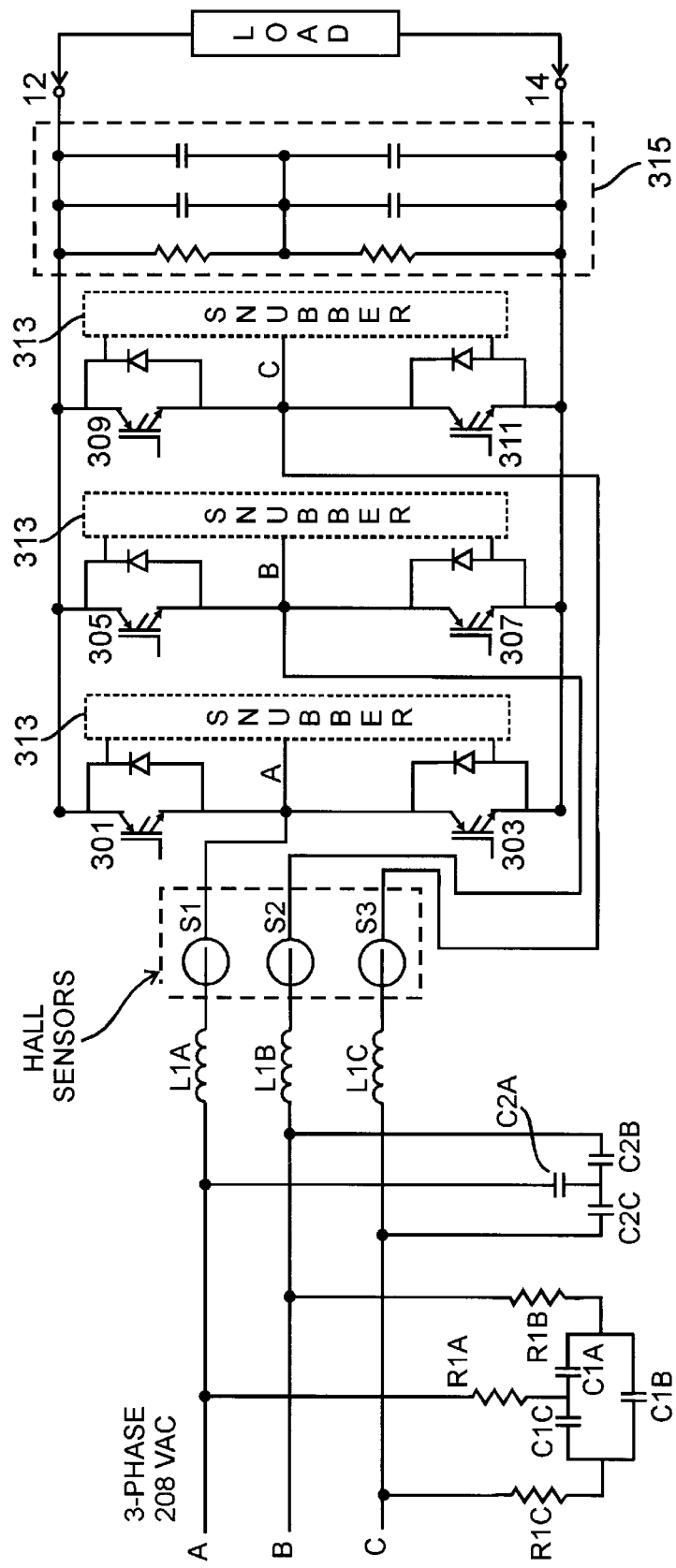
FIG. 4E shows an alternative embodiment of a three-phase AC to DC converter.
Figure 4F:
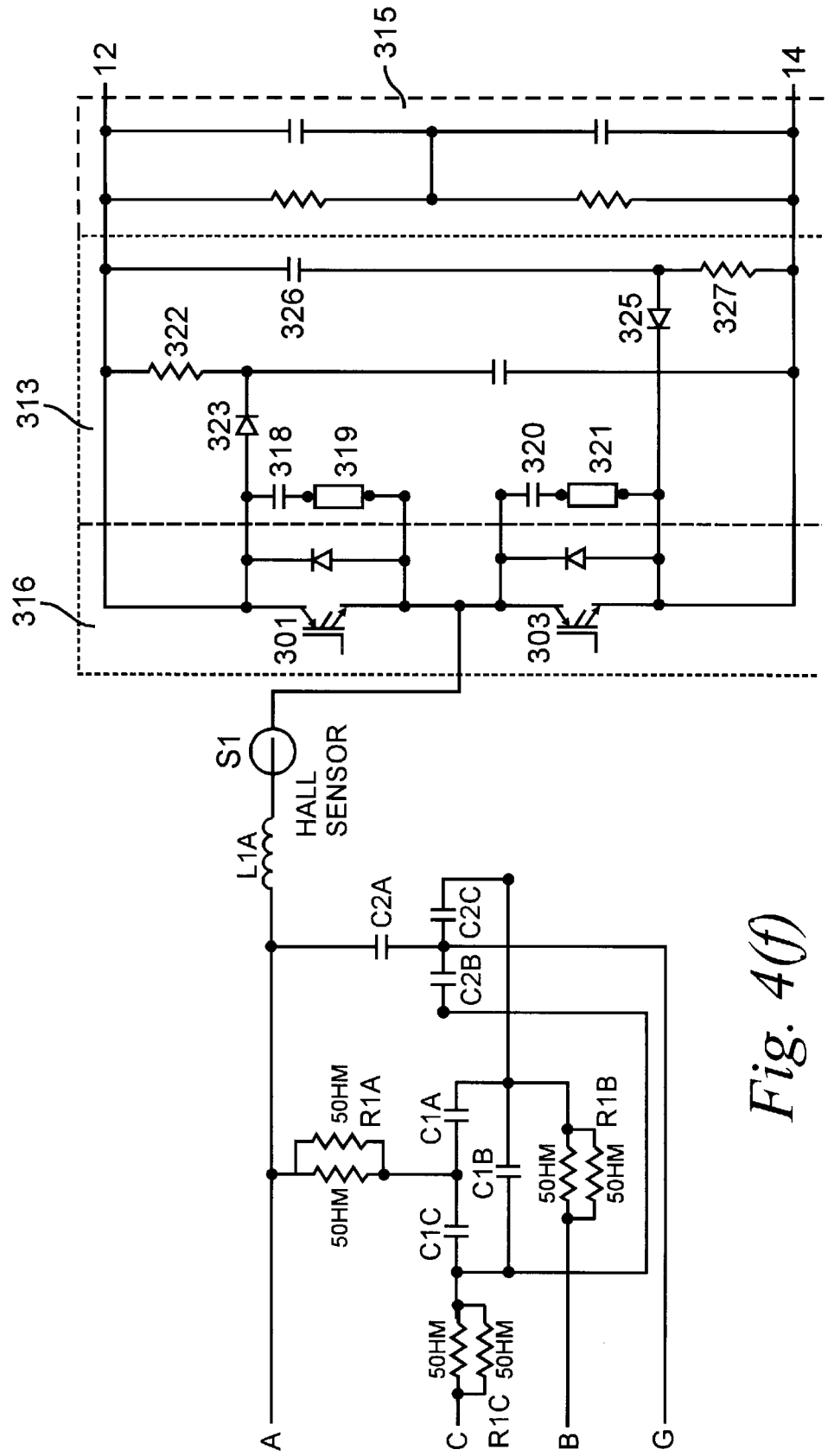
FIG. 4F shows the details of FIG. 4E.

Another embodiment of a feedback driven AC to DC conversion system is shown in FIG. 4(D). The configuration of the AC to DC power conversion system shown in FIG. 4(D) is also implemented for a 3-phase, AC input, represented by phases V1, V2 and V3. The incoming voltage phases may be passed through a passive filter network such as that shown in FIG. 3 as filter 22, comprised of series inductances L1, L2, L3, L4, L5 and L6 and capacitors C1, C2 and C3.

Alternatively, a modified passive filter 942 and 944 may be employed as in the configuration shown in FIG. 4(D). Passive filter 942 is comprised of resistors R10, R20 and R30 in series with inductors L10, L20 and L30, respectively. Passive filter 944 is comprised of inductors L11, L21, L31, resistors R12, R22, R32 and capacitors C12, C22 and C32, arranged as shown in FIG. 4(D).

The output of the passive filters 942 and 944 is directed into a full wave rectifier for each of the phases V1, V2 and V3. The full wave rectifier is formed by diodes D1, D2, D3, D4, D5 and D6. The output of the full wave rectifier is placed across lines 902 and 904 and is a floating or unreferenced, pulsed DC signal. This unreferenced, pulsed DC signal is then passed through a filter network 906 which smoothes the waveform on lines 902 and 904.

Diodes 912 and 914 provide clamping to ensure that no back EMF or reverse voltage is driven into the system, and the DC output from filter 906 is placed across DC output lines 916 and 918. Two switching elements 908 and 910 are alternately activated to regulate the load seen by the output of the full wave rectifier diode array, as described more fully below.

Output capacitors C2 and C6 are placed between output lines 916 and 918. Resistors RC2 and RC6 represent the internal resistive component of capacitors C2 and C6, respectively. The center tap of the series arrangement of capacitors C2 and C6 is connected to ground and to one pole of the switching elements 908 and 910.

Switching elements 908 and 910 are activated by control signals 920 and 922, respectively. Switching element 908 controls the storage of energy in inductor 952 and capacitor C2 in order to maintain a constant voltage output on line 916. Diode 912 prevents a back EMF from being generated by the overshoot of inductor 952, or the overshoot of capacitor C2. By alternately opening and closing switching element 908, the current through inductor 952 is momentarily increased.

Due to the inductive nature of inductor 952, the instantaneous voltage drop caused by grounding one side of inductor 952 will result in a gradual increase of the current through inductor 952. While this current increase is taking place, the power requirements or load present on line 916 is supplied by the energy stored in capacitor C2. When switching element 908 is deactivated, the high current which has begun to flow through inductor 952 will continue to flow in capacitor C2, charging capacitor C2.

While capacitor C2 is charging, the current through inductor 952 will gradually decrease, depending on the load applied across DC output lines 916 and 918. Part of this current charges capacitor C2. After capacitor C2 has become charged, the current through inductor 952 will decrease, based on the load applied to line 916.

Switching element 910 operates in a similar manner to switching element 908, but operates in conjunction with inductor 956, capacitor C6 and diode 914. By alternately storing and releasing energy from capacitors C2 and C6 and inductors 952 and 956, a stable voltage waveform can be output across lines 916 and 918 which will remain substantially unchanged during a steady state current draw.

One of the advantages of the embodiment shown in FIG. 4(D) occurs during dynamic loading and unloading of lines 916 and 918. By employing a high switching frequency driving switching elements 908 and 910, the amount of time required for the power supply to respond to an increased or decreased current demand is greatly reduced, and is typically on the order of 2–5 switching cycles. This results in an AC power supply which can respond extremely rapidly to dynamic changes in the DC load. Typical power supplies or AC to DC conversion systems require several cycles of the incoming AC signal, typically at 50 or 60 Hz in order to stabilize the DC output once load switching has occurred. By employing the techniques of this embodiment, the DC output across lines 916 and 918 is stabilized well within one cycle of the incoming AC signal.

The voltage across lines 916 and 918 drives an isolator 934 which may be an op amp or comparable device. Isolator 934 provides a proportional reduction of the voltage across lines 916 and 918, reducing the voltage of approximately 408 Volts DC to a voltage level which is more workable using conventional logic circuits, and standard operational amplifiers having an operating range between +24 Volts and −24 Volts. Care must be taken in employing a precision reduction network within isolator 934 to prevent errors induced by nonprecision resistors or components which drift over time or temperature.

The output of isolator 934 provides one input to a network controller 938. Network controller 938 compares the signal supplied by isolator 934 with a reference signal indicative of the DC voltage desired across lines 916 and 918. This reference source is identified as voltage reference source 940.

The output of network controller 938 is a transfer function of the different signals applied to the inputs of network controller 938 by isolator 934 and DC reference source 940. The output of network controller 938 drives isolator 936 which provides an input signal to two analog to digital converters 930 and 932. Analog to digital converters 930 and 932 independently compare the input signals with two static triangle voltage levels 928 and 931, respectively, and drive switching elements 910 and 908, respectively.

The network controller 938 is preferably a dynamic function, and not strictly a DC reference voltage level. This function is defined as the following:

$$A(\text{output}) = a \times \frac{1 + \frac{s}{2\pi fz}}{1 + \frac{s}{2\pi fp}}; \quad \text{Eq. (1)}$$

$$s = \omega i \quad \text{(complex frequency domain)}$$

where $V_{tr}$ is a triangle wave of a fixed frequency, preferably between approximately 5 kHz and 25 kHz, depending on the desired efficiency of the AC to DC converter, and the particular components employed in the filter network. By increasing the frequency of the triangle wave, the values and size of the filter components can be reduced. The triangle wave may be synchronized with one of the incoming voltage sources, V1, V2, or V3, however, this is not required for operation of the circuit.

Analog to digital converters may be formed using comparators and threshold detectors. The analog to digital converters 930 and 932 incorporate an enable line which allows the switching elements to be disabled by external circuitry. The output of analog to digital converter 932 is enabled by enable line 924. When enable line 924 is inactive, comparator 932 will not activate line 920, and thus will not enable switching element 908. This results in switching element 908 remaining open, and the input to filter network 906 being transferred directly to the output of filter network 906.

Similarly, analog to digital converter 930 compares the output of isolator 936 with a second voltage reference source 928. Enable line 926 controls activation of output 922 of analog to digital converter 930. Line 922 controls switching element 910 and when enable line 926 is deactivated, switching element 910 remains open.

The frequency of the triangle wave determines the values of inductors 952 and 956, and capacitors C2 and C6. For a frequency of 8 kHz, inductors 952 and 956 have a value of 100 $\mu$H and C2 and C6 are 12000 $\mu$F. Parasitic resistances RC2 and RC6 are 12 m Ohms.

$V_{dc}$ is the DC signal desired across lines 916 and 918, and proportionally driven by DC reference voltage source 940.

Switching network controller 938 has a phase relationship, $\omega_z$, equal to $2\pi f_z$. The phase relationship $\omega_z$ may be determined by the following equations where:

D=Pulse ratio of the boost invertor

D'=(1−D)

and the transfer function Gc(S) of the sine Pulse Width Modulation converter (AC/DC converter 512) is $$G_c(s) = \frac{V_o(s)}{D(s)} = Aco * Gfo * \frac{\left(1 - \frac{s}{\omega_a}\right)\left(1 + \frac{s}{\omega_z}\right)}{1 + 2d\left(\frac{s}{\omega_o}\right) + \left(\frac{s}{\omega_o}\right)^2} \quad \text{(Eq. 2)}$$

$$\omega_a = \frac{(D')^2 R + R_L}{L} \quad \text{Eq. (3)}$$

$$\omega o = \sqrt{\frac{(D')2R + RL}{(C*L)(R + Rc)}} \quad \text{Eq. (4)}$$

the natural frequency of the given circuit.

$$\omega z = \frac{1}{C*Rc}; \quad \text{Eq. (5)}$$

the frequency of the zero in the transfer function.

$$2d = \omega o\left(C*R_c + \frac{C*R*RL+L}{(D')^2*R+R_L}\right) \quad \text{Eq. (6)}$$

$$Gfo = \frac{R}{R + \left[\frac{R_L}{(D')^2}\right]}; \quad \text{Eq. (7)}$$

the gain factor of the transfer function.

$$Aco = \left[\frac{(D')^2 R - R_L}{(D')^2 R + R_L}\right] * \frac{\hat{e}}{(D')^2}; \quad \text{Eq. (8)}$$

gain factor, where ê=peak value of the input voltage.

The zeros of $G_c$ (s) are $\omega_a$ and $\omega_z$ which should be canceled by the pole-pair $\omega_p$ of the feedback network of the block 64 of FIG. 4(B).

$$\omega_p = \frac{(\omega_a + \omega_z)}{2}; \quad f_p = \frac{\omega_p}{2\pi}; \quad d = 0.7; \quad \text{Eq. (9)}$$

the damping factor of the feedback circuit.

The controller of the block 64 in FIG. 4B can be of the proportional-integral (PI) type or the integral (I) type. The transfer functions of the feedback network and the controller of the block 64 in FIG. 4B become (in generalized terms):

$$G_{64-1}(s) = \frac{a}{(1+b\cdot s + c\cdot s^2)}; \quad \text{and} \quad G_{64-2}(s) = \frac{1}{s} \quad \text{Eq. (10)}$$

The constants a, b, c are converter design specific and depend on output circuit parameters and stability criteria.

The output of switching network controller 938 is compared with the triangle wave to generate an error signal, or difference signal, in comparator 932 and comparator 930.

The second reference voltage source 928 is preferably the inverted signal present as triangle reference voltage 931.

The diode matrix D1, D2, D3, D4, D5 and D6 is optimized with inductors 950 and 954, and capacitors 958 and 960. Resistors RC4 and RC8 represent the inherent resistance of capacitors C4 and C8, respectively. These inherent resistances must be taken into account when calculating the performance of the rectifier network and the filter network.

The series inductance network 942, placed in line with each of the incoming voltage phases, in FIG. 4D, places the inductor L10 in series with voltage source V1, inductor L20 in series with voltage source V2 and inductor L30 in series with voltage source V3. Resistors R10, R20 and R30 are the inherent resistances of inductors L10, L20 and L30, respectively, and are shown to illustrate the small circuit model of the inductors of the embodiment of FIG. 4D. In one embodiment, inductors L10, L20 and L30 are each 187 microHenries ($\mu$H) and resistances R10, R20 and R30 are 10 m$\Omega$ each.

Similarly, parallel LC circuit network 944 is attached to each of the incoming voltage phases once they have passed through filter network 942. Preferably each of these parallel LC loading networks is comprised of an inductor in series with a capacitor, such as L11 and C12, L21 and C22, and L31 and C32. Resistors R12, R22, and R32 indicate the resistance loss of the capacitors and inductors, and are shown to illustrate the small circuit model of the inductor and capacitor network. Preferably, inductors L11, L21 and L31 are 1.44 mh, and capacitors C12, C22 and C32 are 281 $\mu$F. Resistances R12, R22 and R32 are 0.001 Ohms.

Filter networks 942 and 944 momentarily store energy and provide a phase shift of the load transferred across lines 916 and 918 which in turn transfer the load to the input voltage lines V1, V2 and V3. By adjusting and altering the phase relationship between the load and the input voltage supply lines, resulting in a greater power transfer efficiency between the incoming supply lines V1, V2 and V3 and the load that may be applied across lines 916 and 918.

The feedback circuits as shown in FIGS. 4A–4D provides the advantage of enabling the network to drive a lower DC voltage, and accommodate switching of large amounts of current across the DC output without dropping the DC voltage output across pins 12 and 14 excessively for a long period of time. Feedback network 60 (FIGS. 4B and 4C) ensures that the desired DC voltage level is maintained for a wide range of current outputs, and during current switching.

Referring to FIG. 4B, the feedback network 60 includes a scale down buffer and phase shifter 66. The scale down buffer and phase shifter 66 consists of several op amps configured as subtractors and summers in one embodiment. Additional circuitry in controller 64 implement the hardware solution of the equations shown below. It is recognized that these equations may be solved by a microprocessor driven system, but dedicated hardware devices may also be employed in order to reduce the complexity of the system, eliminating the need for generating complex microcode to solve the equations and enabling the system to operate at higher speeds. While the higher speeds which are achieved through a hardware implementation of this section of the feedback loop is not overwhelming when controlling drivers of an input waveform which operates at 50 or 60 Hz, as the source frequency is increased to 400 Hz or 50 kHz to 100 kHz, the speed advantage of the hardware implementation may become noticeable.

Controller 64 also includes a pair of devices which establish a relationship between the sensed voltage, AC input power, and activation of switching elements 300, 302, 304, 306, 308 and 310 through a hardware implementation. It is recognized that controller 64 could also be implemented through a microprocessor or other computing device to achieve a similar result. The hardware implementation has been selected because it is more streamlined, faster during operation, faster to implement, and occupies less space than a microprocessor of the required complexity to perform similar functions.

For the circuit shown in FIG. 3, the line inductance L1, L2 and L3 are each 700 $\mu$H and the line resistance R1, R2 and R3 are each 50 mΩ. The incoming voltage of each of the phases V1, V2 and V3 is presumed to be 120 Volts, and the pulse frequency or switching speed of the switching elements 300, 302, 304, 306, 308 and 310 is 15.12 kHz.

Figure 5:
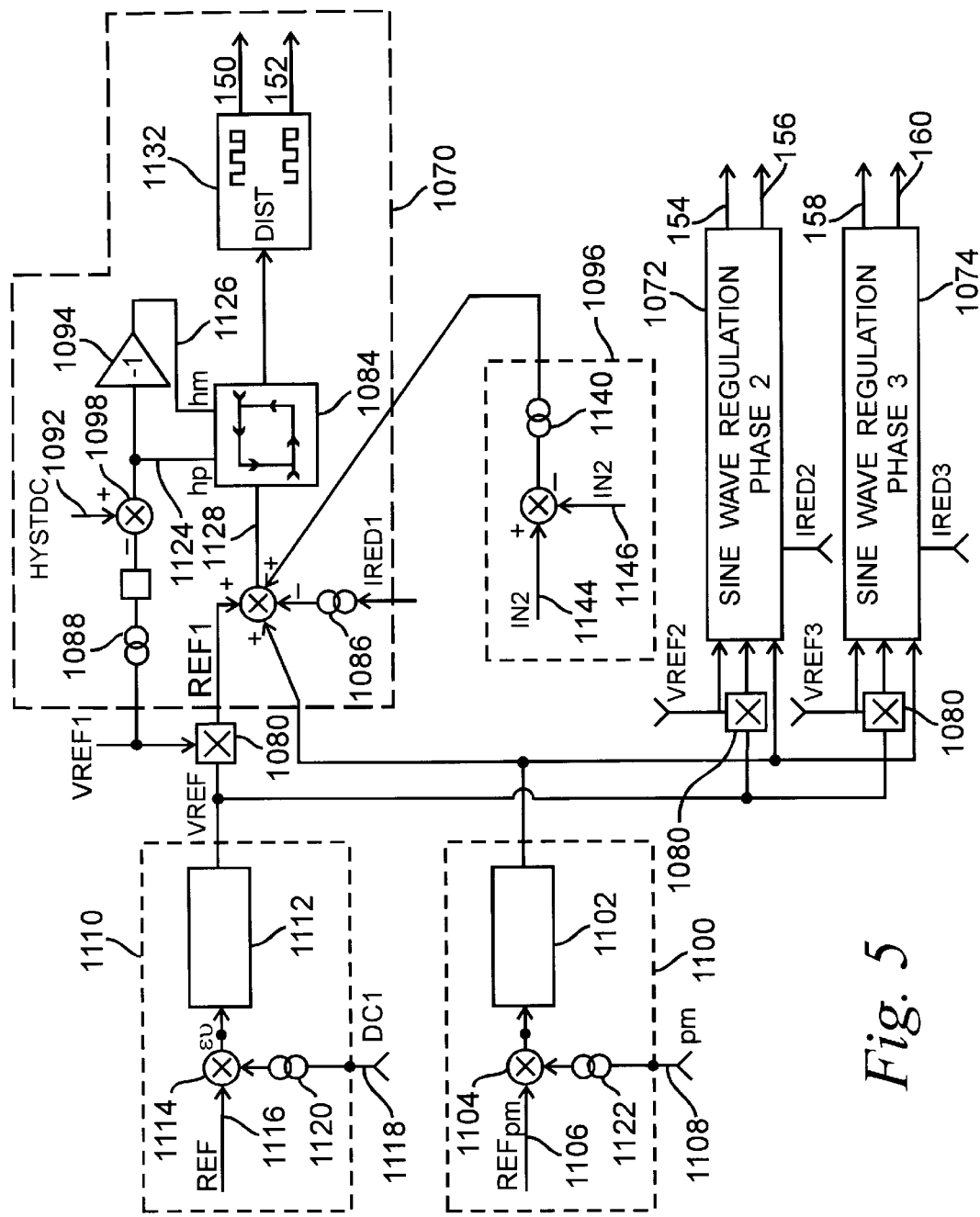
FIG. 5 is a block diagram of an embodiment of a hysteresis mode feedback loop.

A hysteresis mode control circuit which may be used in place of feedback network 60 to control switching elements 24 is shown in FIG. 5. Referring to the graph of FIG. 6C, a hysteresis mode embodiment of the present invention switches a current load within a voltage envelope established by the high voltage envelope and a lower voltage envelope. The middle voltage signal represents a nominal voltage. When the current is off, the voltage level will rise to the parameter shown by the high voltage envelope. When the current load is switched on, the voltage level drops to the level shown by the low voltage envelope.

The open loop, constant frequency embodiment shown in FIG. 3 preferably switches at a constant 8 kHz rate. The configuration limits the ability to control the high voltage envelope and low voltage envelope. By employing the hysteresis mode active feedback network such as that shown in FIG. 5, the length of time that each phase is enabled is not set at a constant rate, but depends on the particular load and voltage level of each of the incoming AC signal phases of the power source. Using the hysteresis mode feedback circuit, the high voltage envelope and the low voltage envelope can be pre-determined, and the amount of time that each phase is loaded will be varied by the feedback circuit to accommodate the load applied to DC lines 12 and 14. The feedback circuit of FIG. 5 replaces feedback circuit 60 of FIGS. 4A and 4B for closed loop hysteresis mode operation.

Regulation for each of the phases is handled by a separate portion of the circuit shown in FIG. 5. Regulation of incoming AC signal V1 is accomplished by block 1070, regulation of AC signal V2 is accomplished by block 1072, and regulation of incoming AC signal V3 is accomplished by block 1074. Blocks 1070, 1072 and 1074 are identical, except that they each deal with a different incoming AC signal and have a reference signal associated with that phase as a unique input. For these reasons, the circuitry in regulator 1070 will be explained in detail, and the regulators 1072 and 1074, will not be individually discussed.

Sine wave regulator 1070 is made up of several discrete components. A multiplier 1080 multiples the reference signal $V_{ref}$ supplied by the particular phase which is regulated. In the case of sine wave regulator 1070, the reference voltage $V_{ref1}$ will be supplied by phase one (V1) of the incoming AC signal. This signal is multiplied by the reference voltage which is sensed through comparator 62, processed by controller 64 and multiplier 68 (FIGS. 4A and 4B). This signal is then summed in adder 1082 with a correction signal which is generated by DC voltage balance correction circuit 1100 (FIG. 5). This correction is to master? a balance voltage on each output to ground.

Another input to adder 1082 is an input capacitor current compensation factor generated by capacitor current compensation circuitry 1096. Subtracted from these three signals is the current of phase one adjusted by factor 1086. The current is generated by the particular phase which is being controlled. The current phase representation 1086 is representative of phase one.

The reference voltage signal which drives multiplier 1080 also drives voltage phase circuitry 1088. The input of the voltage phase circuit is scaled down with 1088. Circuit 1090 is a rectifier bridge in the illustrated embodiment: variable hyteresis is created during each cycle of AC input with summer 1098 and inverter 1094.

The output of adder 1082 represents the current phase and drives hysteresis circuit 1084 through line 1128. The output of hysteresis circuit 1084 is a square wave switching signal 1130 which drives a distribution matrix 1132. FIG. 5A illustrates the output voltage waveforms of the rectifier bridge 1090, the summer 1098, and the hysteresis circuit 1084. Distribution matrix 1132 provides a buffered signal and an inverted signal which are placed on lines 150 and 152, respectively, replacing the supply signal reference 46 and reference voltage 52 (FIG. 3).

Similarly, the output of sine wave regulator 1072 is placed on lines 154 and 156. Sine wave regulator circuit 1074 similarly drives lines 158 and 160 (FIG. 3).

The hysteresis mode feedback circuit shown in FIG. 5 also preferably includes a neutral regulation circuit 1100 which provides a voltage correction to adder 1082 of sine wave regulator 1070, as well as additional sine wave regulators 1072 and 1074 in a three-phase power supply arrangement. Neutral regulation circuit 1100 includes a scale down buffer (1122) on middle point voltage (1108) and a reference voltage 1106. The middle point voltage is subtracted from reference voltage in a summer 1104 then the signal is processed in network 1102. It is recognized that a microprocessor may be employed, however, a hardware implementation is preferred in order to minimize the part count, increase the speed of operation, reduce the complexity and the design time required to implement the circuit employed with the present invention.

The hysteresis mode feedback loop of FIG. 5 includes an output regulation circuit 1110 which supplies a reference voltage to each of the sine wave regulation circuits 1070, 1072 and 1074. Before this reference voltage is multiplied by the particular phase reference voltage in multiplier 1080. Output regulation circuitry 1110 incorporates a scale down buffer 1120 which is driven by the DC output voltage 1118. The DC output voltage is subtracted from a reference signal 1116 in summer 1114. The output of summer 1114 is processed through network 1112 which implements the using dedicated hardware. It is recognized that this equation could also be implemented using a microprocessor and software or firmware to perform these manipulations, however, the circuit has been implemented using dedicated hardware in order to reduce the processing time and the complexity by eliminating the need for additional firmware or software development.

An alternative embodiment of a three-phase AC to DC power converter is shown in 4(E). The embodiment of FIG. 4(E) employs a reactive load implemented by capacitors C1A, C1B, C1C and C2A, C2B and C2C, as well as an inductive load indicated by inductors L1A, L1B and L1C. Each of the reactances and inductances correspond to one of the incoming phases, phase A, phase B and phase C. The designation such as "C" after the capacitor or inductor identifier indicates the incoming phase to which the capacitor or inductor is electrically connected.

The AC to DC converter of FIG. 4(E) operates in a manner similar to the AC to DC converter of FIG. 3 with the feedback loop shown in FIGS. 4A and 4B. Switching elements 301, 303, 305, 307, 309 and 311 take the place of switching elements 300, 302, 304, 306, 308 and 310 as shown in FIG. 3. A snubber network 313 is connected across the switching elements in the embodiment of FIG. 4(E). Filter network 315 of FIG. 4(E) filters out the high frequency components of the DC signal generated by the switching elements in order to place a DC signal across lines 12 and 14, which then may be connected to a load, as shown. In the embodiment shown, the DC voltage is approximately 400 Volts DC.

Figure 4G:
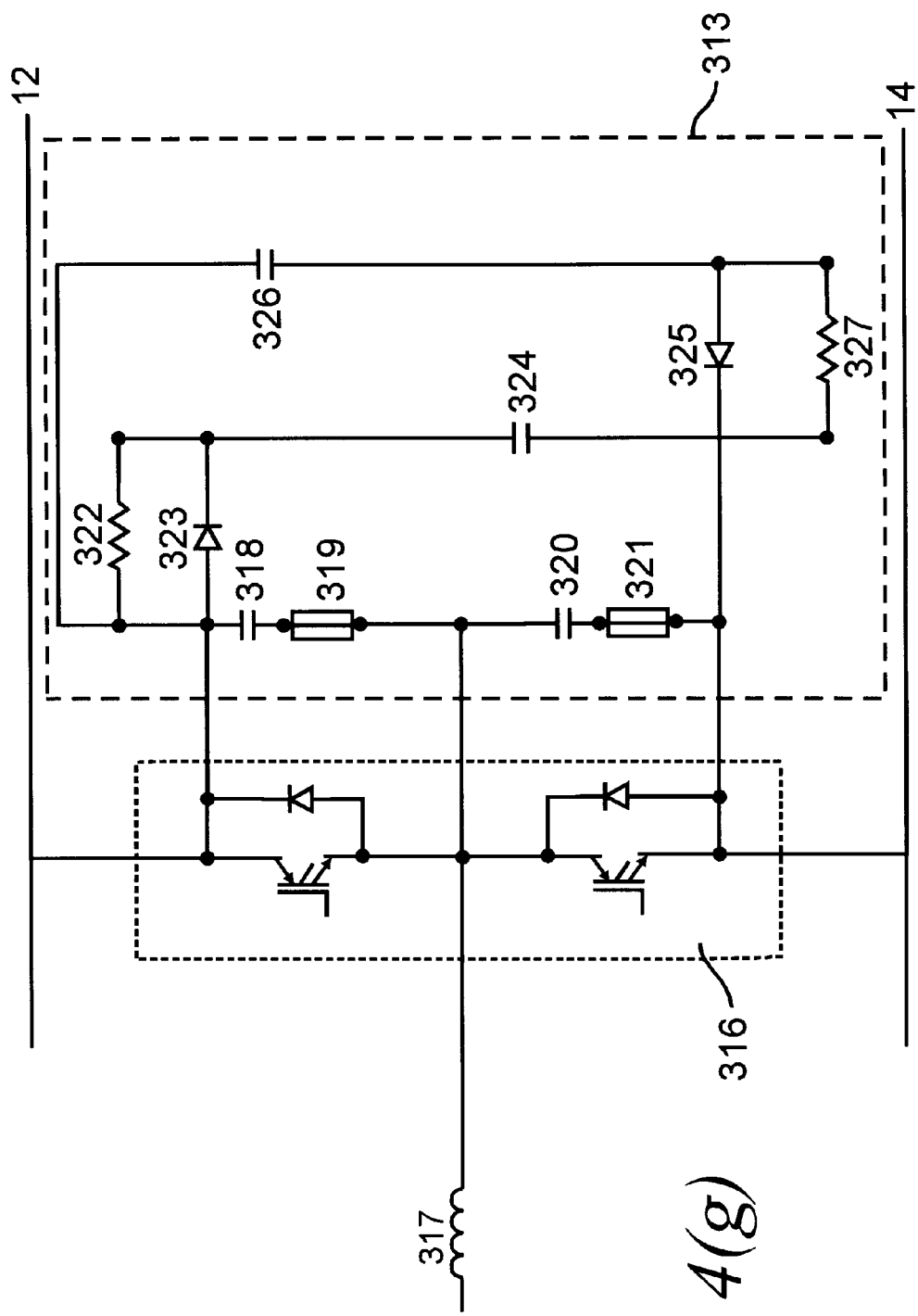
FIG. 4G is a schematic diagram showing the snubber circuit as employed in FIG. 4E.
Figure 4H:
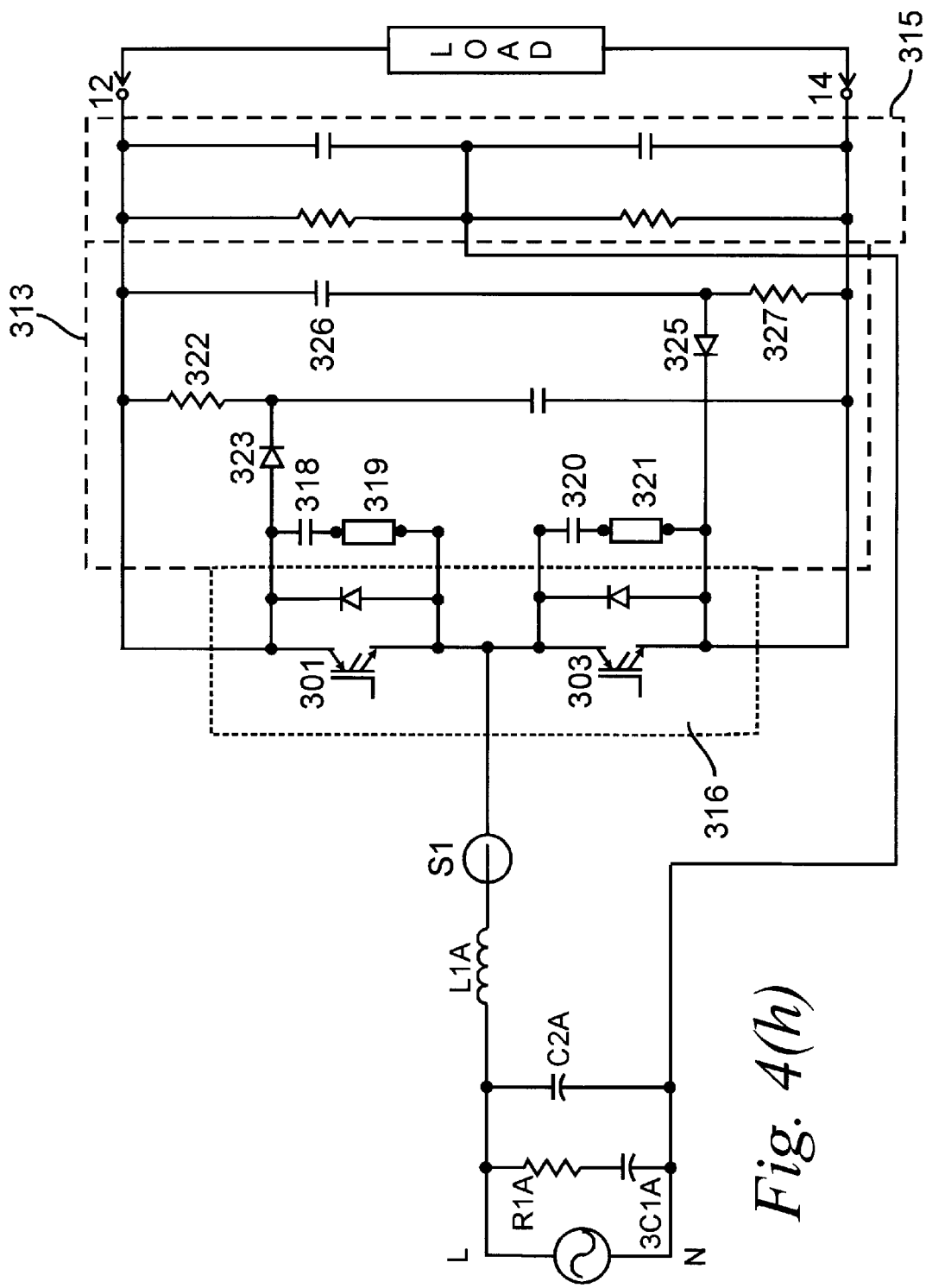
FIG. 4H shows a single phase equivalent of the 3 phase AC to DC converter in which feedback is employed (shown in FIG. 4E).

A more detailed illustration of the embodiment of FIG. 4(E) is shown in FIG. 4(G), where the switching element matrix 316 is a dual IGBT module rated at a minimum of 75 Amps, 1200 Volts may be employed. The IGBT module 316 in FIG. 4(G) may be used as switching elements 301 and 303, 305 and 307, or 309 and 311 in the circuit shown in FIG. 4(E). Switching element network 316 may also be used in place of switching elements 300 and 302, 304 and 306, or 308 and 310 (FIG. 3). It is recognized that individual switching elements may be preferred in certain applications where a dual IGBT module may be inappropriate.

Another advantage of the dual IGBT module is that overvoltage protection diodes, which are shown as part of dual IGBT module 316 in FIG. 4(G), are built into the IGBT module, and do not have to be added as separate elements. Similar overvoltage protection diodes are shown in association with switching elements 301, 303, 305, 307, 309 and 311 in FIG. 4(E). While these overvoltage protection diodes are not shown in FIG. 3, it is recognized that overvoltage protection diodes are preferred when operating an electronic switching element such as switching elements 300, 302, 304, 306, 308 and 310. Incorporating overvoltage diodes will prevent premature burn out or failure of the switching elements.

Inductor 317 shown in FIG. 4(G) is representative of inductors L1A, L1B, L1C, and L1, L2 and L3 as shown in FIG. 4(E) and FIG. 3, respectively. The snubber circuit 313 is preferably comprised of capacitors 318 and 320 which are each 0.022 $\mu$F in conjunction with amorphous beads 319 and 321 which act as inductors in the configuration shown, and preferably have one winding around a small ferrous bead. The exact number of windings and inductance of amorphous beads 319 and 321 depends on the layout and configuration of the switching elements as well as the layout and placement of the snubber network itself. Amorphous beads 319 and 321 are used to tune the remainder of the snubber circuit.

Diodes 323 and 325 incorporated into the snubber circuit 313 are preferably well known diodes which provide fast switching times in order to achieve overvoltage protection from high frequency transients. Capacitors 324 and 326 operate in conjunction with diodes 323 and 325 to ensure that only high frequency transients are eliminated by the diodes. In the embodiment shown in FIG. 4(G), capacitors 324 and 326 are each 0.22 $\mu$F capacitors. Resistor 322 is a 10 Ohm, 25 watt resistor in the embodiment shown in FIG. 4(G), and provides a discharge path over voltage in 324.

An additional snubber network is connected to the incoming AC phases A, B, and C (FIG. 4E). Resistors R1A, R1B and R1C in combination with capacitors C1A, C1B and C1C provide an input snubber network in the embodiment shown in FIG. 4(E). Capacitors C2A, C2B and C2C provide a high frequency filter. In one embodiment, capacitors C2A, C2B and C2C each have a value of 2.2 $\mu$F, and capacitors C1A, C1B and C1C have a value of 7.5 $\mu$F. Resistors R1A, R1B and R1C are formed by placing two 5 ohm resistors in parallel. The two resistors are placed in parallel in order to reduce the power dissipated by each of the resistor components. The incoming snubber circuit shown in FIG. 4(F) illustrates the two resistor elements connected in parallel.

FIG. 4(F) illustrates an embodiment of the power conversion circuit employed in conjunction with three AC input phases A, B and C, and a ground line G. The incoming snubber circuit employed in the embodiment shown in FIG. 4(F) is identical to the incoming snubber circuit as shown in FIG. 4(E), and is comprised of resistors R1A, R1B and R1C and capacitors C1A, C1B and C1C. The high frequency filter network composed of capacitors C2A, C2B and C2C is similar to the configuration in the embodiment shown in FIG. 4(E), however, the point at which all three capacitors are joined together is electrically connected to the incoming neutral or ground line, connecting the incoming neutral or ground to the "defined" ground established at the junction of the incoming phases.

In the embodiment shown in FIG. 4(F), processing of only one of the three incoming phases, phase A, is illustrated. The remaining phases are identical, and are electrically connected across lines 12 and 14. It is significant to note that filter network 315 is not repeated for each of the pairs of switching elements 316 but is placed in a manner similar to that shown in FIG. 4(E).

The snubber circuit 313 illustrated in FIG. 4(G) is identical to the snubber circuit shown in FIG. 4(F), and more clearly illustrates the location and configuration of the snubber circuit 313 with respect to the switching elements and high frequency filter network.

The embodiments shown in FIGS. 4(E) and 4(F) can be readily modified for single phase operation. An example of this modification is shown in FIG. 4(H) in which an incoming AC signal is input across line L and neutral N. An incoming snubber network is formed by R1A and C1A. High frequency filtering is accomplished by C2A. A series inductor L1A is placed between the snubber and filter components and the switching elements.

A hall sensor S1 may be employed to monitor the current drawn by the switching elements. A single switching element network 316 contains switching elements 301 and 303. Snubber network 313 is identical to the snubber networks employed in FIGS. 4(E), 4(F) and 4(G). Filter network 315 is a classical RC filter network to smooth the DC output which is then presented across lines 12 and 14 to the load.

The only difference between 4(H) and 4(E) and 4(F) is the ripple voltage that is produced on line DC Bus (between 12 and 14). In case of 4(E) and 4(F), the ripple frequency is 6 lines' input frequencey (360 Hz for 60 Hz input) while in 4(H) it will be 60 Hz. Consequently, for the same power rating, bigger DC capacitors need to be used to filter out the ripple in voltage/current. FIG. 4((H) is used for low power systems where single phase power is adequate. FIGS. 4(E) and 4(F) are used with high power systems where 3 phase power is needed to distibute line loading evenly to all three phases. Both systems in FIGS. 4(E) and 4(F), and 4(H) can generate any DC voltage larger than line peak-to-peak value of line incoming sine wave.

In this embodiment shown in FIGS. 4(E), 4(F) and 4(G), the switching elements are preferably operated in a fixed frequency mode at a preferred switching frequency of 15.35 kHz. The higher frequency is also possible with faster devices and different switching techniques. The high frequency filter elements, C2A, C2B and C2C are selected to filter out the switching transients which may be fed back through inductors L1A, L1B and L1C to the input voltage phases A, B and C.

The embodiments of FIGS. 4(E), 4(F) and 4(G) may also be operated by a feedback driven control circuit such as is shown in FIGS. 3, 4(D), 4(I) or 4(J). In the embodiments shown in FIGS. 4(I) and 4(J), for example, the DC output across lines 12 and 14 is proportionally reduced by a resistor divider network or op amp 340. In the embodiment shown in FIG. 4(I), a single DC input line represents the voltage across lines 12 and 14. The complimentary input is presumed to be ground. In the embodiment shown in FIG. 4(J), a differential input to the resistor divider network is employed. A constant multiplier, such as 0.01295, is used to reduce the 400 Volt DC input to a voltage level which can be more readily employed to control the switching elements.

The incoming AC phases A, B and C are also monitored and are reduced by a similar voltage divider or op amp network 341 to a working voltage level, maintaining the phase integrity of the incoming AC signals. A multiplier in the embodiment shown in FIG. 4(J) of 0.0386 reduces the incoming AC signal to approximately 4.51 Volts AC.

Figure 4I:
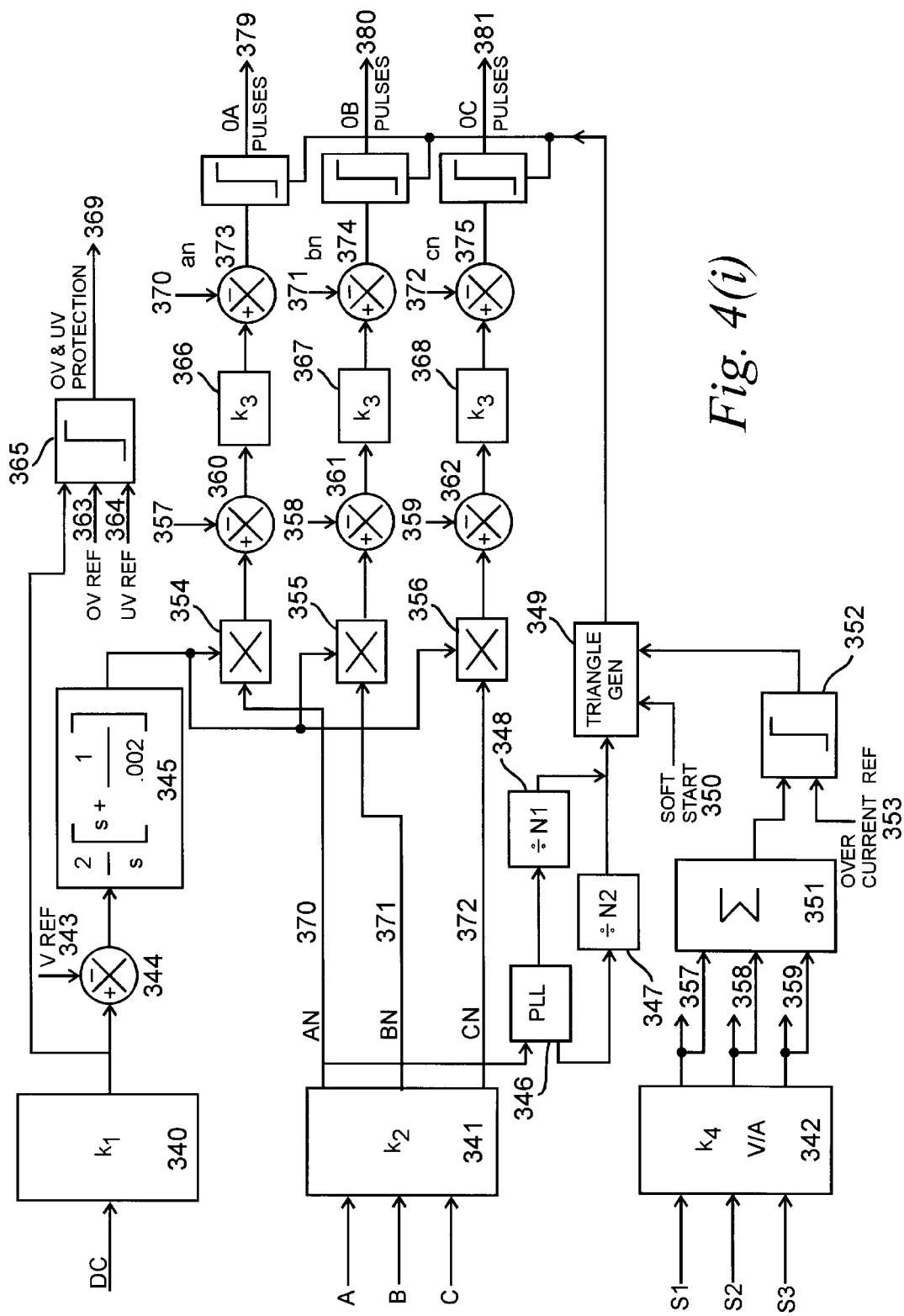
FIG. 4I is a block diagram showing the control concept for AC to DC converter of FIG. 4E.
Figure 4J:
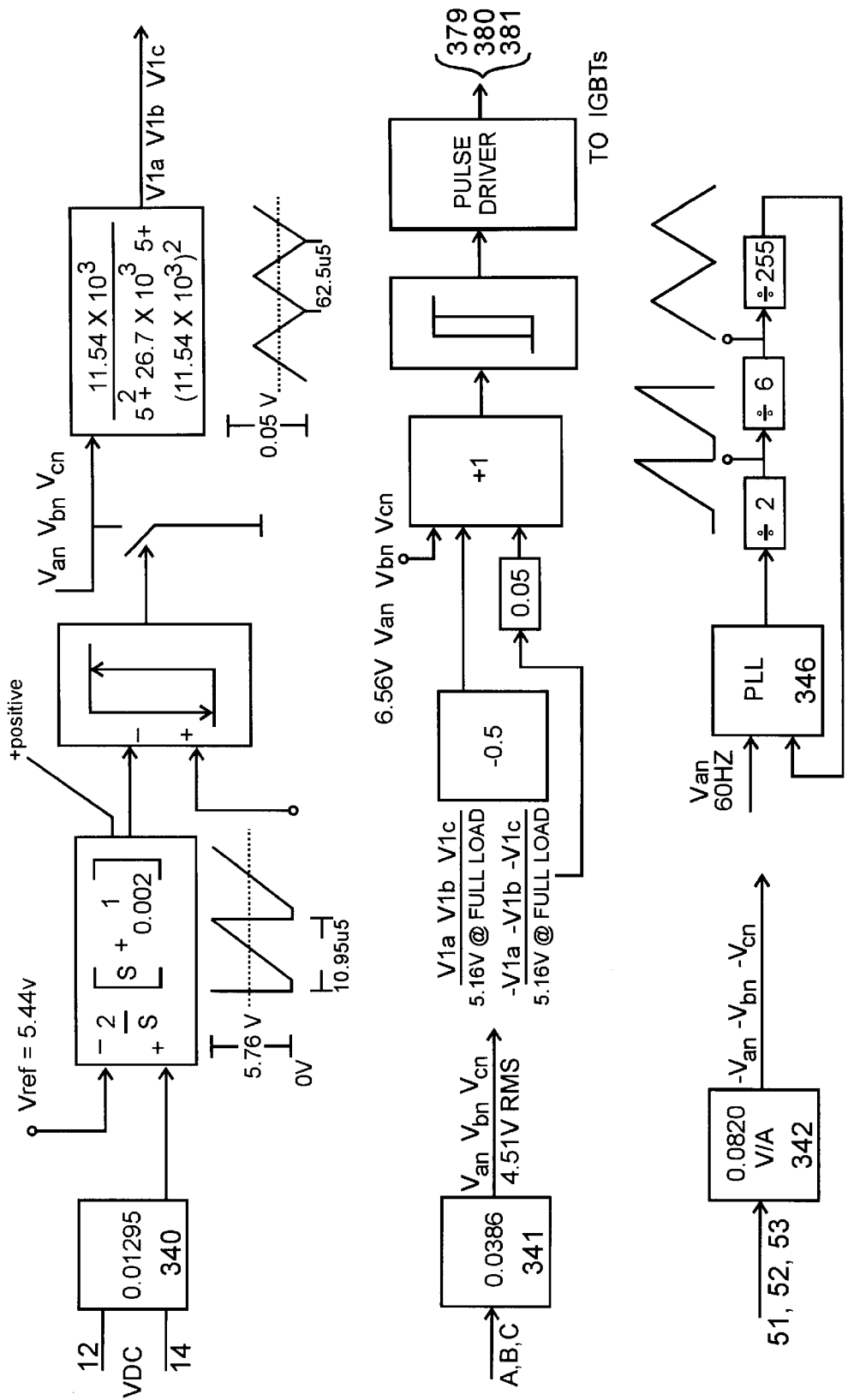
FIG. 4J further illustrates the detailed circuit of FIG. 4I.

Hall sensors S1, S2 and S3 are buffered and amplified by op amps or other compatible circuitry in buffer 342. In the embodiment of FIG. 4(I), the hall sensors provide an output of 80 millivolts per amp of current drawn by the incoming AC phase which is being sensed. In the embodiment shown in FIG. 4(J), a voltage of 82 millivolts per amp sensed is generated. Many hall sensors have a predetermined output voltage ratio which may be multiplied up or down in order to achieve the desired voltage to current ratio. Hall sensors may provide an output of 50 millivolts per amp of current sensed. These hall sensors must be multiplied by a factor greater than 1 in order to achieve the 80 or 82 millivolts per amp sensed which is employed in the embodiments of FIGS. 4(I) and 4(J), respectively.

It is recognized that a variety of different Hall sensor voltages, as well as incoming AC signal voltages and DC signal levels may be employed in conjunction with a variety of modifications of the remainder of the circuitry to accommodate the changed voltage levels. The operation of the control circuit embodiments of FIGS. 4(I) and 4(J) has been established in an attempt to optimize the sensitivity of the control circuit to small changes in voltage or current, yet employ a relatively inexpensive circuit using low voltage operating components.

Overvoltage protection and under voltage protection is incorporated into the embodiment of FIG. 4(I) by monitoring the DC output across lines 12 and 14. An overvoltage comparison network compares the output of voltage divider 340 with an overvoltage reference signal 363. Similarly, an under voltage protection circuit compares the output of voltage divider network 340 with an under voltage reference signal 364. Both the overvoltage and under voltage comparison networks are incorporated into overvoltage and under voltage protection block 365 which generates an under voltage or overvoltage indicator signal output on lines 369.

The output of voltage divider 340 is also compared with a desired DC output reference voltage 343, creating an error signal indicative of the difference between the DC output voltage across lines 12 and 14 and the desired DC output reference voltage. This may be accomplished by an op amp or other suitable device 344.

The error signal drives a high gain proportionally integral amplifier 345. The high gain proportional integral amplifier 345 may be formed of a suitable op amp combination or other comparable circuitry. The output of the high gain proportional integral amplifier is representative of a current reference signal. This current reference signal is used as a multiplying factor for each of the incoming phases. This multiplication is performed by multipliers 354, 355 and 356. Each of these multipliers may be an op amp or suitable, comparable device or circuit. The result of the multiplication of each of the incoming AC phases by the current reference is a current reference signal which is in phase with each of the respective phases.

This current reference signal represents the threshold set for current supply from each of the phases on a continuous basis. The current supplied from each of the phases is then compared with the current being drawn by each of the phases, as detected through the hall sensors S1, S2 and S3.

For incoming phase A, the output of voltage divider network 341 provides an input signal to multiplier 354. The other input to multiplier 354 is provided by the high gain proportional integral amplifier 345. The output of multiplier 345 is compared with the proportionally adjusted voltage detected by hall sensor S1 and multiplied by buffer 342 and output on line 357.

An error signal indicating the difference between the current reference output by multiplier 354 and the current feedback provided by line 357 is generated by a differential comparator circuit 360. Differential comparator 360 may be an op amp or other comparable device.

The output of the differential comparator 360 is multiplied by a constant in multiplier 366 in order to generate a signal having an appropriate voltage level. This signal is then further compared with the output of voltage divider 341 corresponding to incoming signal phase A by differential comparator 373. Differential comparator 373 may be an op amp or other suitable device. The output of differential comparator 373 indicates when each of the switching elements may be activated, and provides an input to driver 376. Driver 376 incorporates a level shifter which converts the analog signal output by differential comparator 373 into digital pulses which are placed on control lines 379 and are used to control the drivers for switching elements 301 and 303.

The level shifter in driver 376 supplies a high frequency switching signal which is combined with the output of differential comparator 373 by an adder or multiplier. This signal is then compared to a threshold circuit which determines activation of the switching elements based on the overall magnitude of the combined high frequency switching signal and the output of differential comparator 373. The voltage level which causes triggering of the threshold circuit is determined by the differential comparator 373, as well as whether these two signals are added or multiplied. Multiplication is referred as the amplitude swings, and rate of change are greater.

The high frequency switching signal is synchronized with the incoming voltage phase by triangle generator 349. A triangle signal is preferred as a high frequency switching signal over a sinusoidal signal because the rate of change of the triangle signal is constant, whereas the sinusoidal signal enjoys a greater rate of change during zero crossings than it does during the peak of the AC signal.

Triangle generator 349 has in input which is derived from one of the incoming AC phases, preferably phase A as indicated in the embodiment shown in FIG. 2(I). The output of voltage divider 341 which is representative of incoming phase A drives a phase lock loop 346 which in turn drives dividers 347 and 348. The output of dividers 347 and 348 are recombined to generate a triangle wave, or triangle signal. This signal is buffered through triangle generator 349 which combines certain other features. Anchoring or locking the phase of the triangle generator to coincide with the phase of one of the incoming AC signals, or phases, ensures that the triangle signal will not "walk" or "travel", but will remain stable, synchronized with the particular incoming AC phase selected.

Triangle generator 349 generates a triangle wave having a predetermined peak voltage. In one embodiment shown in FIG. 4(J), this voltage is 8.05 Volts AC. In addition, a soft start up input 350 is provided to triangle generator 349. A soft start signal is desired when the AC to DC power conversion system is first activated in order to prevent excessive inrush current or other clamping which may occur during normal operation of the power conversion system. The soft start feature allows the DC voltage output across lines 12 and 14 to ramp up to the rated voltage gradually over a predetermined period of time. In the embodiment shown in FIG. 4(I), this period of time is set at approximately 200 milliseconds (msec). During this period of time, the control circuit shown in FIGS. 4(I) and 4(J) does not actively operate to reduce harmonics which may be driven by the switching elements back into the input AC signals.

While this results in a noisy condition for a limited period of time, this tradeoff is preferable when compared with the circuit design and performance difficulties which may otherwise occur. Additionally, it greatly simplifies the design of the circuit by ignoring the start up condition. In typical operation of the circuitry, the start up condition will occur once during operation of the devices or loads which are attached to the power conversion system. Allowing voltage and/or current harmonics to be fed back into the input AC signal during the approximately 200 msec period of time allowed for a soft start up is an extremely short, possibly insignificant period of time, when compared to the duration of operation of the power conversion system which may be hours, days, weeks or months, before another start up condition occurs.

An additional input to triangle generator 349 is provided so that the switching elements may be disabled in the event that an over current condition occurs. The current sensed by each of the Hall sensors S1, S2 and S3 are converted into the desired proportional relationship by buffer 342. The output of buffer 342 is presented on line 357 for Hall sensor S1, line 358 for hall sensor S2 and line 359 for Hall sensor S3. The signals are then added in summer 351 in order to determine the total current draw of the power conversion system. This total current draw is compared to an over current reference voltage 353 by differential comparator 352. If the total current drawn by the power conversion system exceeds the predetermined power rating of the power conversion system, then the amplitude of the triangle wave generated by triangle generator 349 is reduced.

The amplitude of the output of triangle generator 349 is used to determine the available switching period for each of the incoming AC phases, phase A, phase B and phase C. Activation of the switching elements will only occur if the amplitude of the triangle signal generated by triangle generator 349 combined with the output of differential comparator 373 exceeds a predetermined threshold for both positive and negative switching controls. Thus, by decreasing the amplitude of the triangle signal, the duration of the period of time when the switching elements can be activated is shortened and the energy which is transferred from the incoming AC signals to the DC output across lines 12 and 14 is decreased. This allows soft start circuit 350 to be implemented as an RC charging circuit, or other capacitive charging network, and does not require the use of active circuitry such as timers, counters or the like. This type of soft start circuit also allows a direct interface with the triangle generator, taking the form of a multiplier or summer. If a digital soft start circuit was implemented, a digital to analog converter and a filter would be used to generate a stepped waveform and smooth the steps to create a linear signal.

Pulse generation on control lines 380 and 381 for incoming phases B and C, respectively, are identical to the pulse generation for incoming phase A. In the embodiments shown in FIG. 4(I), the triangle wave has a frequency of 15.35 kHz. This will be the switching frequency of the switching elements. The switching elements will trigger when directed to do so by differential comparators 374 and 375 which act as gating circuits for the high frequency switching signal (triangle wave).

By comparing the current load drawn from each of the incoming phases A, B and C, and the current reference generated in part by the voltage level of each of the incoming phases A, B and C, differential comparators 373, 374 and 375 selectively enable operation of the switching elements to ensure that the incoming phase selected provides an energy input the power conversion system, and does not drain energy from the power conversion system.

A gate drive circuit drives the gate of each of the switching elements. When employing the IGBT switching elements, a voltage level of 12 Volts activates the switching elements, and a voltage level of −5 Volts shuts off the switching element. In order to isolate the switching levels from the remainder of the control circuitry, an opto-coupler is connected to each of the sets of control lines 379, 380 and 381 to control the switching elements for incoming phase A, B and C, respectively.

The gate drive circuit incorporates a high collector current protection circuit by sensing the $V_{cc}$ saturation voltage. If the $V_{cc}$ saturation voltage increases over 5 Volts, the gate voltage is driven to −5 Volts, shutting off the IGBT for the remaining portion of the present pulse. This ensures that the IGBT is turned off before excessive collector current causes damage to the device. An initial delay of 2 microseconds is preferably designed into the high collector current protection circuit to prevent an over current protection condition from being erroneously detected during the turn on of the IGBT switching element.

Figure 6A:
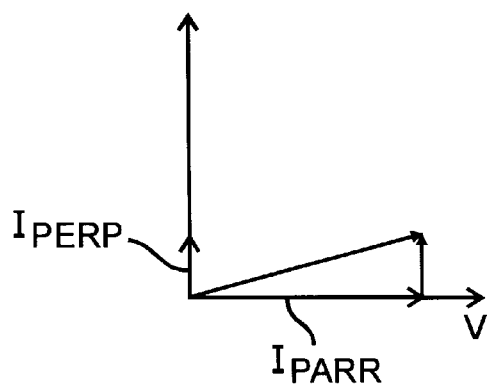
FIGS. 6A and 6B are plots of voltage and current vectors.
Figure 6B:
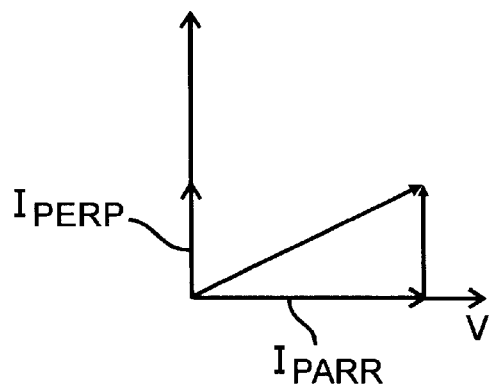
Figure 6C:
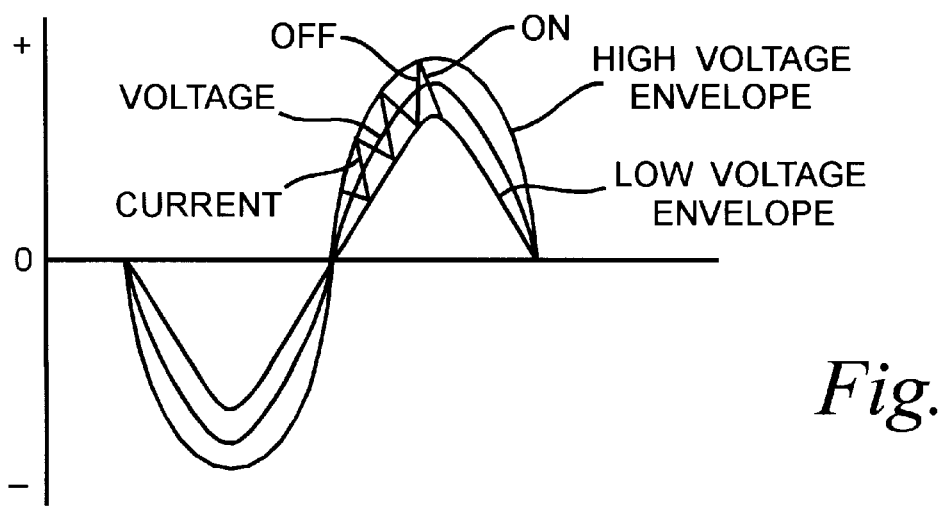
FIG. 6C shows the voltage envelope of the input waveform during operation of a hysteresis mode feedback loop.

The use of a feedback loop which selects an AC input source based on the phase of the input source solves numerous problems, including ensuring that the phase of the current drawn from each of the power supply phases coincides with the voltage profile for that input source. An easier way to envision this is to compare the direction of a current vector and the direction of the voltage vector, as shown in FIGS. 6A and 6B. Vector V indicates the voltage vector of one of the phases of the voltage source. Current I is a vector which represents the current drain through that same voltage source.

The current I can then be broken down to be represented by a current component which is coincident with the voltage vector, represented by $I_{parr}$, and a current vector which is perpendicular to the direction of the voltage vector, represented by $I_{perp}$. By minimizing the value of the perpendicular component, $I_{perp}$, the load of the current vector becomes coincident with the supply of the voltage vector.

By ensuring that the voltage and current vectors are in phase, the power factor approaches unity. Conventional circuitry results in a power conversion factor of approximately 0.6 to 0.7. This factor is established by dividing the real portion of the power delivered by the apparent power which has been delivered to a system. The real portion of the power delivered to the system is represented by $I_{parr}$, and the apparent power delivered to the system is the vector I, which is the vector summation of the parallel current $I_{parr}$ and the perpendicular current component $I_{perp}$. By minimizing the perpendicular component as shown in FIG. 6A, greater power factor is exhibited as compared to the power factor as shown by FIG. 6B, which represents conventional devices.

Figure 6D:
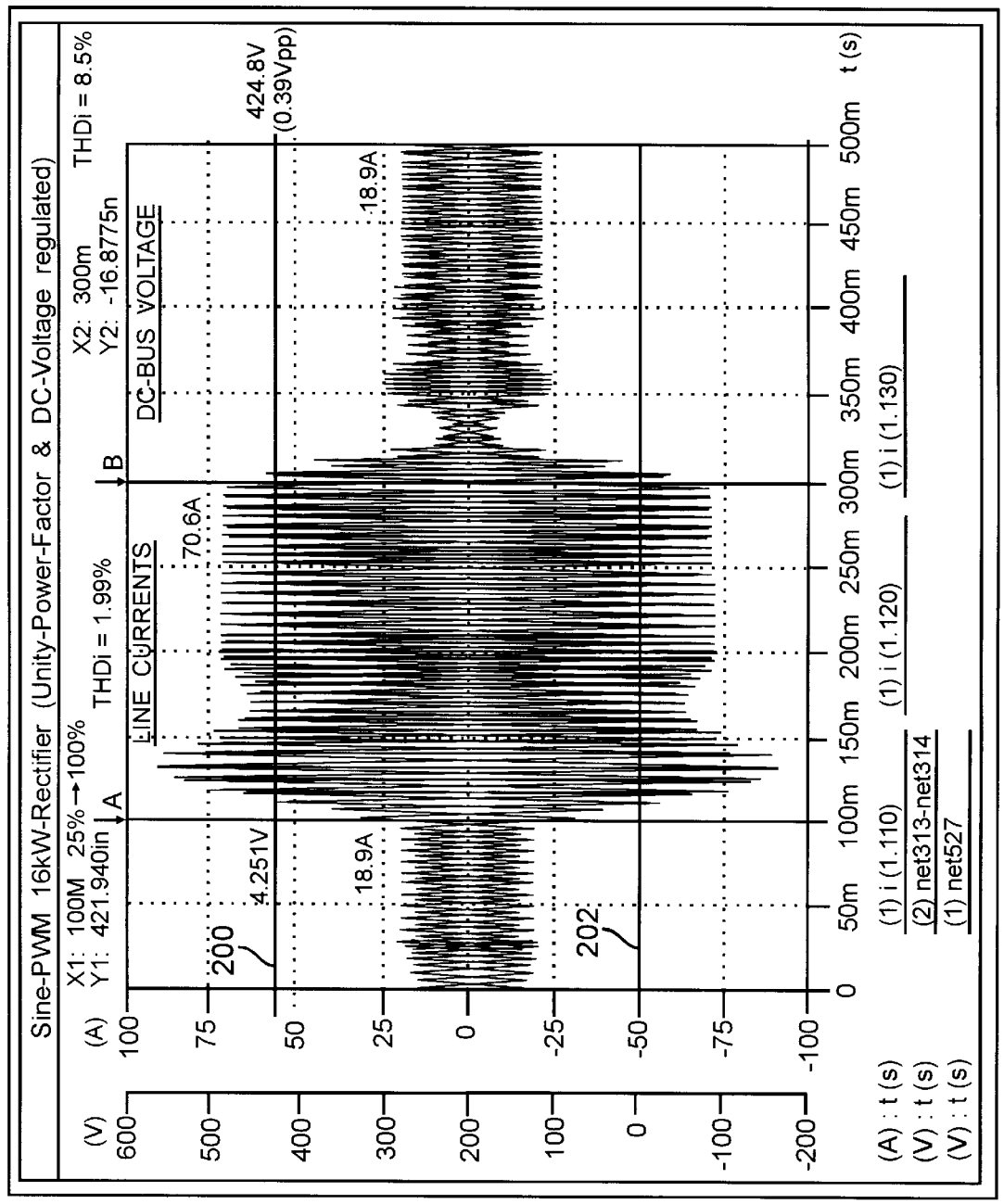
FIG. 6D is a plot showing the input voltage and output current during load switching.

Additional advantages of the circuit employing a constant frequency include low harmonic distortion which is achieved by switching at a frequency which is relatively high when compared to the power supply frequency. The size and weight of the circuitry is greatly reduced by eliminating large transformers which may otherwise be required to accommodate the power supplied at the DC output (across pins 12 and 14). The response time of the DC bus to a step load such as switching from 25% to 100% of the load as shown in FIG. 6D is accomplished within several cycles of the high frequency signal and stabilized within approximately 40 milliseconds as shown in FIG. 6D. The DC output voltage is represented as the line 200 (FIG. 6D), which barely show a ripple in the voltage level following switching at points A and B. Line 202 represents the output of the controller 64 (FIG. 4B). Point A indicates the switching of the load from 25% to 100% and point B indicates the switching of the load from 100% back to 25%.

The voltage stabilizes in significantly less than 1 cycle of a 50 or 60 Hz oscillation, indicating that the feedback circuit rapidly responds to the change in load, and the decrease in the voltage level across pins 12 and 14, altering the switching of the current load as applied to each of the three phases of the power source.

Reference signal generator 46 enables activation of switching element 300 during the positive portion of the cycle, and disables activation of switching element 300, enabling activation of switching element 302 during the negative portion of the cycle of power source V1. Operation of switching element 302 is thus complementary to operation of switching element 300. This switching configuration allows switching element 300 to be closed by switch control circuit 326 during the positive portion of the cycle of power source V1, thus driving a positive voltage onto positive DC output line 12. Similarly, switching element 302 may be closed by switch control circuit 326 during the portion of the cycle that power source V1 is negative, thus presenting a negative voltage on DC output line 14.

In the 3 phase configuration shown in FIG. 3, switching elements 304 and 306 switch power source V2. Switching elements 308 and 310 similarly switch power source V3. Switching elements 304 and 308 are identical in operation to switching element 300, but are controlled by respective reference signals. Switching element 306 and 310 operate in a manner identical to switching element 302 and complement the operation of switching elements 304 and 308, respectively.

Thus, a positive DC voltage is maintained on DC line 12, and a respective negative DC voltage is maintained on DC line 14. The exact voltage level of the signals on DC voltage line 12 and DC voltage line 14 with respect to ground is relatively unimportant. An important consideration is the voltage generated across DC (output) voltage lines 12 and 14.

The DC voltage generated across DC lines 12 and 14 must be converted to a desired voltage level or waveform in order to be usable. In order to accomplish this DC to DC or DC to AC converter is employed.

Various configurations of interface circuits can be used to couple the driver or feedback circuits to the switching elements previously described. For example, referring to FIGS. 7A and 7B, an isolator 248 is driven by voltage source V1. There are two outputs of isolator 248, each driving an independent, but identical circuit one in FIG. 7A and one in FIG. 7B. One output of isolator 248 drives full wave rectifier 250 which produces a pulsed DC voltage which is filtered and regulated by capacitors and a zener diode in block 252. This pulsed DC voltage supplies power to the remainder of the circuitry of FIG. 7A. Block 254 is an isolator which prevents the signals present on lines 150 and 152 from directly crossing into the circuitry shown in FIG. 7A. In one preferred embodiment, isolation device 254 is an optical isolator, HCPL2211. The output of isolator 254 enables the logic circuitry in an oscillator circuit 256 to begin running. Oscillator 256 is made up of a number of CMOS NAND gates, diodes and invertors in one preferred embodiment.

The circuitry of oscillator 256 can be readily replaced with other oscillation circuitry which can be started and stopped rapidly by altering the state of a single control line. Current sync 258 drives push pull output 260 which in turn drives switching element 302 (FIG. 3, for example). An identical circuit is shown in FIG. 7B and includes a full wave rectifier 262, filter and voltage limiter 264, optical isolation block 266, oscillator 268, current sync 270, and push pull output 272 which drives switching element 300 (FIG. 3, for example). In some configurations, the inputs 150 and 152 to the circuitry shown in FIG. 7B are reversed, so that the oscillator circuit shown in FIG. 7B is active only during the positive portion of the cycle of voltage source V1 and the oscillator circuit shown in 7A is only active during the negative portion of the cycle of voltage source V1. The interface circuits of FIGS. 7A and 7B replace the switch control circuit 326 of FIG. 3, and identical circuits are used to control switch elements 304, 306, 308 and 310.

One aspect of the present invention converts a DC input voltage into a high frequency AC signal. The high frequency AC signal is passed through a high efficiency transformer and then converted into a desired DC output voltage, or AC output waveform. Preferably, the AC signal which couples energy through the transformer is extremely high. In one embodiment, a 50 kHz signal is employed. The signal frequency is limited only by the switching elements located on both the primary and secondary side of the transformer. Switching frequencies of 60 kHz have been achieved and switching frequencies of 100 kHz appear readily possible.

Figure 12:
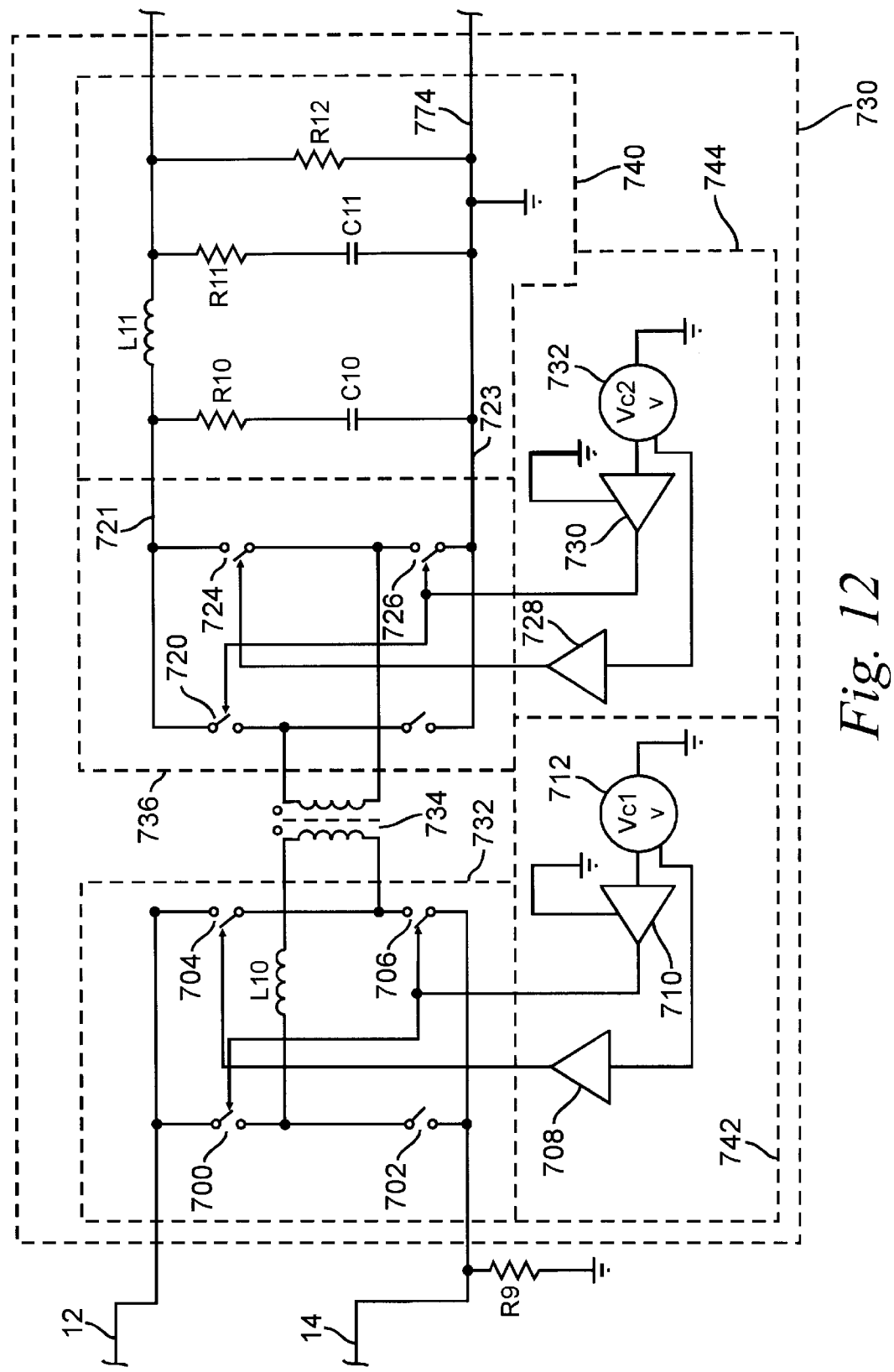
FIG. 12 is a schematic diagram of a bidirectional DC to DC power conversion system without a feedback loop.

Referring to FIG. 12, one embodiment of a DC to AC converter includes a transformer 734 and switching elements 700, 702, 704 and 706. Transformer 734 is a high efficiency, high frequency transformer which provides excellent coupling from the primary to the secondary. Operating frequencies of 50 to 100 kHz are preferred for transformer 734. When analyzing transformer 734, there can be seen a leakage inductance which is best characterized by an inductor placed in series with the primary of transformer 734. In addition, there is a magnetizing inductance which is best characterized by placing an inductor in parallel with the primary of transformer 734. Leakage inductance and magnetizing inductance are not particularly critical features of low frequency transformers, such as those that operate at 60 Hz.

Figure 15:
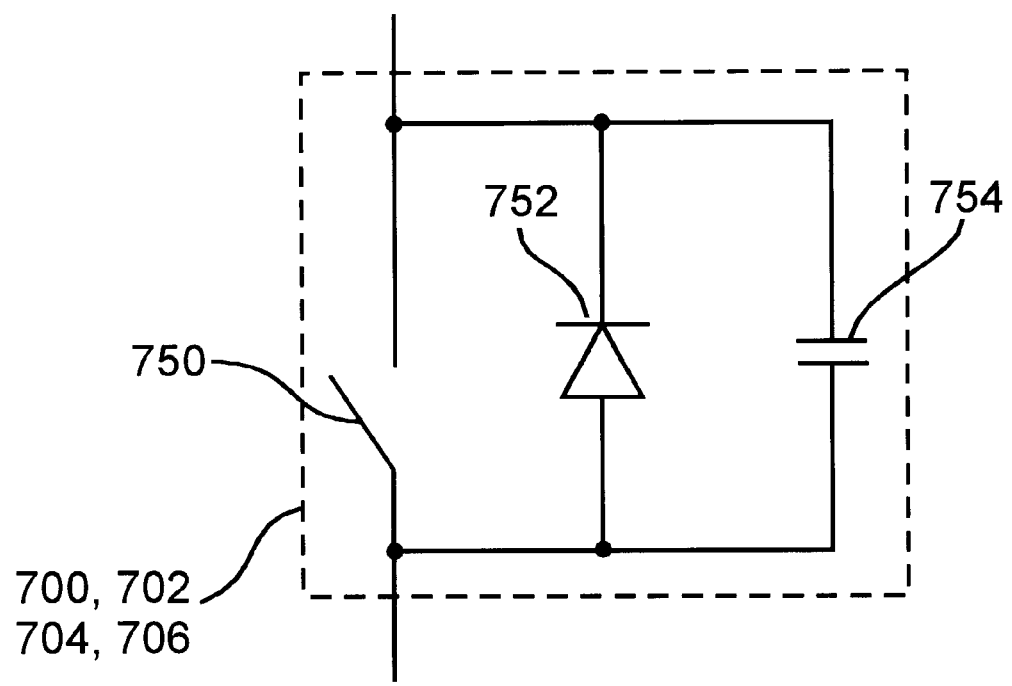
FIG. 15 is a schematic diagram of the switching elements of the circuit in FIG. 12.

Each of the switching elements 700, 702, 704 and 706 include an active switching element, and a diode and capacitor. Switching elements 700, 702, 704 and 706 are configured as shown in FIG. 15. The capacitors 754 are referred to as snubber capacitors. Switching elements 700, 702, 704 and 706 are preferably comprised of a switching element 750, such as an IGBT, high power FET, or the like, a snubber capacitance 754, and an over voltage protection diode 752. As the switching elements alternate the direction of current flow across transformer 734, the capacitors are alternately charged and discharged. By allowing the capacitors to charge, the energy stored in the transformer, characterized by the magnetizing inductance is stored in the capacitors. If the energy applied to the capacitors is excessive, the diodes conduct, preventing breakdown of the capacitors.

By allowing the capacitors to charge, the voltage of the AC signal in transformer 734 is allowed to decrease towards 0 Volt. This allows the opposing switching elements to switch on while there is effectively no voltage across the switching elements. This is referred to as AC zero voltage switching, which significantly reduces switching losses. The exact capacitor values selected will depend on the electrical characteristics of the circuitry employed and the physical configuration, including conductivity and thickness of conductive elements and the orientation of active and passive elements with respect to each other.

In addition to the reduction in switching losses, the configuration of the circuitry of the present invention allows the switching elements to operate at a higher frequency than they may otherwise be able to by closing the switching elements without a voltage applied across them. For example, integrated gate bipolar transistors (IGBT's) typically have a maximum switching frequency of approximately 20 kHz when switching a load. By applying the AC zero voltage switching technique of the present invention, switching frequencies well beyond the rated 20 kHz have been achieved, such as the preferred operating frequency of 50 kHz, as previously mentioned.

Figure 13:
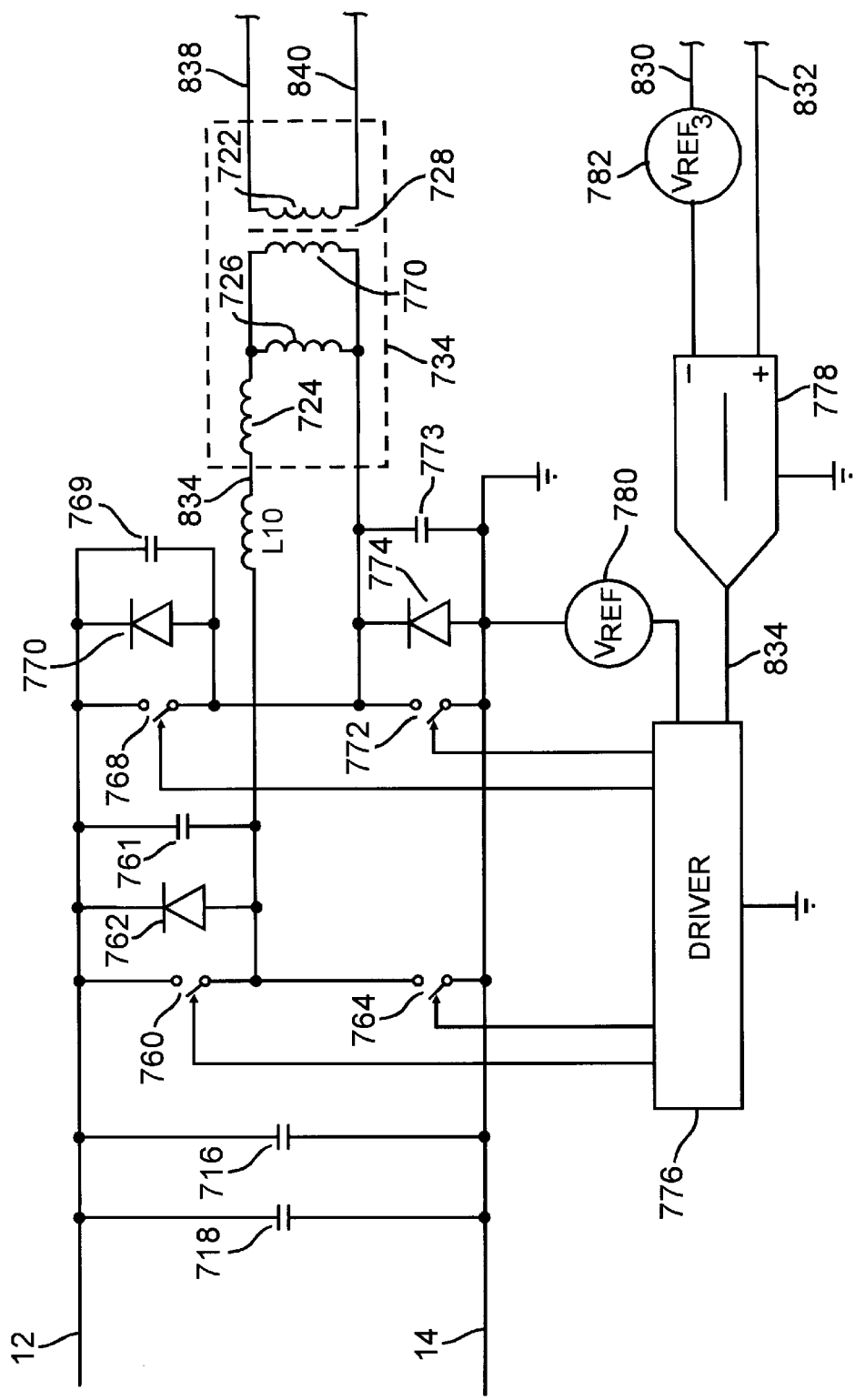
FIG. 13 is a schematic diagram of the switching matrix, transformer and feedback circuitry of another embodiment of the invention with a feedback loop.

Storage capacitance 718 and filter capacitance 716 as shown in FIG. 13 may be employed across DC input lines 12 and 14. A similar capacitor configuration can be inserted in the circuit shown in FIG. 12. Capacitance 716 is preferably composed of several multilayer ceramic capacitors which are integrated into the switching element bus structure in order to control voltage overshoots which may be caused by the very fast switching times employed. Capacitor 718 is preferably comprised of a number of low ESR electrolytic capacitors. Capacitor 718 is intended to store sufficient energy to maintain the input voltage level to the switching elements. This energy storage characteristic is typically referred to as a specified power outage ride through requirement.

Switching elements 700 and 706 (FIG. 12) are simultaneously activated in order to apply the DC voltage from lines 12 and 14 across the primary of transformer 734. After current is flowing through the primary of transformer 734, switching elements 700 and 706 are shut off and switching elements 702 and 704 are activated. This reverses the polarity of the signal applied to inductor L10 and the primary of transformer 734. Since the flow of current cannot change instantaneously through an inductive element, there is a slight time delay as the current flow through inductor L10 and the primary of transformer 734 is reversed. After several time constants, switch elements 702 and 704 are shut off and switch elements 700 and 706 are activated again.

Switch activation of switch elements 700, 706 and 702, 704 are controlled by oscillator 712 through drivers 708 and 710 as shown in FIG. 12. In one preferred embodiment, the frequency of oscillator 712 is predetermined based on the magnetizing inductance and leakage inductance of transformer 734 in conjunction with the capacitors which are connected to switching elements 700, 702, 704, and 706.

As the current flow through inductor L10 and the primary of transformer 734 is constantly reversed, a matching current flow is developed through the secondary of transformer 734. The voltage appearing across transformer 734 is switched by switching elements 720, 726 and 722, 724. These complimentary switching elements behave in the same manner as switching elements 700, 706 and 702, 704. When switching elements 720 and 726 are closed, one polarity of the secondary of transformer 734 is driven across output lines 721 and 723. When switch elements 720 and 726 are opened, and switch elements 722 and 724 are closed, the reverse polarity of the voltage across the secondary of transformer 734 is applied to lines 721 and 723. Switch elements 720, 726 and 722, 724 are turned on and off by oscillator 732 through drivers 728 and 730, as shown in FIG. 12.

To efficiently couple energy across transformer 734, it is preferable to synchronize oscillator 712 with oscillator 732. In synchronizing these two oscillators, oscillator 712 will lead oscillator 732 by a predetermined phase amount. Preferably, oscillator 712 will lead oscillator 732 by an amount to assure that the voltage across the secondary of transformer 734 is zero Volt when switching elements 720, 726 or 722, 724 are activated. By controlling the phase lead, the amount of power flow can be regulated. This will cause the output voltage to vary as a function of the load.

During operation of switching elements 700, 702, 704 and 706, the direction of current flow through the primary of transformer 734 is alternately reversed. During operation of the switching elements, current will flow through the switching element and through transformer 734 until the switching element is opened, and the circuit broken.

Because of the inductive characteristics of transformer 734, current flow will not stop instantaneously. This continued current flow will cause an increase in voltage which will charge capacitor 754 (FIG. 15). If the current is sufficiently large, capacitor 754 will charge to a voltage level greater than the voltage applied to the DC input across lines 12 and 14. This will cause current to flow through diode 752, effectively clamping the voltage across the capacitors to the DC values established across lines 12 and 14. At this point, the alternate pair of switching elements are activated, and current begins to flow through transformer 734 in the opposite direction in which it had previously flowed.

Capacitors 754 then discharge, dumping their energy back through transformer 734. In this manner, there is theoretically zero Volts across each of the switching elements when they are actuated. In actuality, a forward diode drop of approximately 0.7 Volts will exist across each of the switching elements, or a total of 1.4 Volts across the two switching elements in series with the primary of transformer 734.

In order to ensure operation of the switching elements and capacitor pairs as described above, it is preferred to ensure that a minimum current flow occur through transformer 734 in order to charge capacitor 754. In order to guarantee that this minimum current flows, a shunt inductance is built into the primary of transformer 734. Shunt inductance and leakage inductance are typically terms which are associated with the small signal modeling of a transformer.

In the embodiment where the switching elements are IGBT's, they preferably have a shut off time of approximately 100–200 nanoseconds (ns). Snubber capacitance is chosen so that the current flow is maintained for approximately 1.5 microseconds after the switch is shut off. The shunt inductance is selected to ensure minimum current flow sufficient to charge the capacitor even when there is no load being applied to the secondary coil of the transformer.

Significantly, the circuit shown in FIG. 12 can readily be driven in reverse, transferring energy from lines 721 and 723 to lines 12 and 14 by having the phase of oscillator 732 lead the phase of oscillator 712. Coupling through transformer 734 will occur from the side of transformer 734 which has first had the switching elements activated to the side of transformer 734 which next has the switching elements activated.

The signal output across lines 721 and 723 will take the form of a pulsed DC waveform. The filter network 740, shown in FIG. 12, filters the voltage input from lines 721 and 723 to a cleaner DC waveform on lines 772 and 774. Alternatively, a rectifier or other filter configuration could be employed. If desired, switching network 736 can be replaced by a full wave rectifier, or half wave rectifier, using conventional AC to DC conversion techniques. That type of conversion is far less efficient than the circuit presently employed, which achieves an energy transfer efficiency of approximately 94–95%.

DC to AC conversion may be accomplished by having oscillators 732 and 712 operate at different frequencies. The difference between them will be a "beat" frequency which is output across lines 721 and 723. A low pass or high pass filter (not shown) then smoothes the output AC waveform.

Figure 14:
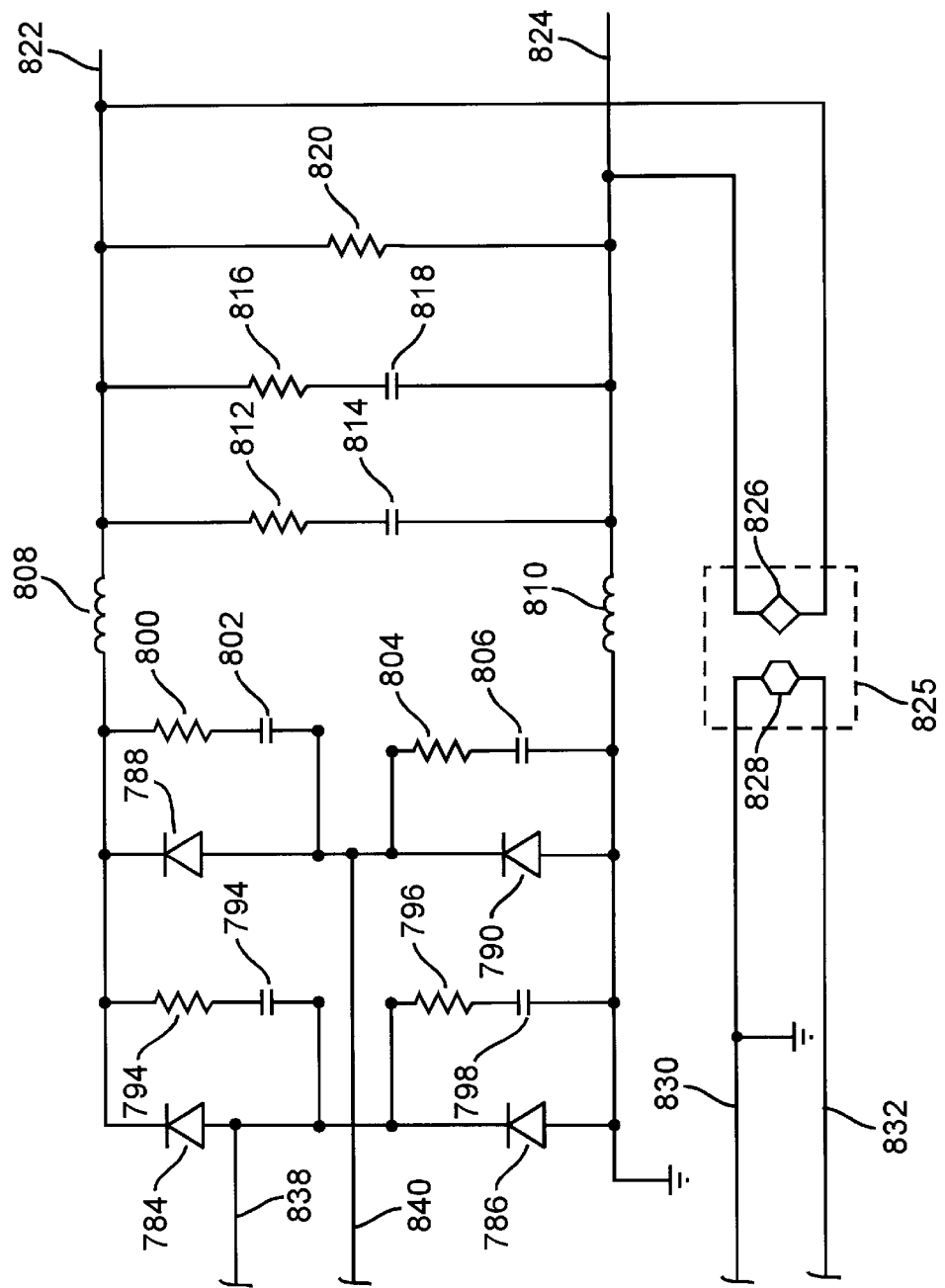
FIG. 14 is a schematic diagram of a full wave bridge rectifier AC to DC converter with the feedback tap shown.

An embodiment of a DC to DC converter is shown in FIGS. 13 and 14. The embodiment shown in FIGS. 13 and 14 employs a switching matrix connected to the primary of transformer 734 which is similar to that shown in FIG. 12, however, the switching elements are each individually controlled by a driver network. The secondary of transformer 734 drives a full wave rectifier network shown in FIG. 14 in order to create a pulsed DC waveform which is then filtered to produce a stable DC output across lines 822 and 824. The stable DC output is monitored by the feedback loop connected across lines 822 and 824.

The feedback loop ensures that the voltage across lines 822 and 824 does not vary, even if loads are being actively switched. The feedback network selectively activates the switching elements in order to ensure that enough energy is transferred to transformer 734 to provide the DC voltage level required at lines 822 and 824.

In the configuration shown in FIG. 13, each of the switching elements are connected in parallel with a diode in order to dissipate the back EMF which may be generated by inductor L10 and the primary of transformer 734. Unlike the DC to AC converter shown in FIG. 12, the DC to DC converter of FIGS. 13 and 14 only operate in one direction, that is, energy is only transferred from lines 12 and 14 through transformer 734 to lines 822 and 824. There is no switching matrix on the secondary side of transformer 734 in FIGS. 13 and 14 to reverse the current flow through transformer 734 which would be required to transfer energy from lines 822 and 824 to lines 12 and 14.

Operation of the embodiment of the DC to DC converter shown in FIG. 13 is similar to operation of the embodiment of FIG. 12. A DC input is supplied across lines 12 and 14, and a matrix of switching elements 760, 764, 768 and 772 are activated in pairs in order to generate a high frequency AC signal across the primary of transformer 734. Switching elements 764 and 768 are activated at the same time and switching elements 760 and 772 are activated at the same time. All four switching elements are not activated at the same time. Over voltage protection diodes 762, 766, 770 and 774 function in a manner similar to operation of diodes 752 in switching elements 700, 702, 704 and 706 as shown in FIG. 12. Similarly, capacitors 761, 765, 769 and 773 serve as snubber capacitors in a manner similar to the operation of capacitors 754 forming part of switching elements 700, 702, 704 and 706 as shown in FIG. 12.

An inductor L10 may be inserted in series with transformer 734 in order to provide additional leakage inductance to balance the configuration of the snubber capacitors 761, 765, 769 and 773 with the leakage inductance 724 and magnetizing or shunt inductance 726 which are inherent in transformer 734.

The output of the secondary 722 of transformer 734 is an AC signal which is output across lines 838 and 840. Referring now to FIG. 14, lines 838 and 840 are connected to a conventional diode bridge array comprised of diodes 784, 786, 788 and 790. An RC (Resistor-Capacitor) snubber network is located in parallel with each of the diodes of the diode bridge array. Resistor 792 and capacitor 794 are in parallel with diode 784. Similarly, resistor 796 and capacitor 798 are in parallel with diode 786. Resistor 800 and capacitor 802 in parallel with diode 788, and resistor 804 and capacitor 806 in parallel with diode 790.

The RC snubber networks help minimize overvoltage condition which may be present due to the high switching speeds involved. The parallel RC networks formed by resistor 792 and capacitor 794 across diode 784 are typically used when diodes which have noisy or snappy recovery characteristics are employed in a rectifier bridge such as diodes 784, 786, 788 and 790. In order to avoid this problem, soft recovery diodes such as SGS-Thompson BYV255V200 type diodes are preferably employed. These soft recovery type diodes do not have the overshoot or other switching speed noise generation characteristics which are typical of snappy recovery type diodes.

It is recognized that soft recovery type diodes may not always be available, and for that reason, a parallel resistor-capacitor configuration is shown in association with each of the diodes 784, 786, 788 and 790. Additional inductive elements 808 and 810 and RC network 812 and 814 as well as RC network 816 and 818 provide additional filtering to smooth the DC output voltage across lines 822 and 824. The output across lines 822 and 824 provides an input to isolation circuit 825. The input of isolation circuit 825 is an optical isolation device having an input 826 and an output 828. In this manner, the output current is monitored so that the appropriate switching elements 760, 772 or 768, 764 are selected.

The output of isolator 825 is present on lines 830 and 832. The output of isolator 825 is preferably an op amp, or other isolation type device which can be used to proportionally decrease the voltage across lines 822 and 824 to a level compatible with the subsequent controller circuitry connected to line 832, the output of isolator 825. In certain instances, an optical isolator may be employed in which the voltage across the input 826 creates a proportional output generated by detector 828.

Referring to FIG. 13, the signal on line 832 is routed to a reference and select circuit comprised of a voltage reference 782 and a controller 778. Controller 778 provides inputs to driver 776 through select lines 834. Controller 778 is preferably a Micro Linear ML4818 phase modulation/soft switching controller which is preferably configured in the voltage mode. Both pulse by pulse and integrating current limiting may be implemented in the Micro Linear ML4818 by sensing the current through the primary of the transformer with a Hall effect current sensor and a precision rectifier.

The Micro Linear ML4818 can be configured to have different current limits, trigger voltages and time delays. In the embodiment shown in FIG. 13, the ML4818 is configured to have a time out current limit of approximately 100 Amps (A), and an instantaneous current shut off of 150 Amps. The output voltage is programmed for 58 Volts. The output time delay between the actuation of the two pairs of switching elements is programmed for 1 microsecond, and a clock frequency of approximately 50 kHz. A soft start or ramp up is set for 100 milliseconds.

The Micro Linear ML4818 drives four output lines, A1, A2, B1 and B2. Each of the output lines are routed through driver 776. A partial configuration of driver 776 is substantially similar to the driver circuits shown in FIGS. 7A and 7B, with modifications as may be appropriate to the particular circuit and parameters applicable. While only the A drivers are shown in the configuration of FIGS. 7A and 7B, a similar driver network is preferably employed to drive the B drivers. This same driver is also preferably employed as drivers 708, 710, 728 and 730 in FIG. 12. The drivers are actuated by applying a low, or ground signal to the input of the driver package. The input low draws current from a 12 Volt reference source through an optoisolator. The output of the optical isolator drives the balance of the driver network.

The driver circuit 776 in one embodiment is an all discrete circuit which employs high CMRR optoisolators from Hewlett Packard which are used to transfer on/off signals to the driver circuit while simultaneously providing electrical isolation between the input and output. Power is supplied to the driver circuit by a 200 kHz, 24 Volt AC signal which is routed through a full wave rectifier bridge.

The driver configuration for FIGS. 12 and 13 preferably incorporates certain protection features, such as desaturation (desat) protection. The driver network senses the voltage across the collector and emitter lines of the switching element. These lines are labeled in FIG. 12 for clarity, however, the remainder of the switching elements are unlabeled. If the voltage across the collector and emitter ($V_{cc}$) gets too high, the driver network will shut off the circuit, presuming that an overload condition has occurred. A decoupled push pull driver network drives the gate of each of these switching elements.

Several NAND gates are configured to provide a hysteresis circuit to prevent the driver network from generating more than one on or off pulse during each transition of the input.

Referring now to the output configuration shown in FIG. 14, the physical layout and configuration of the components is fairly significant when dealing with the high frequency switching speeds of the present invention. A depiction of the physical configuration of the transformer 734 is shown in FIGS. 8–11 and the configuration of the power distribution bus is shown in FIG. 11A. Preferably, each of the diodes 44, 46, 48 and 50 shown in FIG. 11A are identical to diodes 784, 786, 788 and 790 shown in FIG. 14. Capacitors 62, 66, 70, 74 and 78 are preferably each 30 microFarad ($\mu F$), 100 Volt low ESR multilayer ceramic (MLC) capacitors from the AVXSMPS series. These capacitors combine together to form a 150 $\mu F$ capacitance 814 as shown in FIG. 14. Series resistance 812 is approximately 0.12 milliOhm (mOhm). Capacitors 64, 68, 72, 76 and 80 shown in FIG. 11A are each 2700 $\mu F$, 100 Volt capacitors which combine to form a 13,500 $\mu F$ capacitance 818 shown in FIG. 14. Series resistance 816 (FIG. 14) is approximately 3.6 mOhm. Inductor 808 shown in FIG. 14 is approximately 4.5 microHenris ($\mu H$). When required with the use of "snappy" diodes in order to dampen voltage transients, resistors 792, 796, 800 and 804 are each approximately 10 Ohms, and capacitors 794, 798, 802 and 806 are each approximately 0.001 $\mu F$.

The configuration of the transformer and the switching frequency may not be critical in many applications. However, in order to achieve high efficiency in the transfer of power from the incoming DC signal across lines 12 and 14 (approximately 400 Volts in one embodiment), and the output of the DC converter across lines 822 and 824, it has been found that the higher the frequency at which the transformer is operated, the more efficient the power transfer.

Figure 8:
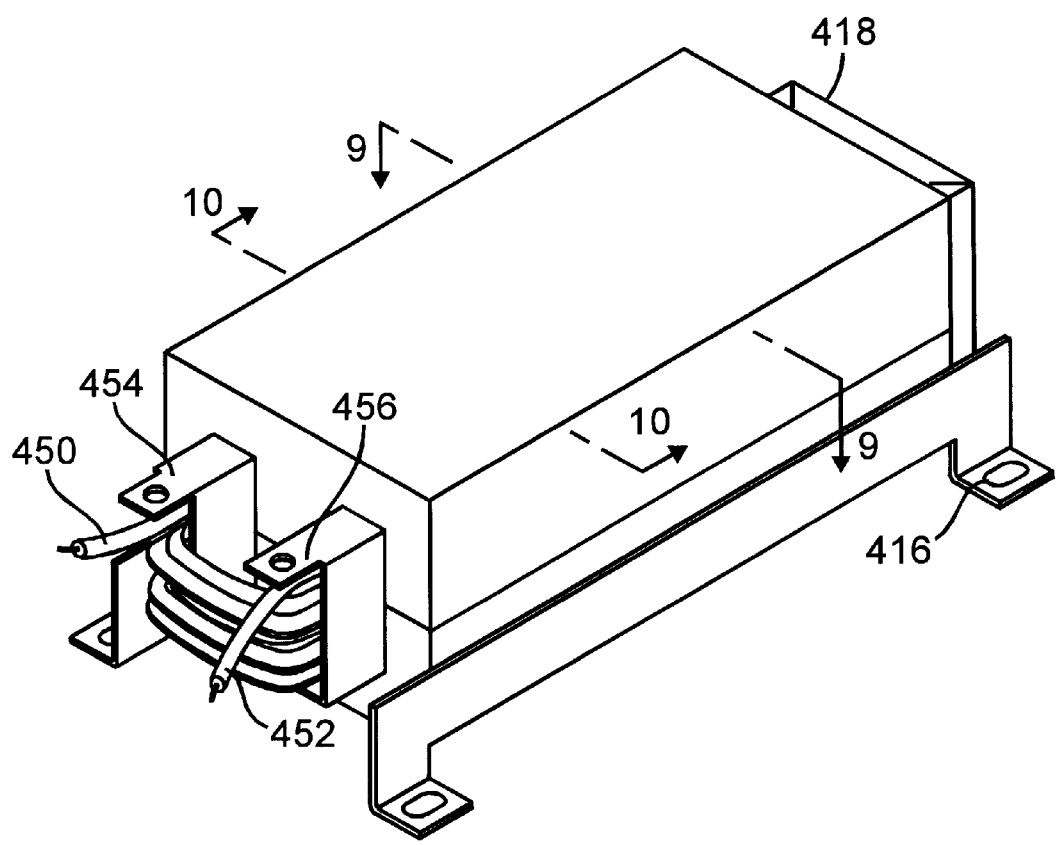
FIG. 8 is a perspective view of the transformer of another aspect of the present invention.
Figure 9:
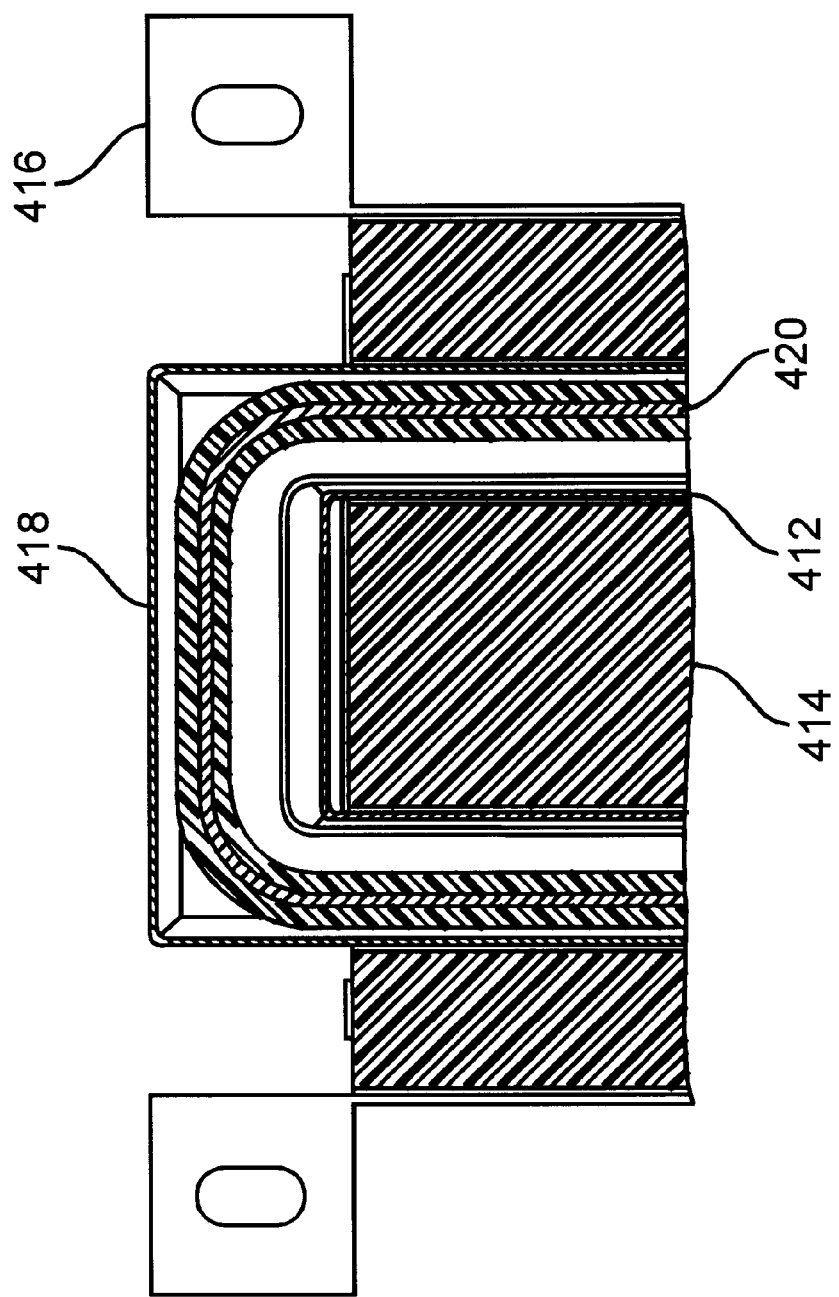
FIG. 9 is a top view of the end of the transformer shown in FIG. 8.
Figure 10:
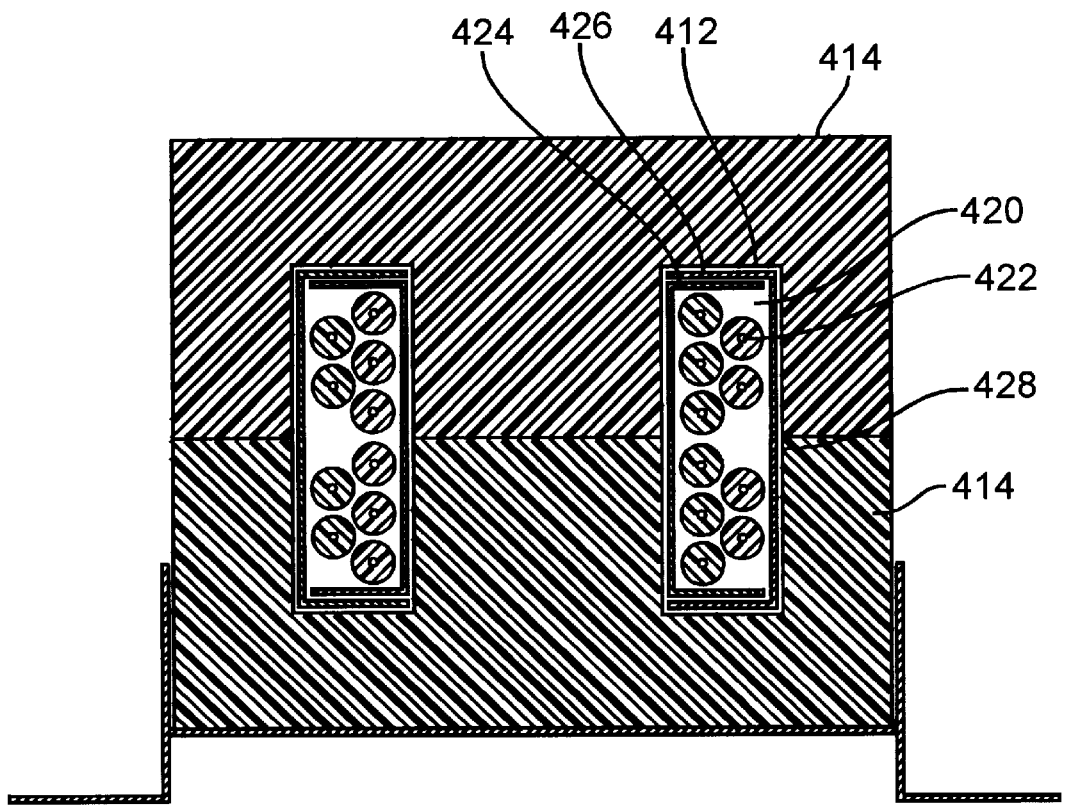
FIG. 10 is a transverse cross-sectional view of the transformer shown in FIG. 8.
Figure 10A:
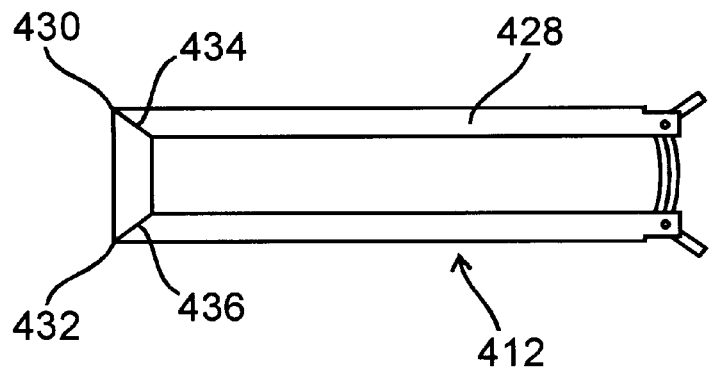
FIG. 10(A) is a bottom view of the primary winding of the transformer shown in FIG. 8.
Figure 10B:
FIG. 10(B) is a side view of the primary winding of the transformer shown in FIG. 8.
Figure 10C:
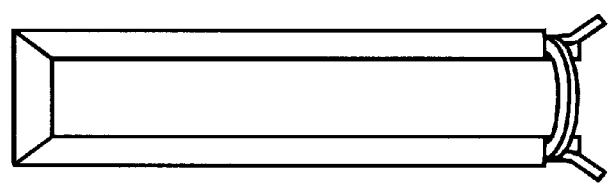
FIG. 10(C) is a top view of the primary winding of the transformer as shown in FIG. 8.
Figure 11A:
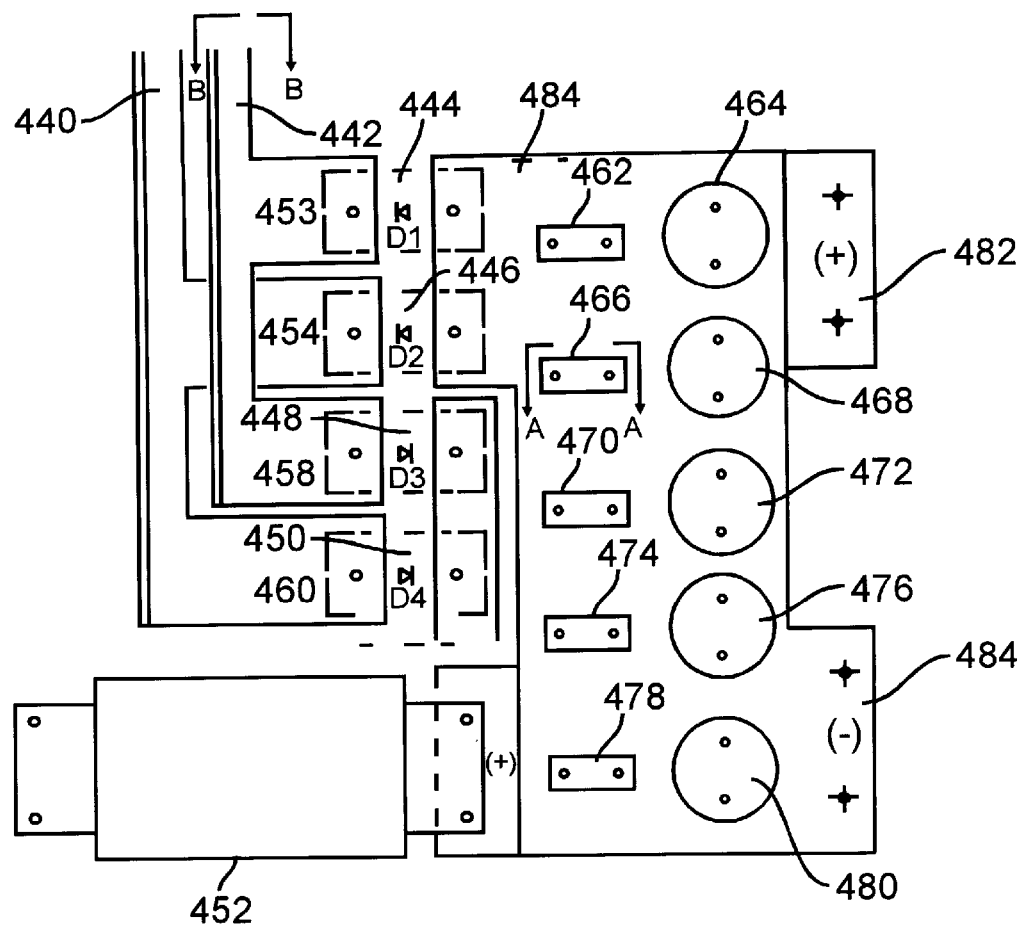
FIG. 11(A) is a top view of the layout of the power conversion system assembled with the transformer.

Referring to FIGS. 8–10, one preferred embodiment of the transformer employed with the present invention is formed by placing a secondary winding surrounding a primary winding inside a high magnetic permeability housing. Secondary winding 412 is rectangular in shape and runs the length of the transformer. Portion 418 of secondary winding 412 extends beyond high magnetic permeability material 414. This reduces or prevents an electromagnetic field from being established within high magnetic permeability material 414 which is perpendicular to the electromagnetic field generated by the lengthwise segment of secondary winding 412. Bracket 416 provides for mounting of the transformer in an appropriate location on a circuit assembly.

Referring to FIG. 9, the primary winding 420 is shown as it rests within the channel defined by secondary winding 412. High magnetic permeability material 414 surrounds the portion of the transformer which runs lengthwise. The section of secondary winding 412 which is not enclosed within high magnetic permeability material 414 is more clearly shown in FIG. 9. This portion 418 of secondary winding 412 is spaced apart from high magnetic permeability material 414. Primary winding 420 remains contained within secondary winding 412 through Section 418.

Referring to FIG. 10, the individual wires 422 of primary winding 420 are shown as they are contained within the cross-section of secondary coil winding 412. Secondary winding 412 is made up of several U-shaped channels 424, 426, and 428 surrounding primary coil winding 420. U-shaped member 426 surrounds the portion of primary winding 420 on the side of primary winding 420 which is opposite U-shaped member 424. Similarly, material 428 surrounds U-shaped material 426. Preferably, U-shaped material 424, 426, and 428 are copper strips approximately 0.032 inches thick formed of a dead soft grade copper, type CU110. This results in a highly conductive, low resistivity secondary winding 412.

Figure 11B:
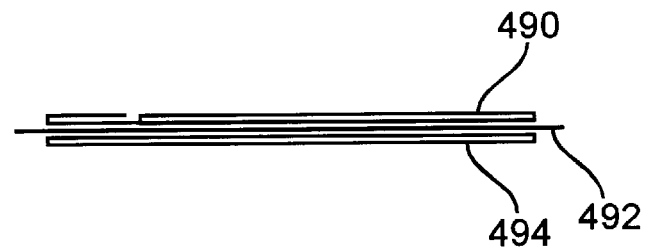
FIG. 11(B) shows the lamination of the conductors forming the bus members.
Figure 11C:
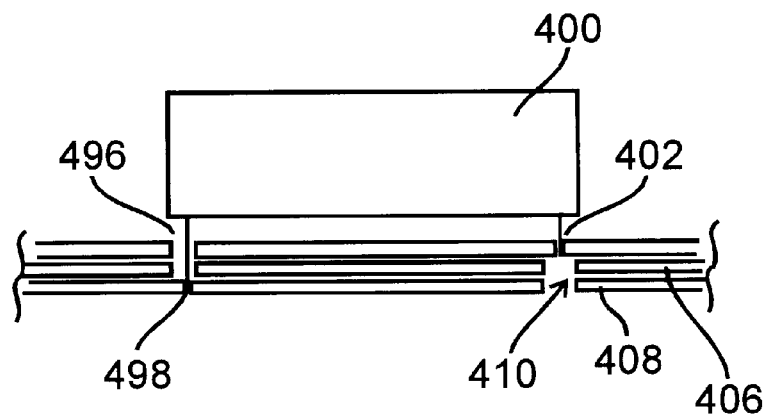
FIG. 11(C) is a cross sectional view showing the assembly of a capacitor into the bus structure of FIG. 11(A).

The channel member illustrated in FIGS. 11A–C is the outside, surrounding member 428 which surrounds U-shaped members 424 and 426. The corner portions 430 of channel members 424, 426, and 428 are formed by notching and bending continuous strips of copper material. Corners 430 and 432 are necessary to establish the shape of secondary winding 412. Corners 430 and 432, as well as joints 434 and 436 are soldered in order to enhance the electrical continuity of the channel member 428 and then ground smooth in order to avoid generating spurious electromagnetic fields. Grinding the joints smooth also allows viewing joints 434 and 436 to ensure that a good solder contact has been created during the manufacturing process. This ensures consistent quality of the finished product and repeatable characteristics of the transformers as they are manufactured in large quantity.

Primary winding 420 (FIGS. 9 and 10) is made up of a number of coils of wire 422 which are made about a bobbin or form.

The particular high magnetic permeability materials selected for use in preferred embodiments of the present invention are: a series E75 type core and a transformer core material 3C85 from Philips Corp. Numerous other types of high magnetic permeability material exist with characteristics similar to series E75, and can be readily employed in the present invention. The particular wire 422 selected is round Litz (Nelc660/38SPDN) having an outer diameter of approximately 0.150 inches. Coil 420 is formed by 5 turns of wire 422 arranged in the configuration as shown in FIG. 10. Numerous other types of wire, including varying thicknesses of the core, varnish coating, conductivity of the wire, conductor material and number and orientation of the windings of the secondary coil can be employed. The particular selection of the number of primary windings depends on the desired transforming ratio.

The preferred embodiment of the present transformer has an overall length of approximately 5½ inches including mounting brackets 416, and is approximately 2.4 inches wide, not including mounting bracket 416. The overall height of the transformer of the preferred embodiment is approximately 2.3 inches, not including mounting bracket 416. The secondary winding is approximately 0.45 inches wide and 1.8 inches high and is formed in a flat-bottomed U-shape with Section 418 representing the base of the U.

The preferred transformer design enables superior operation and highly efficient energy transfer from the primary winding to the secondary winding at high frequencies, typically in the area of 50 kHz. This operating range is difficult for prior art transformers to achieve because of the high frequencies involved, and the parasitic effects of most primary and secondary coil windings, and the high magnetic permeability material that couples them together. The present invention provides superior operating results by substantially encapsulating the primary winding within the secondary winding, creating an integral coil assembly.

By surrounding the length of the integral coil assembly with high magnetic permeability material, the flux linkage capabilities of the present transformer are enhanced. This enhancement is particularly effective when the flux linkage is in one plane, or direction. By locating the segment of the integral coil assembly which is perpendicular to the length of the integral coil assembly outside of the high magnetic permeability material, any interference which may be introduced by generating an electromagnetic field in the portion of the integral coil assembly which is perpendicular to the electromagnetic field generated by the length of the integral coil assembly is minimized.

Additional benefits of locating this portion of the integral coil assembly outside of the high magnetic permeability material include the ability of the integral coil assembly to rapidly cool, dissipating the heat generated by any inefficiencies in coupling the electromagnetic signal created in the secondary 412 of the integral coil assembly with the primary 420 of the integral coil assembly. A minimum amount of energy loss between the primary and secondary coil windings is expected as the coupling between the coil elements is rapidly achieved.

Surrounding the integral coil assembly with high magnetic permeability material enhances the flux coupling between the primary and secondary windings, but limits the surface area available to dissipate heat. Additionally, most high magnetic permeability material has a relatively high thermal resistance and generates a thermal gradient between the outer layer 428 of the integral secondary coil assembly and the outside surface of high magnetic permeability material 414. This thermal gradient can become quite large depending on the selection of materials.

It is desirable to minimize the temperature at which the transformer of the present invention operates. Electromagnetic coupling is more efficient when the windings are operating at low temperatures. This is in part because the entropy of the atomic structure of the coil windings is lower, making it easier to couple between the coil windings with limited energy loss. Energy lost due to inefficient coupling between the coil elements will generate heat, tending to raise the temperature of the transformer and making the transformer less efficient.

Referring now to FIG. 11, a stripline layout is shown connecting the output of the transformer of the present invention to active and passive components, such as the embodiments shown in FIGS. 8–10. Output terminals 40 and 42 of the transformer are physically extended, as shown in FIG. 11A. The extension of the bus structure is formed by layers of copper 490 and 494 (FIG. 11B) which are separated by an insulating layer 492. Additional insulating layers and conductors can be added to the configuration shown in FIG. 11A as required by the power factor of the circuit. Tabs 453 and 458 are physically formed in conjunction with the extension of transformer output 442 to provide electrical connection to switching elements 444 and 448. Switching elements 444 and 448 may be diodes 44 and 48 (D1 and D3), as shown in FIG. 11A, or may be IGBT's, FET's or other switching elements.

Tabs 454 and 465 are similarly formed in conjunction with the extension of output 440 of the transformer shown in FIG. 11A, and are used to interconnect the transformer to switching elements 446 and 450 which may be diodes D2 and D4 as shown in FIG. 11A, or may be IGBT's, FET's or the like. The use of the laminated structure shown in FIGS. 8 and 9 attempts to minimize the parasitic effects that the output wiring of a high frequency, high power transformer would normally suffer, while incorporating a distributed capacitance into the circuit through the use of the laminated structure.

The thickness of copper elements 490 and 494 are preferably calculated to be the thickness of two skin depths based on the frequency and power output by the transformer. At the frequency and power output employed in the preferred embodiments, a conductor 490 or 494 which is thicker than two skin depths does not significantly contribute to the conductivity of the output bus 440 or 442. The thickness of the copper is selected to minimize losses due to the high frequency and high power being transferred through bus 440 and 442.

The diodes D1, D2, D3 and D4, shown in FIG. 11A, are configured in a full wave rectifier bridge and establish a negative terminal on bus 484 and a positive terminal on bus 482 of the outputs. An array of capacitors 462, 464, 466, 468, 470, 472, 474, 476, 478 and 480 are strategically placed within the planar surface of the positive and negative buses to provide a distributed capacitance which is employed to store energy transferred to bus 482 and 484 by the diode matrix D1-D4. Buses 482 and 484 can be referred to as supply and return buses, respectively, and are bonded to opposite sides of an insulating material as shown in FIG. 10.

The leads of capacitors 462–480 are represented by capacitor 814 in FIG. 14. The capacitors are affixed to the supply and return buses which are formed of the laminated structure shown in FIG. 11C. Preferably, bonding capacitor 400 is accomplished by soldering the legs of capacitor 400 to the underlying supply and return bus at points 498 and 402. In order to effectively bond capacitor 400 to the underlying supply and return bus, a first space 496 and a second space 407 are formed in the conductors underlying capacitors 400.

The underlying supply and return buses 484 and 482 are separated by an insulating layer which has a dielectric constant and thickness sufficient to withstand the voltage applied between the power and return buses. In FIG. 11C, the buses are shown as a top layer 404 and a bottom layer 408 separated by an insulating material 406. In the embodiment shown in FIG. 1C, layer 404 would correspond to return bus 484 and layer 408 would correspond to supply bus 482 in FIG. 11A. It is recognized that the supply and return buses can be readily reversed, and that the supply bus can be routed to top layer 404 and the return bus routed to bottom layer 408.

The geometry of the bus is designed so that the supply currents and the return currents flow in a parallel direction causing the inductive effects of the bus to be canceled out. Any additional filter components such as capacitors or inductors are integrated into the bus structure in order to maximize their effect on the transient or AC currents which flow through the bus structure.

In this manner, a distributed capacitance is created by the parallel orientation of supply bus 482 and return bus 484 separated by an insulating material (such as insulating material 406). Inductive characteristics of the supply and return bus are controlled by varying the thickness of the bus layers.

Figure 11D:
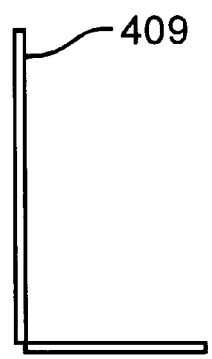
FIG. 11(D) is a cross sectional view of the bus shown in FIG. 11(A).

Additional strength can be provided to bus members 440 and 442 by bending bus members 440 and 442 into an L shaped bracket 409 as shown in FIG. 11D.

In one embodiment of the present invention, the width of the positive power bus 482 is approximately 6.5 inches, as is the width of the negative power bus 484. The width of the positive bus and the negative power bus are measured across the area from capacitor 464 to capacitor 480. An insulator located between the positive power bus and the negative power bus preferably has a width of 6.625 inches in order to ensure some overlap of the insulator and prevent tangential arcing along the outer parameter of the positive bus and the negative power bus.

The length of the positive power bus and negative power bus is measured from the diodes 444, 446, 448 and 450 to the attachment point of the positive power bus and negative power bus, where reference designators 482 and 484 are indicated. This length in one embodiment is 5 inches. In addition, the cut out or indentation which is most apparent towards the center of the positive and negative power bus is ¾ of an inch shorter on each side than the adjacent tabs. In particular, this means that the length across the center of the positive power bus and negative power bus is approximately 3.5 inches and that the tab of the positive power bus where reference designator 482 is located extends approximately ¾ of an inch beyond the negative power bus. Similarly, the tab where reference designator 484 is indicated extends approximately ¾ of an inch beyond the positive power bus.

Figure 16:
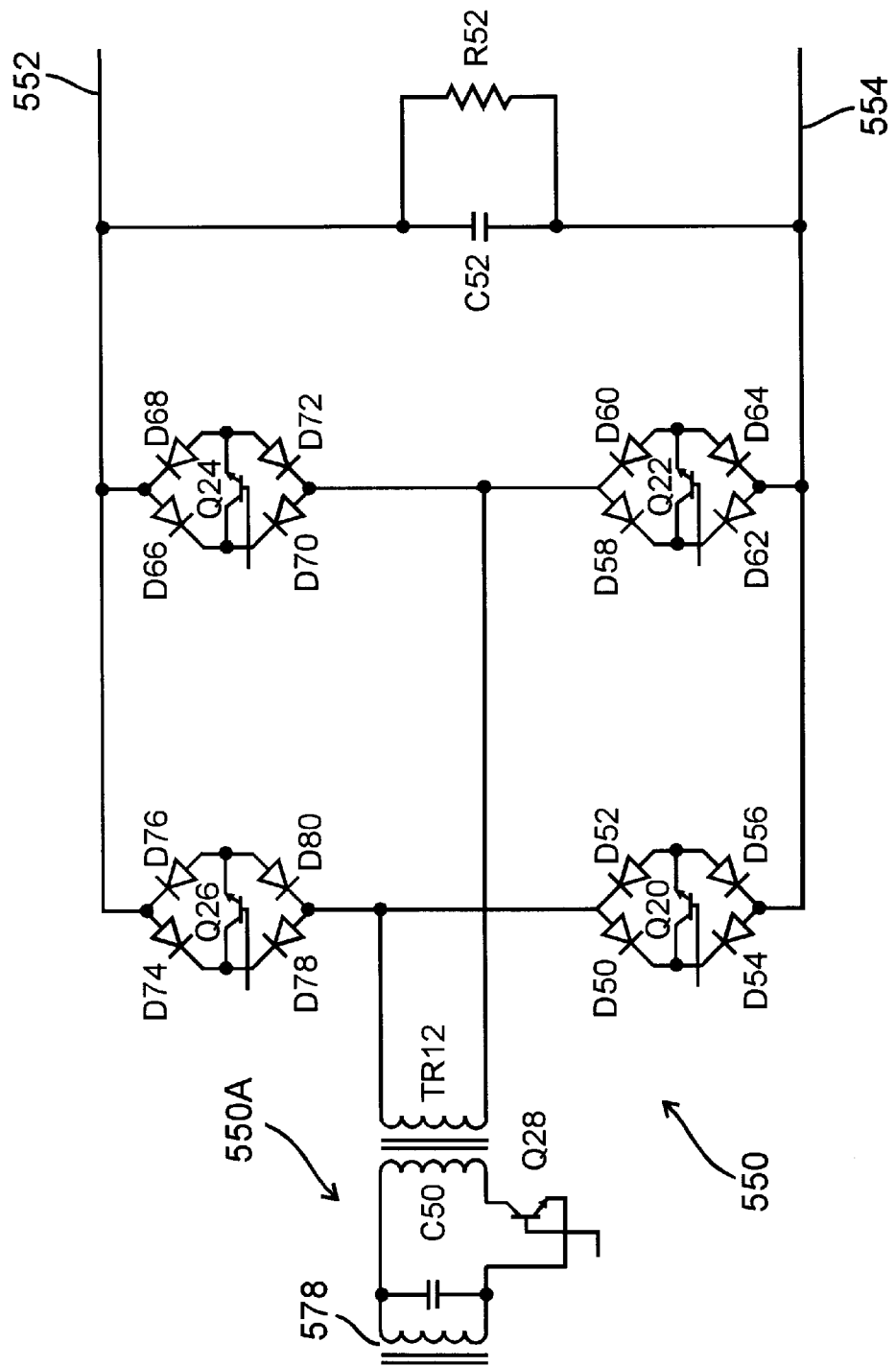
FIG. 16 is a schematic of a cycloconverter that can be used with the system of FIG. 1.

A cycloconverter 580 is shown in FIG. 16. A typical cycloconverter includes 4 full wave bridge rectifiers having a switching element centrally located across the diode bridge. By activating the switching element, a signal path can be established across the diode bridge.

An additional winding 572 (FIG. 1) can be placed in transformer 30 and connected to a bidirectional converter 560. The bidirectional converter need only pass power in both directions when selectively enabled to do so. This type of bidirectional converter was discussed earlier with respect to DC to DC converter 580. The embodiment shown in FIG. 12 can be operated in a forward or reverse direction. In forward operation, the phase of oscillator 712 leads the phase of oscillator 732 to transfer power from DC lines 12 and 14 to lines 721 and 723.

The phase of oscillator 732 can be set to lead the phase of oscillator 712, thus transferring power from across the lines 721 and 723 to lines 12 and 14. Additional modification or removal of filter 740 is necessary. Filter 740 may be replaced by commercially available battery backup circuitry which monitors the input voltage across lines 721 and 723, charges the batteries from the power provided across lines 721 and 723, and when a pre-determined low voltage condition is detected, supplies power from battery 562 across lines 564 and 566 to lines 721 and 723. This type of battery backup system is available from EPE Technologies and a number of other sources. Filter 740 may be retained, and a commercial battery backup circuit connected across the output of filter 740, depending on the configuration of the battery backup circuit.

There has been described hereinabove a particular embodiment of a novel power conversion and distribution system. Those skilled in the art may now make numerous uses of and deviations from the above-described embodiment including varying the particular circuit embodiments employed, varying the shape and aspect ratio of the high frequency, high efficiency transformer, varying the magnetically permeable material, and numerous other changes or deviations from the above described embodiment without departing from the scope of the inventive concepts which are defined solely by the following claims.

What is claimed is:

1. A high efficiency power conversion system comprising:
   a. at least two system input terminals connected to an external alternating current (AC) power source;
   b. impedance means having input, output, and neutral terminals, said input electrically connected to said system input terminals, said neutral electrically connected to a ground plane;
   c. alternating current to direct current conversion means having at least two input terminals and at least two output terminals, said input terminals electrically connected to said output terminals of said impedance means, said alternating current to direct current conversion means converting AC power supplied by the external alternating current power source into a DC output;
   d. at least one power conversion means having at least two input terminals and at least two output terminals, said input terminals electrically connected to said output terminals of said alternating current to direct current converter means, said power conversion means converting the DC output of said alternating current to direct current conversion means to at least one predetermined voltage, said predetermined voltage selectable as a DC voltage or an AC voltage having a predetermined frequency; and
   e. a storage backup coupled to said DC output for storing energy supplied from said DC output and for supplying energy to said DC output when said external AC power source is below a predetermined level.

2. The device as described in claim 1 in which said power conversion means further comprises:
   first conditioning means for converting said DC output of said alternating current to direct current conversion means into a high frequency alternating current signal, said first conditioning means having at least two input terminals and at least two output terminals, said input terminals electrically connected to said input terminals of said power conversion means;
   at least one high frequency transformer having at least two input terminals and at least two output terminals, said input terminals electrically connected to said output terminals of said first conditioning means;
   at least one second conditioning means having at least two input terminals and at least two output terminals, said input terminals of said second conditioning means connected to said output terminals of said high frequency transformer, said second conditioning means converting the high frequency signal generated by said first conditioning means and passed through said high frequency transformer into at least one predetermined electrical signal having a predetermined voltage and predetermined frequency.

3. The device as described in claim 2 in which said first conditioning means generates an AC signal having a frequency greater than 10 kHz.

4. The device as described in claim 2 in which the frequency of operation of said first conditioning module is synchronized with the phase and frequency of operation of said second conditioning module.

5. The device as described in claim 4 in which the frequency of operation of said first conditioning means is the same as the frequency of operation of said second conditioning means, the frequency of operation of said first conditioning means leading the frequency of operation of said second conditioning means by a predetermined phase shift.

6. The device as described in claim 2 in which the high frequency transformer further comprises:
   a first coil winding consisting of one or more turns of an insulated electrical conductor;
   a second coil winding consisting of one or more turns of an insulated, electrical conductive material selectively surrounding and enclosing the majority of said first coil winding;
   said first coil winding formed in a rectangular shape;
   said second coil winding surrounding and enclosing said first coil winding along the length of said rectangle formed by said first coil winding.

7. The device as described in claim 3 in which the first conditioning means further comprises:
   at least two input terminals;
   a direct current input signal connected to said input terminals;
   at least two switching elements connected to each of said input terminals, each of said switching elements having an input terminal, an output terminal, and a control terminal, said input terminal of said switching element electrically connected to said input terminals;
   energy storage means electrically connected to said input terminal of each of said switching elements and said output terminal of each of said switching elements;
   said output terminal of said switching elements electrically connected to said input terminals of said high frequency transformer;
   said second conditioning means further comprising:
      at least one set of output lines having a first output line and a second output line;
      at least two secondary switching elements electrically connected to each of the output terminals of said high frequency transformer, each of said secondary switching elements having at least an input line and an output line, said input line of said secondary switching elements electrically connected to said output terminal of said high frequency transformer;
      first control means for controlling activation of said switching elements of said first conditioning means; and
      second control means for controlling activation of said switching elements of said second conditioning means.

8. The device as described in claim 7 in which said switching elements connected to said input terminals are configured to comprise a first switching matrix having at least a first configuration and a second configuration;
   in said first configuration, said switching matrix electrically connecting one of said input terminals to one of said input lines of said transformer and electrically connecting another of said input terminals to another of said input lines of said transformer, allowing current to flow in a first direction through said input terminals of said high frequency transformer;
   said second configuration electrically deactivating said switching elements which are activated in said first configuration, and electrically activating other switching elements connected to said input terminals and said input terminals of said high frequency transformer, allowing current to flow in a direction opposite said first direction through said input terminals of said high frequency transformer.

9. A power conversion system comprising:
   a. a power input for accepting an input waveform at a given power level and frequency;
   b. an AC to DC converter coupled to the power input for generating a DC voltage bus from said input waveform;
   c. a DC to AC converter coupled to the DC voltage bus for generating an AC waveform having a frequency at least approximately an order of magnitude higher than the frequency of the input waveform;
   d. a coupling device operating at the frequency of the DC to AC converter for coupling the AC waveform to a plurality of AC converters, each of said plurality of AC converters selectively operable as an AC to DC or AC to AC converter to provide an output waveform at a second given power level; and
   e. a storage backup coupled to said DC bus for storing energy supplied from said DC bus and for supplying energy to said DC bus when said input power level is below a predetermined level.

10. The power conversion system of claim 9 wherein the power input further comprises means for accepting an AC waveform.

11. The power conversion system of claim 10 wherein the AC to DC converter includes an input filter network and a high speed switch network.

12. The power conversion system of claim 11 wherein the AC to DC converter includes a switch control circuit and a feedback circuit for controlling the operation of the high speed switch circuit in part as a function of the DC bus.

13. The power conversion system of claim 9 wherein the DC to AC converter includes means for converting a DC input waveform from said DC bus to an AC waveform having a frequency greater than approximately 10 kHz.

14. The power conversion system of claim 9 wherein the DC to AC converter includes a switching matrix and a switching matrix control for controlling the operation of the switches so that the switches are respectively activated when each respective switch has approximately 0 volts across the switch.

15. The power conversion system of claim 9 wherein each of said plurality of AC converters selectively operable as an AC to AC converter to provide an AC output includes a cycloconverter.

16. The power conversion system of claim 9 wherein each of said plurality of AC converters selectively operable as an AC to DC or AC to AC converter includes a switching matrix and a switching matrix control for controlling the operation of the switches, said switching matrix control operating at a predetermined frequency.

17. The power conversion system of claim 16 wherein said predetermined frequency is equal to the frequency of the DC to AC converter, said AC converter functional as an AC to DC converter for generating a DC output waveform.

18. The power conversion system of claim 16 wherein said predetermined frequency differs from the frequency of the DC to AC converter by a fixed amount, said AC converter functional as an AC to AC converter for generating an AC output waveform having a frequency equal to the fixed amount.

19. The power conversion system of claim 9 wherein the coupling device includes a high frequency transformer.

20. The power conversion system of claim 19 wherein the high frequency transformer includes means for accepting an AC signal at greater than approximately 10 kHz.

21. The power conversion system of claim 9 further comprising a bidirectional converter coupled to the coupling device for converting the AC waveform from the DC to AC converter to a DC signal for storage during a standby condition and for converting a DC signal from storage to an AC waveform for application to the coupling device under different conditions.

22. The power conversion system of claim 9 further comprising a microprocessor coupled to the power input and to the AC converter for controlling the converted waveform output from the AC converter.

23. The power conversion system of claim 9 further comprising a control circuit which ensures that a vector representing an output current load is synchronized with a vector representing the voltage of the power source to provide maximum power transfer and minimize switching losses.

24. A high efficiency power conversion system comprising:
   a. at least two system input terminals connected to an external Alternating Current (AC) power source;
   b. an AC to Direct Current (DC) converter having at least two input terminals and at least two output terminals, the input terminals of said AC to DC converter electrically connected to said system input terminals and the output terminals for electrically connecting a DC signal generated from said AC to DC converter;
   c. a storage backup coupled to the output terminals for storing energy supplied from said output terminals and for supplying energy to said output terminals when said external AC power source is below a predetermined level;
   d. at least two intermediate terminals electrically connected to the output terminals of said AC to DC converter;
   e. at least two system output terminals;
   f. at least one power conversion module having at least two input terminals and at least two output terminals, said input terminals of said power conversion module electrically connected to said intermediate terminals, said output terminals of said power conversion module electrically connected to said system output terminals; and
   g. wherein each of said at least one power conversion modules includes a plurality of AC converters selectively operable as an AC to DC or AC to AC converter to provide a DC or AC output waveform, respectively.

25. The device as described in claim 24 in which the power conversion module further comprises a high frequency transformer having at least two input terminals and at least two output terminals, and at least one conditioning module having at least two input terminals and at least two output terminals, said output terminals of said conditioning module electrically connected to said system output terminals.

26. The device as described in claim 25 wherein said power conversion module further for converting the DC signal applied to the input terminals of the power conversion module to a high frequency AC signal which is electrically connected to the input terminals of said high frequency transformer, said output terminals of said high frequency transformer electrically connected to the input terminals of said conditioning module.

27. The device as described in claim 26 in which the high frequency transformer further comprises:

a. a first coil winding consisting of one or more turns of an insulated electrical conductor;
b. a second coil winding consisting of one or more turns of an insulated, electrical conductive material selectively surrounding and enclosing the majority of said first coil winding;
c. said first coil winding formed in a rectangular shape;
d. said second coil winding surrounding and enclosing said first coil winding along the length of said rectangle formed by said first coil winding.

28. The device as described in claim 24 in which the power conversion module further comprises:
   a. a direct current input signal connected to said power conversion module input terminals;
   b. at least two primary switching elements each connected to respective ones of each of said power module input terminals, each of said primary switching elements having an input terminal, an output terminal, and a control terminal, each said input terminal of said primary switching element electrically connected to said power conversion module input terminals;
   c. a transformer having at least a primary winding and at least one secondary winding, said primary winding having at least a first and second input line, each of said secondary windings having at least a first and second output line;
   d. said output terminal of said primary switching elements electrically connected to said primary winding of said transformer;
   e. at least one set of output lines having a first output line and a second output line;
   f. at least two secondary switching elements electrically connected to each of the output lines of said primary winding of said transformer, each of said secondary switching elements having at least an input line and an output line, said input line of said secondary switching elements electrically connected to said output lines of said primary winding of said transformer;
   g. a first control means for controlling the activation of the switching elements connected to the input terminals.

29. The device as described in claim 28 in which said switching elements connected to said input terminals are configured to comprise a first switching matrix having at least a first configuration and a second configuration;
   a. in said first configuration, said switching matrix electrically connecting one of said input terminals to one of said input lines of said primary winding, and electrically connecting another of said input terminals to another of said input lines of said primary winding, allowing current to flow in a first direction through said primary winding of said transformer; and
   b. said second configuration electrically deactivating said switching elements which are activated in said first configuration, and electrically activating other switching elements connected to said input terminals and said input lines of said primary winding, allowing current to flow in a direction opposite said first direction through said primary winding of said transformer.

* * * * *